United States Patent
D'sa et al.

(10) Patent No.: US 10,625,742 B2
(45) Date of Patent: Apr. 21, 2020

(54) SYSTEM AND METHOD FOR VEHICLE CONTROL IN TAILGATING SITUATIONS

(71) Applicant: Honda Motor Co., Ltd., Tokyo (JP)

(72) Inventors: Jovin D'sa, Ann Arbor, MI (US); Shigenobu Saigusa, West Bloomfield, MI (US); Zeljko Medenica, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 208 days.

(21) Appl. No.: 15/784,111

(22) Filed: Oct. 14, 2017

(65) Prior Publication Data
US 2018/0037227 A1 Feb. 8, 2018

Related U.S. Application Data

(63) Continuation-in-part of application No. 15/679,068, filed on Aug. 16, 2017, now Pat. No. 10,332,403, and
(Continued)

(51) Int. Cl.
*B60W 30/16* (2020.01)
*B60W 50/04* (2006.01)

(52) U.S. Cl.
CPC .......... *B60W 30/16* (2013.01); *B60W 50/045* (2013.01); *B60W 2050/048* (2013.01);
(Continued)

(58) Field of Classification Search
CPC combination set(s) only.
See application file for complete search history.

(56) References Cited

U.S. PATENT DOCUMENTS 3,725,921 A * 4/1973 Weidman .......... B60K 31/0008
342/71
4,361,202 A  11/1982 Minovitch
(Continued)

FOREIGN PATENT DOCUMENTS

JP   H07334790    12/1995
JP   2000285395   10/2000
(Continued)

OTHER PUBLICATIONS

Office Action of U.S. Appl. No. 15/630,864 dated Apr. 2, 2019, 11 pages.
(Continued)

*Primary Examiner* — Rami Khatib
(74) *Attorney, Agent, or Firm* — Rankin, Hill & Clark LLP

(57) ABSTRACT

A computer-implemented method for controlling a host vehicle relative to a first vehicle positioned immediately ahead of the host vehicle, including, detecting a second vehicle driving behind the host vehicle and in the same lane as the host vehicle. The method including detecting a braking operation initiated by the vehicle system of the host vehicle. The braking operation causes the host vehicle to decelerate based on an acceleration control rate in order to maintain a preceding headway reference distance with the first vehicle. The method includes, determining a relative rear headway distance between the host vehicle and the second vehicle with respect to a rear headway reference distance and modifying the acceleration control rate based on the relative rear headway distance and the rear headway reference distance. Further, the method includes controlling the vehicle system according to the modified acceleration control rate.

11 Claims, 29 Drawing Sheets

Related U.S. Application Data a continuation-in-part of application No. 15/630,866, filed on Jun. 22, 2017, now Pat. No. 10,286,913, and a continuation-in-part of application No. 15/630,864, filed on Jun. 22, 2017, which is a continuation-in-part of application No. 15/191,358, filed on Jun. 23, 2016, now Pat. No. 10,081,357, application No. 15/784,111, which is a continuation-in-part of application No. 15/191,358, filed on Jun. 23, 2016, now Pat. No. 10,081,357.

(60) Provisional application No. 62/442,333, filed on Jan. 4, 2017, provisional application No. 62/442,190, filed on Jan. 4, 2017.

(52) U.S. Cl.
CPC . *B60W 2554/801* (2020.02); *B60W 2554/804* (2020.02); *B60W 2556/65* (2020.02); *B60W 2710/18* (2013.01); *B60W 2720/106* (2013.01)

(56) References Cited

U.S. PATENT DOCUMENTS

| | | |
|---|---|---|
| 5,166,681 A | 11/1992 | Bottesch et al. |
| 5,189,619 A | 2/1993 | Adachi et al. |
| 5,229,941 A | 7/1993 | Hattori |
| 5,428,544 A | 6/1995 | Shyu |
| 5,777,451 A | 7/1998 | Kobayashi et al. |
| 5,928,294 A | 7/1999 | Zelinkovsky |
| 5,983,161 A | 11/1999 | Lemelson et al. |
| 6,032,097 A | 2/2000 | Iihoshi et al. |
| 6,249,232 B1 | 6/2001 | Tamura et al. |
| 6,278,360 B1 | 8/2001 | Yanagi |
| 6,292,725 B1 | 9/2001 | Kageyama et al. |
| 6,332,354 B1 * | 12/2001 | Lalor ............... B60T 8/00 701/70 |
| 6,470,986 B2 | 10/2002 | Fuchs et al. |
| 6,615,137 B2 | 9/2003 | Lutter et al. |
| 6,650,252 B2 | 11/2003 | Miller, Jr. |
| 6,681,157 B2 | 1/2004 | Kageyama |
| 6,737,963 B2 | 5/2004 | Gutta et al. |
| 6,765,495 B1 | 7/2004 | Dunning et al. |
| 6,853,906 B1 | 2/2005 | Michi et al. |
| 6,985,089 B2 | 1/2006 | Liu et al. |
| 7,191,049 B2 | 3/2007 | Yajima |
| 7,295,925 B2 | 11/2007 | Breed et al. |
| 7,382,274 B1 | 6/2008 | Kermani et al. |
| 7,383,121 B2 | 6/2008 | Shinada |
| 7,471,212 B2 | 12/2008 | Krautter et al. |
| 7,554,435 B2 | 6/2009 | Tengler et al. |
| 7,617,041 B2 | 11/2009 | Sera |
| 7,877,187 B2 | 1/2011 | Hori et al. |
| 7,945,369 B2 | 5/2011 | Lindqvist et al. |
| 7,990,286 B2 | 8/2011 | Shankwitz et al. |
| 8,145,368 B2 | 3/2012 | Won et al. |
| 8,204,678 B2 | 6/2012 | Matsuno |
| 8,384,531 B2 | 2/2013 | Szczerba et al. |
| 8,396,642 B2 | 3/2013 | Breuer |
| 8,527,174 B2 | 9/2013 | Watanabe et al. |
| 8,620,517 B2 | 12/2013 | Caveney et al. |
| 8,788,134 B1 | 7/2014 | Litkouhi et al. |
| 8,818,681 B1 * | 8/2014 | Dolgov ............... G05D 1/0055 701/96 |
| 8,818,682 B1 | 8/2014 | Dolgov et al. |
| 8,903,588 B2 | 12/2014 | Schmüdderich et al. |
| 8,942,864 B2 | 1/2015 | Nemoto |
| 8,942,904 B2 | 1/2015 | Foerster et al. |
| 8,948,995 B2 | 2/2015 | Pandita et al. |
| 9,092,986 B2 | 7/2015 | Salomonsson et al. |
| 9,403,436 B1 | 8/2016 | Yamada |
| 9,576,483 B2 | 2/2017 | Maass |
| 9,632,507 B1 | 4/2017 | Korn |
| 9,799,224 B2 | 10/2017 | Okamoto |
| 9,896,100 B2 * | 2/2018 | Gordon ............... B60W 30/16 |
| 9,977,430 B2 | 5/2018 | Shalev-Shwartz et al. |
| 2002/0091479 A1 | 7/2002 | Maruko et al. |
| 2003/0043033 A1 | 3/2003 | Lee |
| 2003/0060936 A1 | 3/2003 | Yamamura et al. |
| 2003/0218564 A1 | 11/2003 | Tamatsu et al. |
| 2004/0073356 A1 | 4/2004 | Craine |
| 2005/0195383 A1 | 9/2005 | Breed et al. |
| 2006/0162985 A1 | 7/2006 | Tanaka et al. |
| 2006/0284760 A1 | 12/2006 | Natsume |
| 2007/0096885 A1 | 5/2007 | Cheng |
| 2007/0135989 A1 | 6/2007 | Hengst |
| 2007/0142995 A1 | 6/2007 | Wotlermann |
| 2007/0159354 A1 | 7/2007 | Rosenberg |
| 2007/0241874 A1 | 10/2007 | Okpysh et al. |
| 2007/0276600 A1 | 11/2007 | King et al. |
| 2008/0172153 A1 | 7/2008 | Ozaki et al. |
| 2009/0099745 A1 | 4/2009 | Karnjate et al. |
| 2010/0066562 A1 | 3/2010 | Ståhlin et al. |
| 2010/0100324 A1 | 4/2010 | Caminiti et al. |
| 2010/0204896 A1 | 8/2010 | Biondo et al. |
| 2010/0214085 A1 | 8/2010 | Avery et al. |
| 2010/0256852 A1 | 10/2010 | Mudalige |
| 2011/0018737 A1 | 1/2011 | Hsu et al. |
| 2011/0032119 A1 | 2/2011 | Pfeiffer et al. |
| 2011/0109475 A1 | 5/2011 | Basnayake et al. |
| 2011/0184605 A1 | 7/2011 | Neff |
| 2012/0229302 A1 | 9/2012 | Sri-Jayantha |
| 2012/0306634 A1 | 12/2012 | Tsuda et al. |
| 2012/0310518 A1 | 12/2012 | Chen et al. |
| 2013/0041567 A1 | 2/2013 | Yamashiro |
| 2013/0041576 A1 | 2/2013 | Switkes et al. |
| 2013/0054127 A1 | 2/2013 | Yamashiro |
| 2013/0057397 A1 * | 3/2013 | Cutler ............... B62D 15/0255 340/435 |
| 2013/0060443 A1 | 3/2013 | Shida |
| 2013/0116859 A1 | 5/2013 | Ihlenburg et al. |
| 2013/0116861 A1 | 5/2013 | Nemoto |
| 2013/0211624 A1 | 8/2013 | Lind et al. |
| 2014/0005906 A1 | 1/2014 | Pandita et al. |
| 2014/0005908 A1 | 1/2014 | Kollberg et al. |
| 2014/0222280 A1 * | 8/2014 | Salomonsson ......... G08G 1/167 701/28 |
| 2014/0236449 A1 | 8/2014 | Horn |
| 2014/0257665 A1 | 9/2014 | Kagerer et al. |
| 2014/0278052 A1 | 9/2014 | Slavin et al. |
| 2014/0297118 A1 * | 10/2014 | Eberling ............... B60G 17/005 701/38 |
| 2014/0309884 A1 | 10/2014 | Wolf |
| 2014/0358414 A1 | 12/2014 | Ibrahim et al. |
| 2015/0100192 A1 | 4/2015 | Lee et al. |
| 2015/0130607 A1 | 5/2015 | MacArthur |
| 2015/0194055 A1 | 7/2015 | Maass |
| 2015/0199905 A1 | 7/2015 | Hayee et al. |
| 2015/0258996 A1 | 9/2015 | Victor et al. |
| 2015/0321699 A1 | 11/2015 | Rebhan et al. |
| 2016/0054735 A1 * | 2/2016 | Switkes ............... G08G 1/22 701/23 |
| 2016/0091897 A1 | 3/2016 | Nilsson et al. |
| 2016/0133130 A1 | 5/2016 | Grimm et al. |
| 2016/0200318 A1 | 7/2016 | Parikh et al. |
| 2017/0072950 A1 | 3/2017 | Sim |
| 2017/0122841 A1 | 5/2017 | Dudar et al. |
| 2018/0032082 A1 | 2/2018 | Shalev-Shwartz et al. |

FOREIGN PATENT DOCUMENTS

| | | |
|---|---|---|
| JP | 2012083995 | 4/2012 |
| WO | WO1998032030 | 7/1998 |

OTHER PUBLICATIONS

Notice of Allowance of U.S. Appl. No. 15/679,068, dated Apr. 26, 2019; 49 pages.

Office Action of U.S. Appl. No. 15/630,866, dated May 2, 2018; 19 pages.

(56) References Cited

OTHER PUBLICATIONS

Khan et al., Analyzing Cooperative Lane Change Models for Connected Vehicle, Information Systems and Machine Learning Lab, University of Hildesheim, Germany, 6 pages.

Mazda: Brake Assist and Electronic Brake Force Distribution; Active Safety Technology; 3 pages; http://www.mazda.com/en/innovation/technology/safety/active_safety/bk_ebd/; printed Nov. 10, 2017.

Office Action of U.S. Appl. No. 15/191,358 dated Sep. 26, 2017, 17 pages.

Tanida, Analysis of merging behavior at expressway merging sections; Proceedings of the 2016 International Conference on Traffic and Transport Psychology; Brisbane, Australia; Aug. 2-5, 2016, 2 pages.

Office Action of U.S. Appl. No. 15/630,866 dated Dec. 14, 2017, 29 pages.

Office Action of U.S. Appl. No. 15/191,358 dated Jan. 19, 2018, 19 pages.

Office Action of U.S. Appl. No. 15/630,864 dated Jan. 22, 2019, 46 pages.

Office Action of U.S. Appl. No. 15/630,866, dated Oct. 4, 2018; 12 pages.

Office Action of U.S. Appl. No. 15/784,109 dated Jul. 11, 2019, 48 pages.

Office Action of U.S. Appl. No. 15/784,109 dated Oct. 28, 2019, 16 pages.

\* cited by examiner

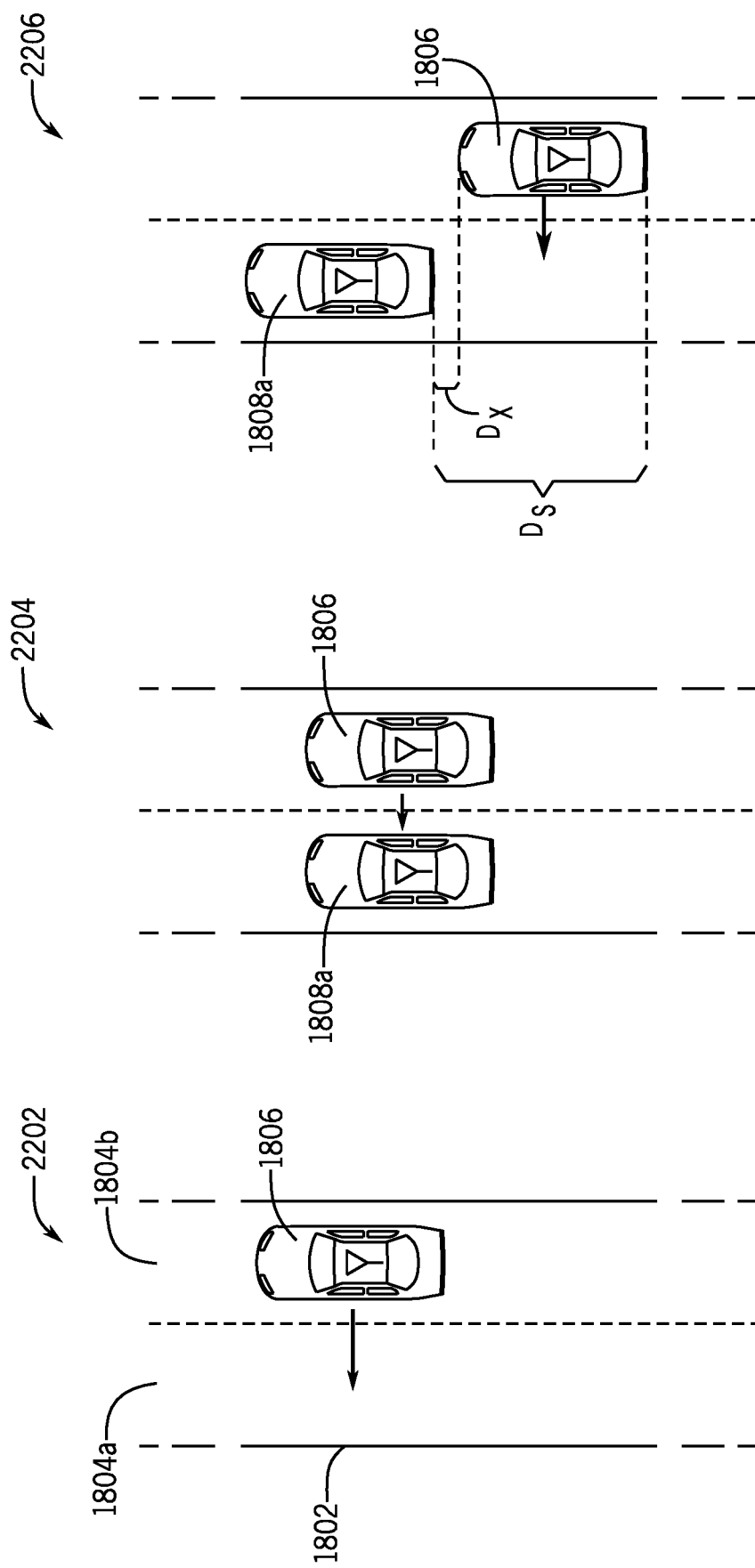

SYSTEM AND METHOD FOR VEHICLE CONTROL IN TAILGATING SITUATIONS

RELATED APPLICATIONS

This application claims priority to U.S. Provisional Application Ser. No. 62/442,333 filed on Jan. 4, 2017, which is expressly incorporated herein by reference. This application also claims priority to U.S. Provisional Application Ser. No. 62/442,190 filed on Jan. 4, 2017, which is also expressly incorporated herein by reference.

Further, this application is a continuation-in-part of U.S. application Ser. No. 15/630,864 filed on Jun. 22, 2017, which also claims priority to U.S. Provisional Application Ser. Nos. 62/442,333 and 62/442,190, all of which are expressly incorporated herein by reference. U.S. application Ser. No. 15/630,864 is also a continuation-in-part of U.S. application Ser. No. 15/191,358 filed on Jun. 23, 2016, which is expressly incorporated herein by reference.

This application is also a continuation-in-part of U.S. application Ser. No. 15/630,866 filed on Jun. 22, 2017, which also claims priority to U.S. Provisional Application Ser. Nos. 62/442,333 and 62/442,190, all of which are also expressly incorporated herein by reference. U.S. application Ser. No. 15/630,866 is also a continuation-in-part of U.S. application Ser. No. 15/191,358 filed on Jun. 23, 2016, which is expressly incorporated herein by reference.

Further, this application is also a continuation-in-part of U.S. application Ser. No. 15/679,068 filed on Aug. 16, 2017, which also claims priority to U.S. Provisional Application Ser. No. 62/442,333, all of which are also expressly incorporated herein by reference. Additionally, this application is a continuation-in-part of U.S. application Ser. No. 15/191,358 filed on Jun. 23, 2016, which is also expressly incorporated herein by reference.

BACKGROUND

Vehicle travel can be affected by many different variables such as, other vehicles, objects, obstructions, hazards, and environmental conditions (herein referred to as hazards). As an illustrative example, traffic congestion, lane closures, disabled vehicles, tailgating vehicles, collisions, and/or debris on a road can cause significant delays for vehicle travel and can compromise road safety. A driver of a vehicle may be unaware of these different variables that affect vehicle travel. In some circumstances, a driver is unable to see a hazard beyond a certain surrounding of the vehicle. For example, the driver's vision may be diminished or completely obstructed by a large vehicle, traffic congestion, and/or weather conditions. The driver's vision is also limited when observing tailgating vehicles following closely behind. Further, the driver's vision may also be reduced due to road geometry such as curvatures.

Additionally, the driver is generally unaware of intimate knowledge about the dynamics of other vehicles on the road and the drivers of the other vehicles. For example, the driver may not know the speed or maneuver intentions of other vehicles on the road. Vehicle sensory systems (e.g., radar, camera) implemented in the vehicle can detect some hazards. However, these sensory systems have a limited detection range within an immediate surrounding of a vehicle. Thus, the driver does not have information about obstructions further ahead or behind, neither at a road level nor at a lane level, outside of the surrounding environment of the vehicle. Vehicle communication with other vehicles and infrastructures can address some of the hazards discussed above when the information communicated is synergistically applied to a vehicle or many vehicles.

BRIEF DESCRIPTION

According to one aspect, a computer-implemented method for controlling a vehicle system of a host vehicle that controls motion of the host vehicle relative to a first vehicle positioned immediately ahead of the host vehicle, including, detecting, using the one or more vehicle sensors, a second vehicle driving behind the host vehicle and in the same lane as the host vehicle, and detecting, using one or more vehicle sensors, a braking operation initiated by the vehicle system of the host vehicle. The braking operation causes the host vehicle to decelerate based on an acceleration control rate generated by the vehicle system in order to maintain a preceding headway reference distance with the first vehicle. The method includes determining, using the one or more vehicle sensors, a relative rear headway distance between the host vehicle and the second vehicle with respect to a rear headway reference distance, and modifying the acceleration control rate based on the relative rear headway distance and the rear headway reference distance. Further, the method includes controlling the braking operation of the vehicle system to decelerate the host vehicle according to the modified.

According to another aspect, a vehicle system for a host vehicle that controls motion of the host vehicle relative to a first vehicle positioned immediately ahead of the host vehicle, includes a sensor system and a processor operatively connected for computer communication with the sensor system. The processor detects, using the one or more vehicle sensors, a second vehicle driving behind the host vehicle and in the same lane as the host vehicle, and receives from the vehicle system of the host vehicle an acceleration control rate. The acceleration control rate when executed by the host vehicle initiates a braking operation by the vehicle system of the host vehicle to maintain a preceding headway reference distance with the first vehicle. Further, the processor modifies the acceleration control rate based on the relative rear headway distance and the rear headway reference distance, and controls the braking operation of the vehicle system to decelerate the host vehicle according to the modified acceleration control rate.

According to a further aspect, a non-transitory computer-readable storage medium including instructions that when executed by a processor, cause the processor to, detect a second vehicle driving behind the host vehicle and in the same lane as the host vehicle, and receive an acceleration control rate from a vehicle system of a host vehicle. The acceleration control rate is generated by the vehicle system to maintain a preceding headway reference distance with a first vehicle positioned immediately ahead of the host vehicle. Further, the processor calculates a relative rear headway distance between the host vehicle and the second vehicle with respect to a rear headway reference distance, and modifies the acceleration control rate based on the relative rear headway distance and the rear headway reference distance. The processor transmits the modified acceleration control rate to the vehicle system.

BRIEF DESCRIPTION OF THE DRAWINGS

FIG. 22A is an illustrative embodiment of a scenario where no radar objects are detected, according to an exemplary embodiment;

FIG. 22B is an illustrative embodiment of a side by side merge scenario, according to an exemplary embodiment;

FIG. 22C is an illustrative embodiment of the host vehicle at tail merge scenario, according to an exemplary embodiment;

DETAILED DESCRIPTION

Figure 1A:
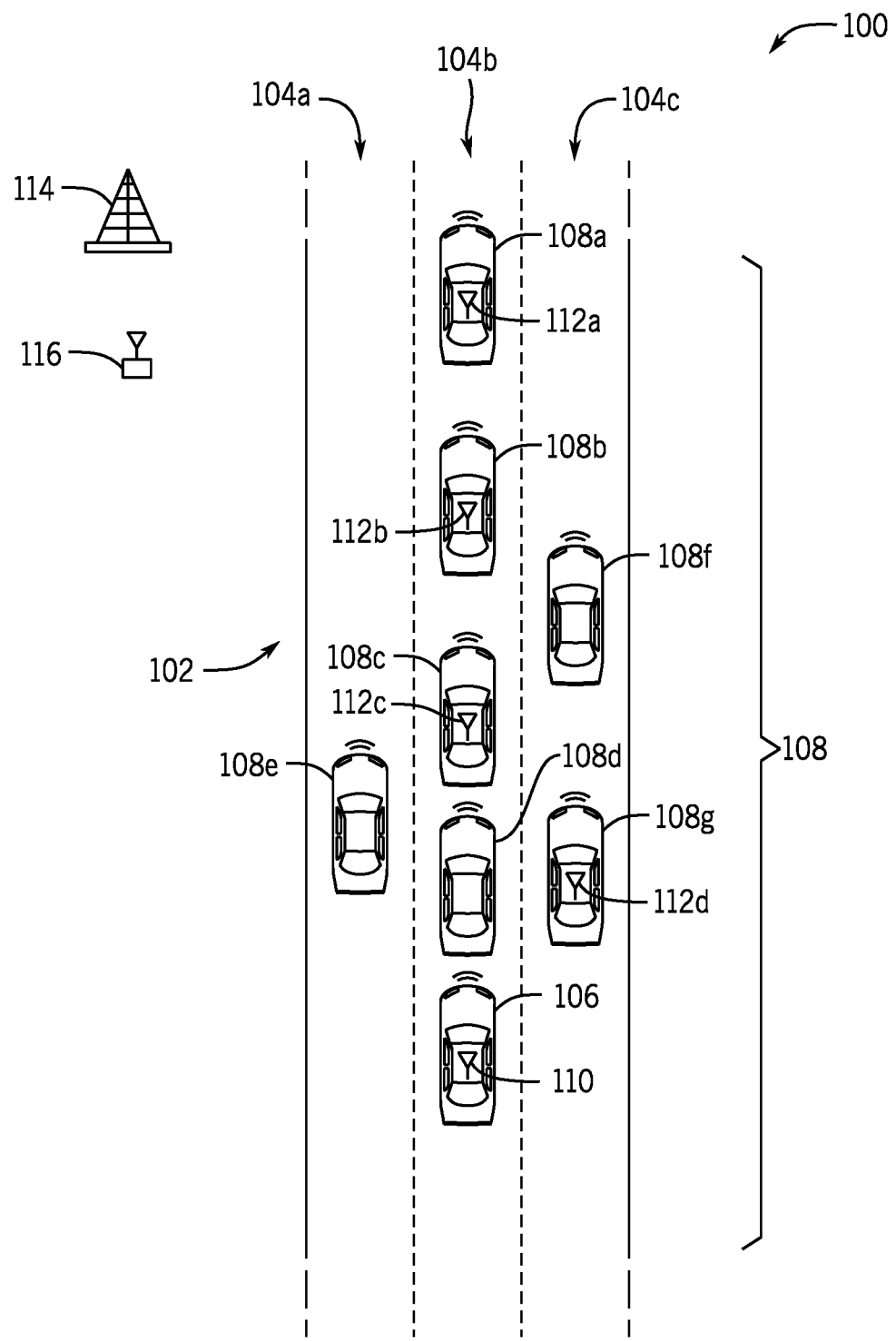
FIG. 1A is a schematic view of an exemplary traffic scenario according to one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods described herein are generally directed to controlling a vehicle using a vehicle communication network that can include multiple vehicles and infrastructures. Communicating information using a vehicle communication network and/or sensing information allows for synergistic control of one or more vehicles in the context of a traffic scenario. In particular, the methods and systems described herein provide Cooperative Adaptive Cruise Control (C-ACC), hazard detection, and merge assistance using a vehicle communication network. FIG. 1A illustrates an exemplary traffic scenario 100 that will be used to describe some of the systems and methods herein. The traffic scenario 100 involves one or more vehicles on a roadway 102. The roadway 102 has a first lane 104a, a second lane 104b, and a third lane 104c. It is understood that the roadway 102 can have various configurations not shown in FIG. 1A, and can have any number of lanes.

In FIG. 1A, the traffic scenario 100 includes a host vehicle (HV) 106 and one or more remote vehicles, which will generally be referred to as remote vehicles 108. However, more specifically, the remote vehicles 108 include a remote vehicle (RV) 108a, a remote vehicle 108b, a remote vehicle 108c, a remote vehicle 108d, a remote vehicle 108e, a remote vehicle 108f, and a remote vehicle 108g. The one or more remote vehicles 108 can also be referred to as a plurality of remote vehicles 108. In some embodiments, one or more of the remote vehicles 108 can be identified with respect to the host vehicle 106. For example, the remote vehicle 108d can be identified as a preceding vehicle in relation to the host vehicle 106. Specifically, the remote vehicle 108d is a preceding vehicle located immediately in front or immediately ahead of the host vehicle 106. In some embodiments, one of the remote vehicles 108 can be a leading vehicle, which is a remote vehicle ahead of a host vehicle and a preceding vehicle. For example, in FIG. 1A a leading vehicle can be identified as the remote vehicle 108a, which is ahead of the host vehicle 106 and the preceding vehicle 108d. In other embodiments, the leading vehicle can be the remote vehicle 108b.

Figure 1B:
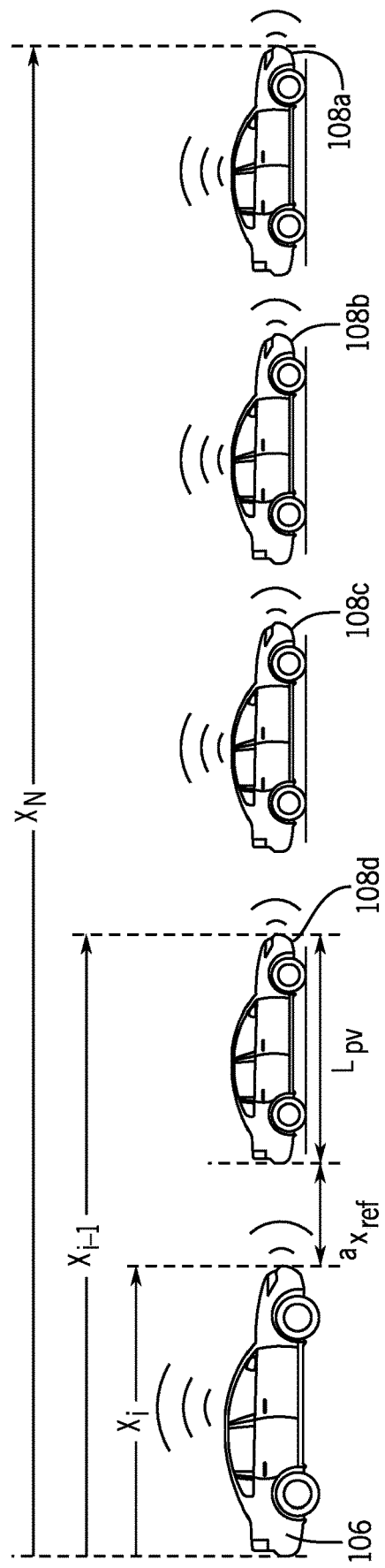
FIG. 1B is a schematic view of vehicles in the second lane 104b of FIG. 1A according to an exemplary embodiment.

In some embodiments, one or more of the remote vehicles 108 in the traffic scenario 100 can be identified as a platoon of vehicles 108. For example, the host vehicle 106, the remote vehicle 108a, the remote vehicle 108b, the remote vehicle 108c, and the remote vehicle 108d can be part of a platoon of vehicles 108 travelling in the same lane (i.e., the second lane 104b). FIG. 1B is a schematic view of the remote vehicles 108 travelling in the second lane 104b of FIG. 1A, namely, the host vehicle 106, the remote vehicle 108a, the remote vehicle 108b, the remote vehicle 108c, and the remote vehicle 108d. In some embodiments, the string of vehicles shown in FIG. 1B can be a platoon of vehicles 108. It is understood that the host vehicle 106 and the remote vehicles 108 can be in different configurations and positions other than those shown in FIGS. 1A and 1B.

In the systems and methods discussed herein, the host vehicle 106 can be controlled, in part, based on data about the one or more remote vehicles 108 communicated via a vehicle communication network. The host vehicle 106 and one or more of the remote vehicles 108 can communicate as part of a vehicle communication network. In particular, the vehicle communication described herein can be implemented using Dedicated Short Range Communications (DSRC).

However, it is understood that the vehicle communication described herein can be implemented with any communication or network protocol, for example, ad hoc networks, wireless access within the vehicle, cellular networks, Wi-Fi networks (e.g., IEEE 802.11), Bluetooth, WAVE, CALM, among others. Further, the vehicle communication network can be vehicle-to-vehicle (V2V) or a vehicle-to-everything (V2X).

In FIG. 1A, the host vehicle 106 can transmit, receive, and/or exchange communications including data, messages, images, and/or other information with other vehicles, user, or infrastructures, using DSRC. In particular, the host vehicle 106 is equipped with a vehicle-to-vehicle (V2V) transceiver 110 that can exchange messages and information with other vehicles, users, or infrastructures that are operable for computer communication with the host vehicle 106. For example, the V2V transceiver 110 can communicate with the remote vehicle 108a via a V2V transceiver 112a, the remote vehicle 108b via a V2V transceiver 112b, the remote vehicle 108c via a V2V transceiver 112c, and the remote vehicle 108g via a V2V transceiver 112d. The V2V transceiver 110 can also communicate with a wireless network antenna 114 and/or a roadside equipment (RSE) 116. Similarly, the remote vehicle 108a, the remote vehicle 108b, the remote vehicle 108c, and the remote vehicle 108g can use its respective V2V transceiver to communicate with one another, the host vehicle 106, the wireless network antenna 114, and/or the RSE 116. In the embodiment shown in FIG. 1A, the remote vehicle 108d, the remote vehicle 108e, and the remote vehicle 108f are not equipped (e.g., do not have DSRC V2V transceivers) for communication with the host vehicle 106 using the vehicle communication network. It is understood that in other embodiments, one or more of the remote vehicle 108d, the remote vehicle 108e, and the remote vehicle 108f can include equipment for communication with the host vehicle 106 using the vehicle communication network.

As will be discussed herein, various types of data can be communicated using the vehicle communication network. For example, the type and/or specifications of the vehicle, navigation data, roadway hazard data, traffic location data, course heading data, course history data, projected course data, kinematic data, current vehicle position data, range or distance data, speed and acceleration data, location data, vehicle sensory data, vehicle subsystem data, and/or any other vehicle information. Some of the embodiments discussed herein include exchanging data and information between networked vehicles for use in vehicle driving. More specifically, control of a vehicle can be executed based in part on the communicated data. Accordingly, DSRC communication can be used to control one or more vehicle control systems. Vehicle control systems include, but are not limited to, cooperative adaptive cruise control (C-ACC) systems, adaptive cruise control (ACC) systems, intelligent cruise control systems, autonomous driving systems, driver-assist systems, lane departure warning systems, merge assist systems, freeway merging, exiting, and lane-change systems, collision warning systems, integrated vehicle-based safety systems, and automatic guided vehicle systems. Some of the embodiments herein are described in the context of a C-ACC system, a vehicle control system, and/or a merge assist system.

Additionally, in the systems and methods discussed herein, the host vehicle 106 can be controlled, in part, based on data about the one or more remote vehicles 108 sensed by the host vehicle 106. In FIG. 1A, each of the remote vehicles 108 on the roadway 102 can sense proximate vehicles and objects, which is illustrated by the accurate lines emanated from the remote vehicles 108. The remote vehicles 108 can sense proximate vehicles and objects using one or more sensors (e.g., radar sensors). The host vehicle 106 can include one or more sensors, which will be discussed in further detail herein, for sensing data about other vehicles and objects in proximity to the host vehicle 106. For example, the host vehicle 106 can sense distance, acceleration, and velocity about the preceding vehicle 108d or other vehicles proximate to the host vehicle 106. Accordingly, although the preceding vehicle 108d is not equipped for V2V communication with the host vehicle 106, the host vehicle 106 can still obtain data about the preceding vehicle 108d using on-board sensors.

A. Vehicle Communication Network

Figure 2:
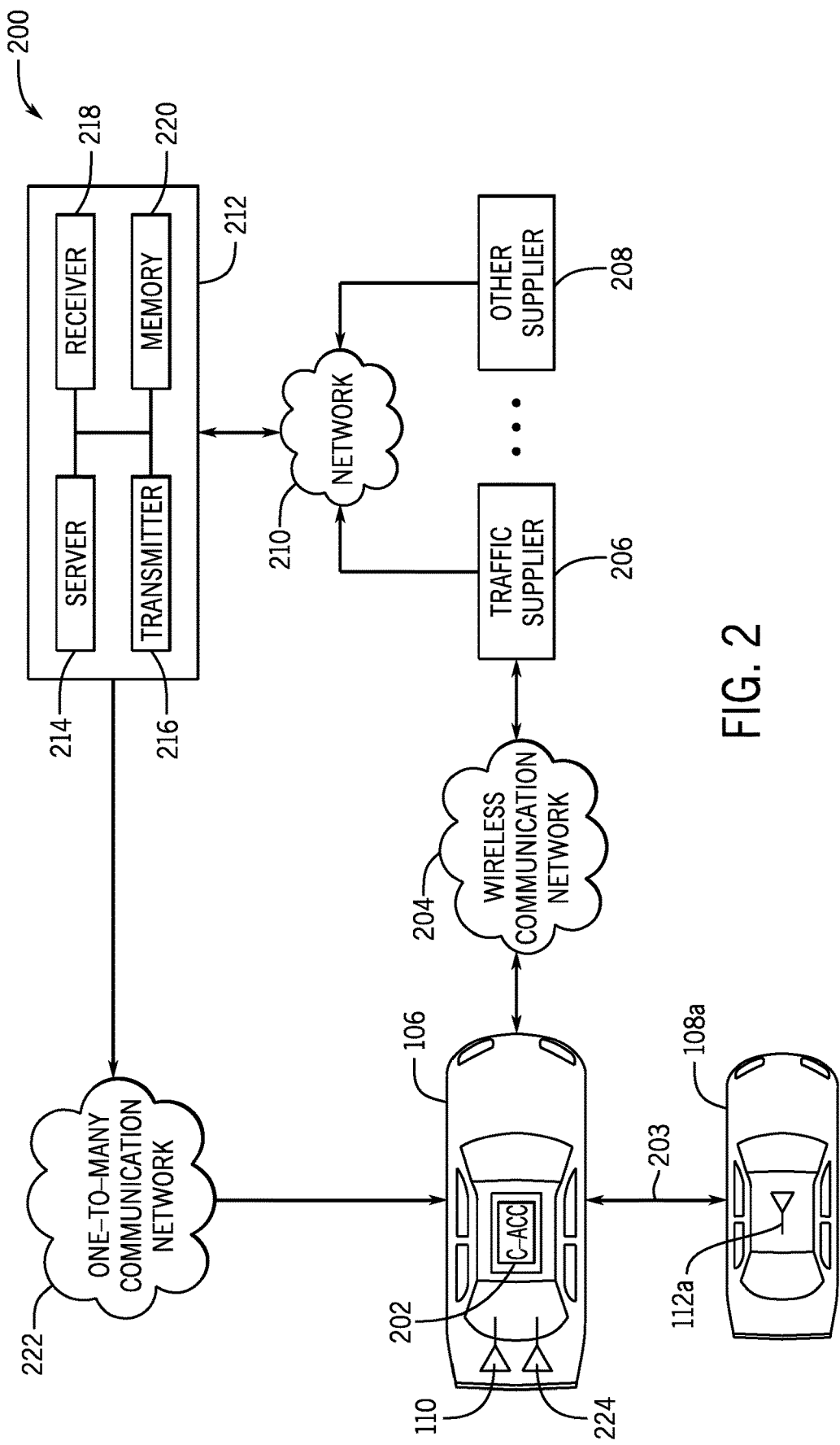
FIG. 2 is a schematic view of a vehicle communication network according to an exemplary embodiment.

Referring now to FIG. 2, a schematic view of a vehicle communication network 200 according to an exemplary embodiment is shown. The vehicle communication network 200 can be implemented within the vehicles shown in FIGS. 1A and 1B. In FIG. 2, the host vehicle 106 includes a C-ACC system 202. The C-ACC system 202 can exchange vehicle and traffic data with other DSRC compatible vehicles via V2V transceiver 110. For example, the V2V transceiver 110 can exchange data with the remote vehicle 108a via the V2V transceiver 112a using a communication link 203. Although only one remote vehicle is shown in FIG. 2, it is understood that the host vehicle 106 can communicated with more than one remote vehicle configured for DSRC communication within the vehicle communication network 200. Thus, is some embodiments, communication links using DSRC can be established between the host vehicle 106 and a plurality of remote vehicles (e.g., the remote vehicles 108) configured for V2V communication using DSRC.

In the embodiments discussed herein, control of the host vehicle 106 is executed based on information communicated directly between the host vehicle 106 and one or more of the remote vehicles 108. However, in some embodiments, data can be exchanged with other infrastructures and servers. For example, in FIG. 2, the C-ACC system 202 can transmit and receive information directly or indirectly to and from a service provider 212 over a wireless communication network 204. The service provider 212 can include a remote server 214, a remote transmitter 216, a remote receiver 218, and a remote memory 220 that are configured to be in communication with one another. In one embodiment, the host vehicle 106 can receive data and information from the service provider 212 by way of a one-to-many communication network 222. The one-to-many communication network 222 can include systems that can send information from one source to a plurality of receivers. Examples of one-to-many communication networks can include television, radio, satellite networks, among others.

In FIG. 2, the V2V transmitter 110 can be used by the C-ACC system 202 to receive and transmit information to and from the service provider 212 and other information providers through the wireless communication network 204 and a broadband network 210, such as the Internet. In alternative embodiments, a radio frequency (RF) transceiver 224 in host vehicle 106 can be used by the C-ACC system 202 to receive and transmit information to and from the service provider 212 through wireless network antenna 114 to the wireless communication network 204. The RF transceiver 224 can include, but is not limited to, a wireless phone, a wireless modem, a Wi-Fi compatible transceiver, and/or any other device that communicates with other networks using the wireless communication network 204. The host vehicle 106 can also receive and transmit information to and from a traffic data supplier 206 and/or one or more other information suppliers 208. This information can include, but is not limited to, traffic data, vehicle location and heading data, high-traffic event schedules, weather data, or other transport related data, etc. The traffic data supplier 206 and the other information supplier 208 can communicate with the service provider 212 through the broadband network 210.

In some embodiments, the service provider 212 can be linked to multiple vehicles through a network connection, such as via the wireless network antenna 114 (FIG. 1A), and/or other network connections. Further, any other wireless communication system capable of delivering data may be used such as satellite, cellular, Wi-Fi, microwave, etc. The service provider 212 may also be linked by a wired connection, such as broadband cable or fiber optic connections, Ethernet, DSL, ADSL, telephone modems, and/or any other wired communication system capable of delivering data to traffic infrastructure such as RSE 116.

B. Vehicle System and C-ACC Overview

Figure 3:
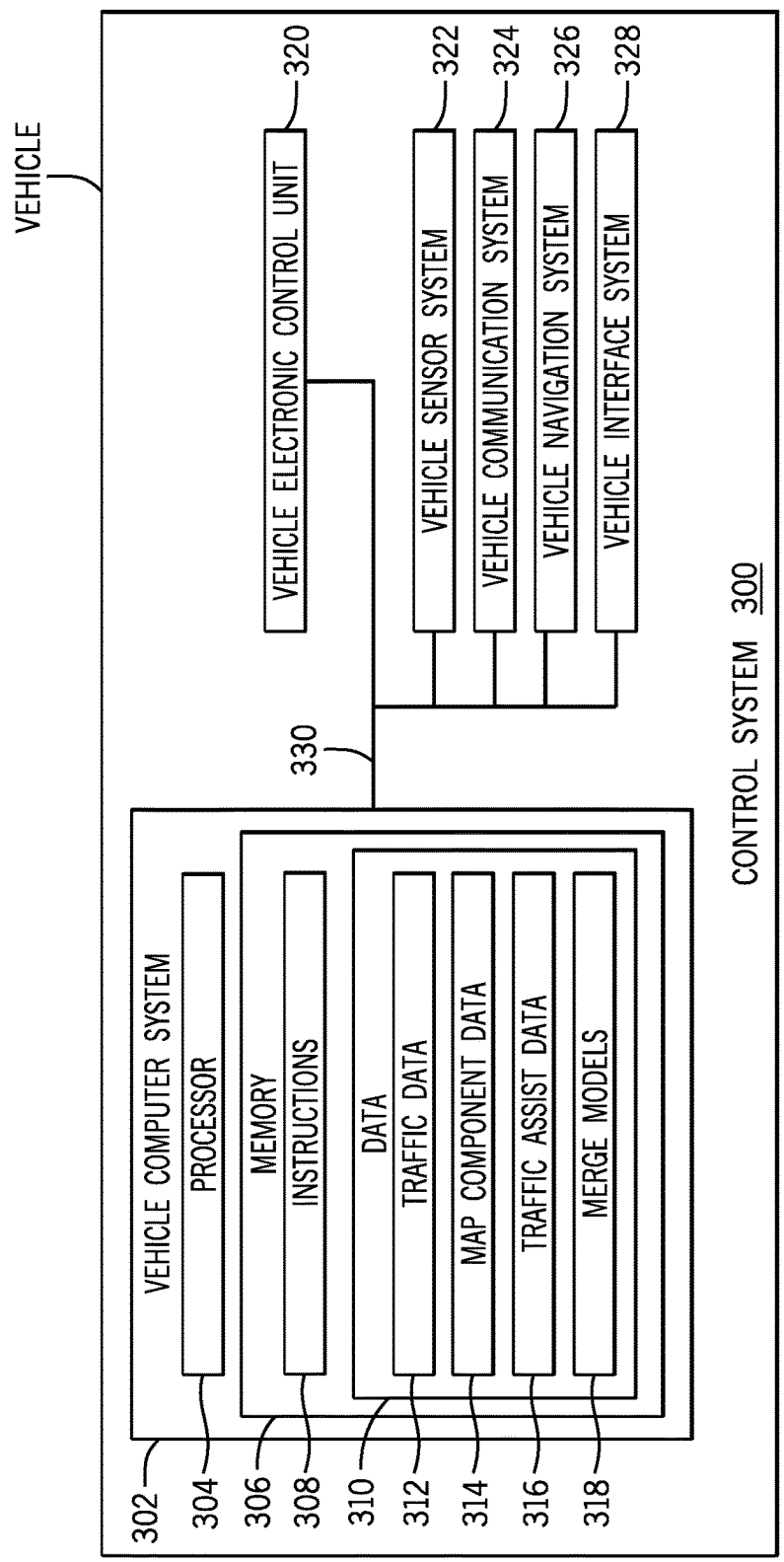
FIG. 3 is a block diagram of a vehicle control system of a vehicle according to an exemplary embodiment.

The host vehicle 106 and the C-ACC system 202 will now be described in more detail with reference to FIG. 3. FIG. 3 is a block diagram of an exemplary control system 300 of the host vehicle 106. However, the components and functionalities shown in FIG. 3 can be associated with other vehicles. For example, the remote vehicles 108 can include one or more of the components and functionalities of the control system 300. Thus, the control system 300 can be alternatively use the system by other entities or in other applications. Further, in some embodiments, the control system 300 will be referred to as a C-ACC control system (e.g., the C-ACC system 202). Other C-ACC systems associated with some vehicles may include different elements and/or arrangements as configured to the C-ACC system 202, but can be configured to communicate over the vehicle communication network 200 with one or more other C-ACC systems, vehicle control systems, or merge assist systems.

The host vehicle 106 can have one or more computers and or computing devices, for example, in FIG. 3, the control system 300 includes a vehicle computer system 302. In some embodiments discussed herein, the vehicle computer system 302 will be referred to as a C-ACC computer system 302. In other embodiments, the vehicle computer system 302 can be associated with another type of vehicle control system or can be a general vehicle computing device that facilitates the functions described herein.

The vehicle computer system 302 includes a processor 304 and a memory 306. In some embodiments, the vehicle computer system 302 may include programmable logic circuits and/or pre-configured logic circuits for executing C-ACC system functions and/or merge assist system functions. The memory 306 stores information accessible by the processor 304 including instructions 308 and data 310 that may be executed or otherwise used by the processor 304. The control logic (in this example, software instructions or computer program code), when executed by the processor 304, causes processor 304 to perform the functions of the embodiments as described herein. The memory 306 may be of any type capable of storing information accessible by the processor 304, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the instructions and data are stored on different types of media.

The instructions 308 may be any set of instructions to be executed directly (such as machine code) or indirectly (such as scripts) by the processor 304. For example, the instructions may be stored as computer code on the computer-readable medium. In this regard, the terms "instructions" and "programs" may be used interchangeably herein. The instructions may be stored in object code format for direct processing by the processor 304, or in any other computer language including scripts or collections of independent source code modules that are interpreted on demand or compiled in advance. Functions, methods and routines of the instructions are explained in more detail below.

The data 310 may be retrieved, stored or modified by the processor 304 in accordance with the instructions 308. For instance, although the vehicle computer system 302 is not limited by any particular data structure, the data 310 may be stored in computer registers, in a relational database as a table having a plurality of different fields and records, XML documents or flat files. The data 310 may also be formatted in any computer-readable format. The data 310 may include any information sufficient to identify the relevant information, such as numbers, descriptive text, proprietary codes, references to data stored in other areas of the same memory or different memories (including other network locations) or information that is used by a function to calculate the relevant data.

In FIG. 3, the data 310 can include traffic data 312, map component data 314, traffic assist data 316, and merge models 318. The traffic data 312 can include commercially-available databases of transport data, traffic data, and traffic schedules, among others. The map component data 314 can include maps identifying the shape and elevation of roadways, lane lines, intersections, crosswalks, bicycle lanes, school zones, speed limits, traffic signals, buildings, signs, real time traffic information, or other transport information that can be used by vehicles. For example, the map component data 314 may include one or more mapped networks of information, such as roadways, lanes, intersections, and the connections between these features. Each feature may be stored as map component data 314, and may be associated with information, such as a geographic location, and whether or not it is linked to other related features, e.g., dimensions of a widened merge lane may be linked to a roadway location and an entrance ramp, among others. The traffic assist data 316, which will be discussed in further detail herein, can include traffic data from various sources within and external to host vehicle 106. Further, the merge models 318 can include types of merge scenarios for merge assistance as will be discussed below in Section IV.

The vehicle computer system 302 can communicate with various components of the host vehicle 106. For example, the vehicle computer system 302 can communicate with the vehicle electronic control unit (ECU) 320, and can send and receive information from the various systems of host vehicle 106, for example vehicle sensor systems 322, a vehicle communication system 324, a vehicle navigation system 326, and a vehicle interface system 328. When engaged, the vehicle computer system 302 can control some or all of these functions of host vehicle 106. It is understood that, although various systems and vehicle computer system 302 are shown within host vehicle 106, these elements may be external to host vehicle 106 and/or physically separated by large distances. Further, the vehicle computer system 302 can be operable connected for computer communication to other components of the host vehicle 106 via, for example, a bus 330.

The vehicle sensor system 322 includes various vehicle sensors that sense and/or measure data internally and/or externally from the host vehicle 106. More specifically, the vehicle sensor system 322 can include vehicle sensors for sensing and measuring a stimulus (e.g., a signal, a property, a measurement, a quantity) associated with the host vehicle 106 and/or a particular vehicle system of the host vehicle 106. In some embodiments, the vehicle sensors are for sensing and measuring a stimulus associated with a vehicle and/or an object in proximity to the host vehicle 106. The vehicle sensor system 322 and the various vehicle sensors will be discussed in more detail herein with FIG. 4.

As indicated above, the host vehicle 106 may also include the vehicle communication system 324. The vehicle computer system 302 can communicate with external communication apparatus for sending and receiving data. For instance, the vehicle communication system 324 includes the V2V transceiver 110 that can communicate with compatible DSRC transceivers in the vehicle communication network 200. As described previously in relation to FIG. 2, the vehicle communication system 324 can include the RF transceiver 224 for communicating wirelessly to service provider 212 through wireless communication network 204. It is understood that some vehicles may not be equipped with communication equipment for V2V and/or V2X communication using DSRC or another type of communication protocol. For example, the remote vehicle 108d, the remote vehicle 108e, and the remote vehicle 108f shown in FIG. 1A are not equipped with a V2V transceiver that can communicate with compatible DSRC transceivers in the vehicle communication network 200.

The host vehicle 106 also includes the vehicle navigation system 326. The vehicle navigation system 326 can provide navigation maps and information to the host vehicle 106 and/or the vehicle computer system 302. The vehicle navigation system 436 may be any type of known, related or later developed navigational system and may include a GPS unit (not shown). The phrase "navigation information" refers to any information that can be used to assist host vehicle 106 in navigating a roadway or path. Navigation information may include traffic data, map data, and roadway classification information data. Examples of navigation information can include street addresses, street names, street or address numbers, intersection information, points of interest, parks, bodies of water, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European).

Further, the host vehicle 106 includes a vehicle interface system 328 that can be used to receive input from a user and/or provide feedback to the user. Accordingly, the vehicle interface system 328 can include a display portion and an input portion. In some embodiments, the vehicle interface system 328 is a human machine interface (HMI) and/or a heads-up display (HUD) located in the host vehicle 106. The vehicle interface system 328 can receive one or more user inputs from one or more users (e.g., a driver, vehicle occupants). The input portion of the vehicle interface system 328 may enable a user, such as a driver or vehicle occupant, to interact with or provide input, such as user input, gestures, clicks, points, selections, voice commands, etc. the host vehicle 106 and/or the vehicle computer system 302. For example, in some embodiments a user can enable the vehicle computer system 302 and/or control features of the vehicle computer system 302 by interacting with the vehicle interface system 328.

As an example, the input portion of the vehicle interface system 328 can be implemented as a touch screen, a touchpad, a track pad, one or more hardware buttons (e.g., on a radio or a steering wheel), one or more buttons, such as one or more soft buttons, one or more software buttons, one or more interactive buttons, one or more switches, a keypad, a microphone, one or more sensors, etc. In one or more embodiments, the vehicle interface system 328 can be implemented in a manner which integrates a display portion such that the vehicle interface system 328 both provides an output (e.g., renders content as the display portion) and receives inputs (e.g., user inputs). An example of this can be a touch screen. Other examples of input portions may include a microphone for capturing voice input from a user.

The vehicle interface system 328 can display information (e.g., graphics, warnings, and notifications). For example, the vehicle computer system 302 can generate information, suggestions, warnings, and/or alerts and provide the same to a vehicle operator on a display device (e.g., display portion) of the vehicle interface system 328. The information, warnings, etc., can include, but are not limited to, one or more navigation maps, symbols, icons, graphics, colors, images, photographs, videos, text, audible information, among others. The vehicle interface system 328 can also include other systems that provide visual, audible, and/or tactile/haptic feedback to a user. For example, an active force pedal (AFP) can be included as part of an acceleration pedal in the host vehicle 106 to provide active feedback force to a driver's foot as the driver pushes the acceleration pedal.

Figure 4:
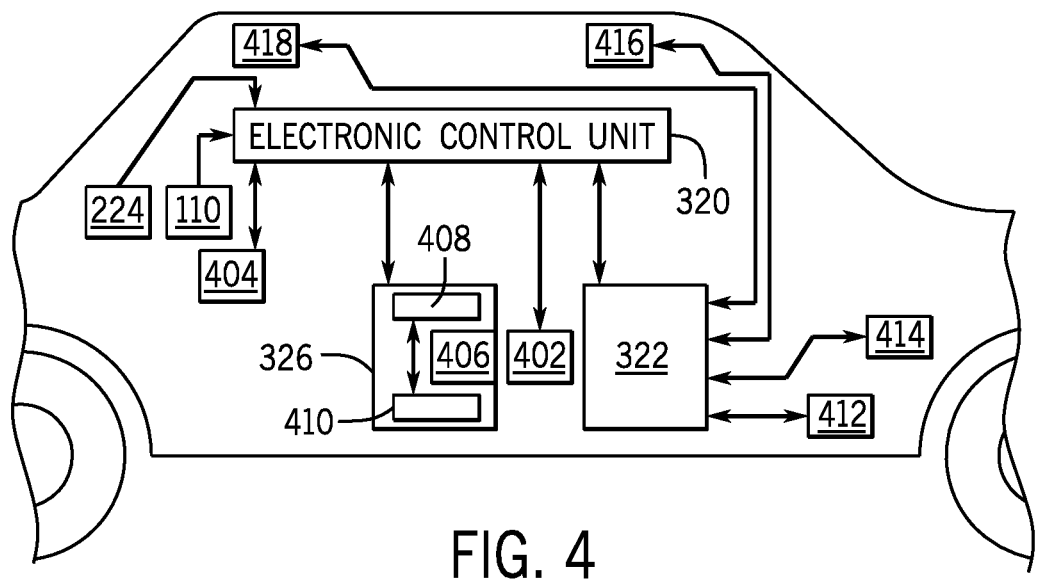
FIG. 4 is a schematic view of exemplary vehicle systems that can be associated with the vehicle of FIG. 3 according to one embodiment.

The host vehicle 106 may include other apparatus for communicating, and in some cases controlling, the various components associated with vehicle systems. The various vehicle systems that the host vehicle 106 can control and/or communicate with will now be discussed in greater detail with reference to FIG. 4. FIG. 4 is a schematic view of the host vehicle 106 including vehicle systems and components that can be that can be associated with the vehicle control system 300 of FIG. 3. As mentioned above with FIG. 3, the components and functionalities shown in FIG. 4 can be associated with other vehicles. For example, the remote vehicles 108 can include one or more of the components and functionalities shown in FIG. 4.

In FIG. 4, the ECU 320 can communicate with a data logger system 402, one or more vehicle systems 404, the vehicle navigation system 326, the vehicle sensor system 322, the vehicle V2V transceiver 110, the RF transceiver 224, a camera 416 and a laser 418. In some embodiments discussed herein, the ECU 320 is configured to receive instructions from the vehicle computer system 302 to retrieve data from one or more components shown in FIG. 4. For example, the ECU 320 can receive instructions from the C-ACC computer system 302 for commands to activate or suppress a particular vehicle system 404, for example, a brake or accelerator, according to an acceleration control rate.

The data logger system 402 can communicate with the ECU 320 to acquire and log data collected from any of the vehicle systems 404 and/or the vehicle sensor system 416. As discussed above, the host vehicle 106 can include the vehicle navigation system 326 that is configured to be in communication with the ECU 320. The navigation system 326 can include a GPS receiver 406, a navigation system display 408 (e.g., part of the vehicle interface system 328), and can store map and location information in a navigation database 410. The navigation system display 408 can display navigational maps and information to a user using any type of display technology. The navigation system display 408 may also communicate information to the host vehicle 106 using any type of known, related art or later developed audio technology, such as by using predetermined sounds or electronically generated speech.

As mentioned above, the vehicle sensor system 322 can include various vehicle sensors and can communicate with the ECU 320 and any number of vehicle sensor devices in any configuration. The vehicle sensor system 322 devices can be advantageous by collecting data for identification and tracking the movement of traffic entities such as the remote vehicles 108, vehicular traffic, or any other condition, entity, or vehicle that could provide data. It is understood that the vehicle sensors can be any sensor used in any vehicle system for detecting and/or sensing a parameter of that system. Exemplary vehicle sensors include, but are not limited to: acceleration sensors, speed sensors, braking sensors, proximity sensors, vision sensors, seat sensors, seat-belt sensors, door sensors, environmental sensors, yaw rate sensors, steering sensors, GPS sensors, among others.

It is also understood that the vehicle sensors can be any type of sensor, for example, acoustic, electric, environmental, optical, imaging, light, pressure, force, thermal, temperature, proximity, among others. The vehicle sensors could be disposed in one or more portions of the host vehicle 106. For example, the vehicle sensors could be integrated into a dashboard, seat, seat belt, door, bumper, front, rear, corners, dashboard, steering wheel, center console, roof or any other portion of the host vehicle 106. In other cases, however, the vehicle sensors could be portable sensors worn by a driver (not shown), integrated into a portable device (not shown), carried by the driver (not shown), integrated into an article of clothing (not shown) worn by the driver or integrated into the body of the driver (e.g. an implant) (not shown).

Referring now to the exemplary vehicle sensors in FIG. 4, the vehicle sensor system 322 can include a sensor 412, a radar system 414, the camera 416, and the laser 418, each of which can be disposed at any beneficial area of the host vehicle 106. Although one sensor 418 is shown in FIG. 4, it is understood that sensor 418 is a representation of one or more sensors installed within or outside of the host vehicle 106. In some embodiments, the vehicle sensor 418 sense vehicle speed, acceleration rate, braking rate, and other vehicle dynamics data about the host vehicle 106. In some embodiments, the vehicle sensor 418 can collect proximity data using rear, front, and side proximity detection sensors 418.

The radar system 414 can include a front long range radar and/or a front mid-range radar. The front long range radar can measure distance (e.g., lateral, longitudinal) and speed of objects surrounding the host vehicle 106. For example, the front long range radar can measure distance and speed of one or more of the remote vehicles 108 surrounding the host vehicle 106. In some embodiments, the radar system 414 can include a plurality of radars in different location of the host vehicle 106. For example, a front left radar located at a front left corner area of the host vehicle 106, a front right radar located at a front right corner area of the host vehicle 106, a rear left radar located at a rear left corner area of the host vehicle 106, and a rear right radar located at a rear right corner area of the host vehicle 106.

FIG. 4 also shows the V2V transceiver 110 of the host vehicle 106 for communicating with other V2V compatible vehicles. In an embodiment, V2V transceiver 110 can collect traffic data from other DSRC transceivers that can be configured for a vehicle, pedestrian, bicycle, building, tower, billboard, traffic signal, roadway sign, or any transport related entity or user. A display operationally connected to a DSRC transceiver can also display any messages, maps, vehicle locations, data, images, alerts, and warnings transmitted to or received from DSRC users in vehicle communication network 200. A communication link (e.g., the communication link 203 in FIG. 2) between DSRC transceivers may be initiated by any user. In the embodiments, a DSRC transceiver may continuously search for signals from other DSRC transceivers, such as by emitting a periodic signal that searches for a reply. In other embodiments, a DSRC transceiver may emit periodic signals searching for a reply from an in-range DSRC transceiver. If a DSRC transceiver replies, then a communications link may be established. Information and data received by the host vehicle 106 can be saved to data logger system 402 and/or the data 310 and processed by the vehicle computer system 302.

Figure 5:
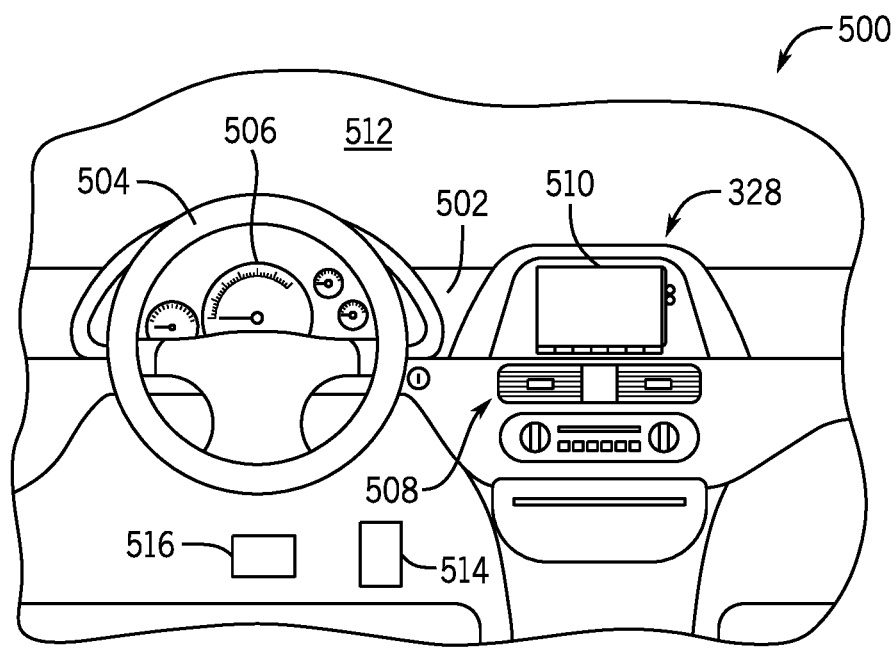
FIG. 5 is a schematic view of an exemplary interior of the vehicle according to an exemplary embodiment.

An exemplary interior view of the host vehicle 106 is shown in FIG. 5. Specifically, FIG. 5 is a schematic of an exemplary design of a vehicle interior 500 associated with the host vehicle 106 and the vehicle control system 300 of FIG. 3. The vehicle interior 500 may include, for example, a dashboard 502, a steering apparatus such as a steering wheel 504, an instrument panel 506, and a center portion 508. The center portion 508 can include one or more devices associated with the interior of the vehicle, including but are not limited to: audio devices, video devices, navigation devices, as well as any other types of devices. In addition, the center portion 508 can be associated with controls for one or more systems of the host vehicle 106 including, but not limited to: climate control systems, radio and sound systems, and other types of systems.

The host vehicle 106 may also have a display device 510, which can be part of the vehicle interface system 328 for displaying information from the vehicle control system 300, and/or other related or unrelated vehicular systems. Examples of display device 510 include, but are not limited to, LCDs, CRTs, ELDs, LEDs, OLEDs, or electronic paper displays each with or without a touchscreen, as well as other types of displays. The display device 510 can include a touchscreen for use as a user input device for the vehicle interface system 328. For example, using the vehicle interface system 328 a user can activate or deactivate one or C-ACC system modes, merge assist modes, and for enabling a user to provide information, such as navigation destination or traffic information, to the vehicle computer system 302.

In alternative embodiments, the vehicle interface system 328 can include buttons, a keypad, or other types of input devices. In another embodiment, the vehicle interface system 328 can include a heads up projection (HUD) type display that is configured to project an image onto one or more surfaces of the host vehicle 106, such as windshield 512. In some embodiments, the display device 510 can be located in any portion of the host vehicle 106, or can be a portable device (not shown). For example, display device 510 can be located within instrument panel 506.

In addition, as discussed above with FIG. 3, the display device 510 can be configured to present visual information for the vehicle computer system 302 and other devices or systems within the host vehicle 106, such as the vehicle navigation system 326. For example, vehicle interface system 328 can inform a driver with visual or auditory alerts or information of traffic flow, hazard detection, a predicted traffic merge by another vehicle, among others. For example, the display device 510 can be configured to display hazard alerts, merge alerts, and traffic data related to one or more of the remote vehicles 108 when one or more of the remote vehicles 108 would affect the operation of the host vehicle 106. Additionally in FIG. 5, an acceleration pedal 514 and a brake pedal 516 are shown. As discussed above, in some embodiments, the acceleration pedal 514 can include an active force pedal (AFP) that can provide active feedback force to a driver's food as the driver pushes the acceleration pedal 514.

C. C-ACC Control Model

As mentioned above, in some embodiments, the systems and methods discussed herein control the host vehicle 106 using data about the host vehicle 106 and data about one or more of the remote vehicles 108. The data about one or more of the remote vehicles 108 can be received by the C-ACC control system 300 using the vehicle communication network 200. In some embodiments, the data about one or more of the remote vehicles 108 can be received by the C-ACC control system 300 using sensors (e.g., radar sensors) on-board the host vehicle 106. Fusion and analysis of this data can be used to control the host vehicle 106 thereby allowing the host vehicle 106 to preemptively react to a traffic scenario and one or more of the remote vehicles 108 that may affect the operation or the travel path of the host vehicle 106. Exemplary control by the C-ACC control system 300 will now be described in greater detail.

Figure 6:
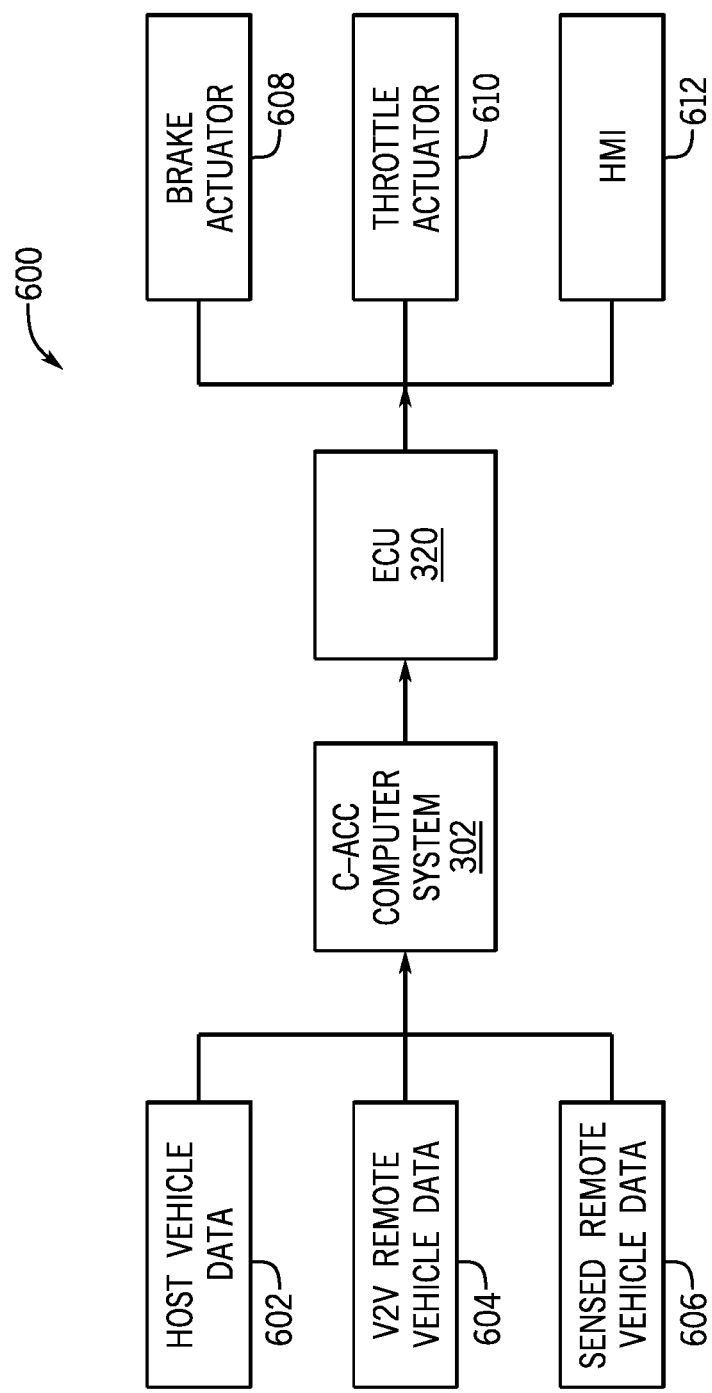
FIG. 6 is a schematic view of a C-ACC control model for controlling a vehicle control system according to an exemplary embodiment.

In some of the embodiments discussed herein, motion of the host vehicle 106 can be controlled, for example, by the C-ACC control system 300. In particular, the C-ACC control system 300 can control longitudinal motion of the host vehicle 106 using the data discussed above. For example, the C-ACC control system 300 can control acceleration and/or deceleration by generating an acceleration control rate and/or modifying a current acceleration control rate (e.g., a target acceleration rate). By using the data discussed above, the C-ACC control system 300 can assess a dynamic state of the host vehicle 106 and the remote vehicles 108 and accordingly adapt control of the host vehicle 106. Referring now to FIG. 6, a schematic C-ACC control model 600 for controlling a vehicle control system is shown. FIG. 6 will be described with reference to the components of FIGS. 2-5. The control model 600 receives as inputs host vehicle data 602, V2V remote vehicle data 604, and sensed remote vehicle data 606. The host vehicle data 602 includes vehicle dynamics data about the host vehicle 106. For example, speed, acceleration, velocity, yaw rate, steering angle, throttle angle, range or distance data, among others. The host vehicle data 602 can be accessed from the vehicle sensor system 322 via the bus 330. The host vehicle data 602 can also include status information about different vehicle systems. For example, the host vehicle data 602 can include turn signal status, course heading data, course history data, projected course data, kinematic data, current vehicle position data, and any other vehicle information about the host vehicle 106.

The V2V remote vehicle data 604 includes remote vehicle dynamics data about one or more of the remote vehicles 108 communicated via the vehicle communication network 200. The V2V remote vehicle data 604 can include speed, acceleration, velocity, yaw rate, steering angle, and throttle angle, range or distance data, among others, about one or more of the remote vehicles 108. The V2V remote vehicle data 604 can also include course heading data, course history data, projected course data, kinematic data, current vehicle position data, and any other vehicle information about the remote vehicle 108 that transmitted the V2V remote vehicle data 604.

The sensed remote vehicle data 606 can include data about one or more of the remote vehicles 108 and/or other objects in proximity to the host vehicle 106, received and/or sensed by the vehicle system sensors 322. For example, in the embodiments discussed herein, the sensed remote vehicle data 606 includes vehicle data obtained from the radar system 414 including proximity data. For example, the sensed remote vehicle data 606 can include distance and speed of one or more of the remote vehicles 108 surrounding the host vehicle 106.

The host vehicle data 602, the V2V remote vehicle data 604, and the sensed remote vehicle data 606 can be input to the C-ACC computer system 302 and processed using a control algorithm, which will be described in further detail herein. The C-ACC computer system 302 can output acceleration and/or deceleration commands to the ECU 320, which then executes said commands to the respective vehicle system, for example, a brake actuator 608 (e.g., that can be part of a brake assist system) and/or a throttle actuator 610. For example, based on the host vehicle data 602, the V2V remote vehicle data 604, and the sensed remote vehicle data 606, the C-ACC computer system 302 can generate an acceleration control rate, which can be a target acceleration rate for the host vehicle 106. Based on the current acceleration rate of the host vehicle 106, the C-ACC computer system 302 can generate a control signal to achieve the acceleration control rate. The control signal can be sent to the ECU 320, which then executes the signal, for example, by controlling the brake actuator 608 and/or the throttle actuator 610.

Additionally, the C-ACC computer system 302 and/or the ECU 320 can execute commands to the HMI 612 (e.g., the vehicle interface system 328). For example, based on the host vehicle data 602, the V2V remote vehicle data 604, and the sensed remote vehicle data 606, visual, audible and/or tactile feedback can be generated and provided via the HMI 612. Accordingly, the host vehicle 106 is controlled based on the fusion of the host vehicle data 602, the V2V remote vehicle data 604, and the sensed remote vehicle data 606 in accordance with the control algorithm, which will now be described in further detail.

The C-ACC computer system 302 implements a control algorithm to generate an acceleration control rate that can be used to control the host vehicle 106 in relation to one or more of the remote vehicles 108, namely, a preceding vehicle and a leading vehicle. For example, with reference to FIG. 1B, the host vehicle 106 can be controlled in relation to the leading vehicle 108a and the preceding vehicle 108d. The control algorithm can include a distance control component based on the relative distance between the host vehicle 106 and the preceding vehicle 108d and a headway reference distance. The distance control component can be expressed mathematically as:

$$a_{x_{ref}} = K_p(x_{i-1} - x_i - h\dot{x}_i - L_{PV}) \tag{1}$$

where $x_{i-1}$ is a distance from a rear end of the host vehicle 106 to the front end of the preceding vehicle 108d, $x_i$ is a length of the host vehicle 106, $h\dot{x}_i$ is a pre-determined headway reference distance and $L_{PV}$ is the length of the preceding vehicle 108d. These variables are schematically shown in FIG. 1B. The control algorithm can also include a velocity control component based on the relative velocity between the host vehicle 106 and the preceding vehicle 108d. Accordingly, in one embodiment, the velocity control component can be expressed mathematically as:

$$a_{x_{ref}} = K_v(v_{i-1} - v_i) \tag{2}$$

where $v_{i-1}$ is a velocity of the preceding vehicle 108d, $v_i$ is the velocity of the host vehicle 106, and $K_v$ is a vehicle speed dynamic gain coefficient. In some embodiments, the acceleration control rate is calculated based on the distance control component and the velocity control component, which can be expressed mathematically as:

$$a_{xv_{ref}} = K_p(x_{i-1} - x_i - h\dot{x}_i - L_{PV}) + K_v(v_{i-1} - v_i) \tag{3}$$

In one embodiment, an acceleration control reference based on acceleration data communicated via the vehicle communication network 200 can be calculated and used as a feedforward control input to the acceleration control reference based on the distance component and the velocity component discussed above in equation (3). More specifically, in one embodiment, the control algorithm includes an acceleration control component based on acceleration data of the leading vehicle 108a and acceleration data of the preceding vehicle 108d. The acceleration data about the leading vehicle 108a is V2V remote vehicle data received using the vehicle communication network 200 (e.g., via DSRC). In one embodiment, the acceleration data about the preceding vehicle 108d is sensed remote vehicle data received using sensors on-board the host vehicle 106, for example, the radar system 414. Accordingly, in one embodiment, the acceleration control reference based on acceleration data communicated via the vehicle communication network can be expressed mathematically as:

$$a_{DSRC_{ref}} = K_{a_{PV}} \cdot a_{i-1} + K_{dsrc} \cdot a_L \tag{4}$$

where $a_{i-1}$ is an acceleration rate of the preceding vehicle 108d detected by the radar system 414, $K_{a_{PV}}$ is a preceding vehicle acceleration dynamic gain coefficient, $a_L$ is an acceleration rate of the leading vehicle 108a received by the host vehicle 106 from the leading vehicle 108a using DSRC via the vehicle communication network 200, and $K_{dsrc}$ is a leading vehicle acceleration dynamic gain coefficient. In the examples discussed herein, the acceleration rate of the preceding vehicle 108d is sensed remote vehicle data 606 (e.g., radar data detected using radar sensors), but it is understood that in other embodiments the acceleration rate of the preceding vehicle 108d can be V2V remote vehicle data received by the host vehicle 106 using DSRC via the vehicle communication network 200. Based on the above, an acceleration control rate can be generated by the C-ACC computer system 302 using the distance component, the velocity component, the acceleration component of the preceding vehicle 108d, and the acceleration component of the leading vehicle 108a. This can be expressed mathematically as, $$a_{ref} = K_p(x_{i-1} - x_i - h\dot{x}_i - L_{PV}) + K_v(v_{i-1} - v_i) + K_{a_{PV}} \cdot a_{i-1} + K_{dsrc} \cdot a_L \tag{5}$$

Figure 7:
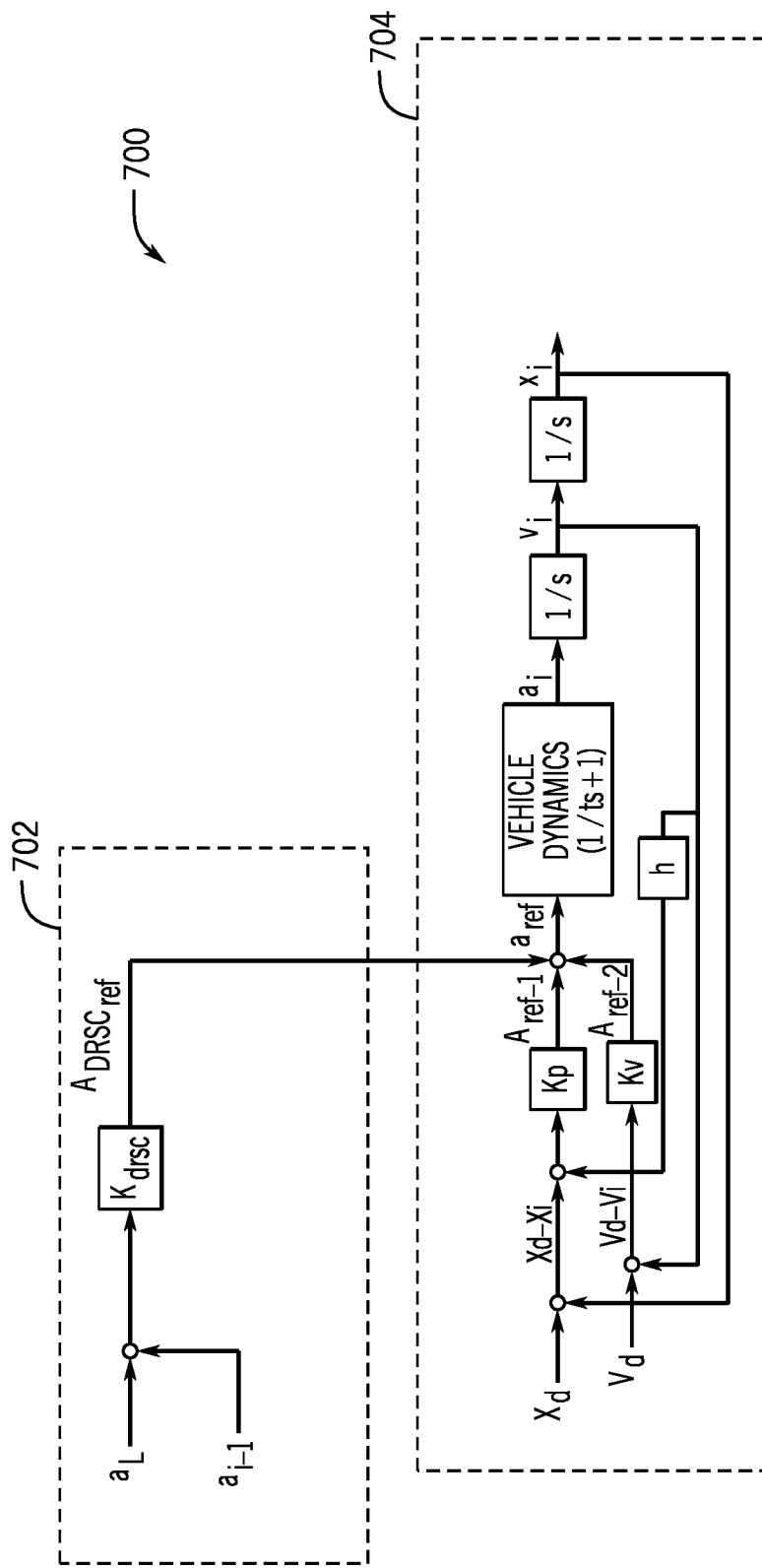
FIG. 7 is a block diagram of an exemplary control system of the C-ACC control system according to an exemplary embodiment.

As mentioned above, the C-ACC computer system 302 can implement a feed forward control algorithm to generate the acceleration control rate to control the host vehicle 106 based on the equations discussed above. Referring now to FIG. 7 a block diagram of an exemplary control system 700 of the C-ACC computer system 302 according to the control algorithm discussed above is shown. In FIG. 7, the control system 700 includes a feedforward control system 702 used as input to a C-ACC control system 704. The feedforward control system 702 receives as inputs an acceleration rate of the leading vehicle 108a received using DSRC via the vehicle communication network 200, and an acceleration rate of the preceding vehicle 108d received using the radar system 414. The inputs are modified by a dynamic gain, namely, the leading vehicle acceleration dynamic gain coefficient, to generate an acceleration reference signal $a_{DSRC_{ref}}$, which is received as input by the C-ACC control system 704. The C-ACC control system 704 determines the distance component and the velocity component as discussed above with equations (1)-(3) and can calculates an acceleration control rate using the input received from the feedforward control system 702.

II. Methods for C-ACC Control

Figure 8:
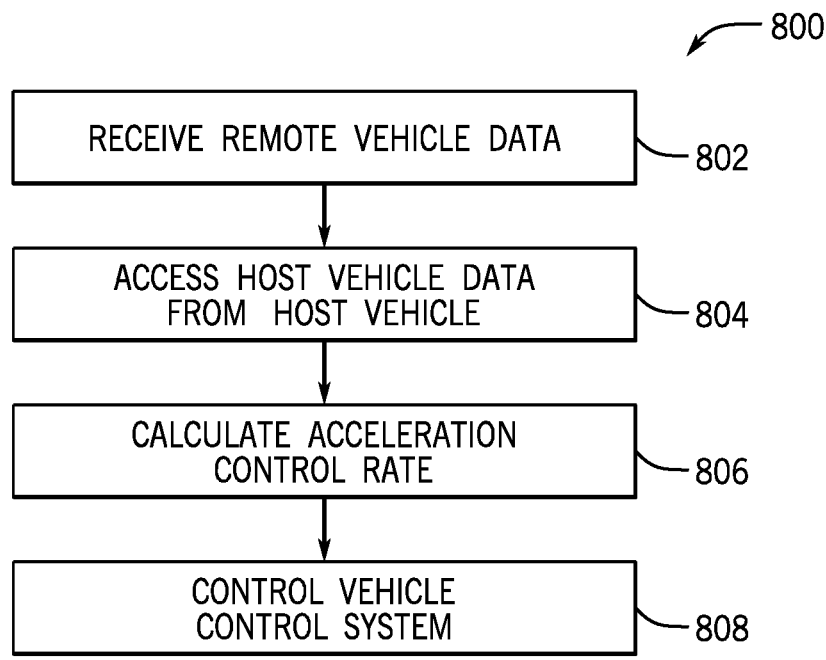
FIG. 8 is a process flow diagram of a method for controlling a vehicle control system according to an exemplary embodiment.

Referring now to FIG. 8, a method 800 for controlling a host vehicle having a vehicle control system using vehicular communication will now be described according to an exemplary embodiment. FIG. 8 will also be described with reference to FIG. 1A, 1B and FIGS. 2-7. In one embodiment, the method 800 is for controlling the host vehicle 106 having a vehicle control system (e.g., the C-ACC computer system 302) that controls motion of the host vehicle 106 relative to the preceding vehicle 108d. As shown in FIGS. 1A and 1B, the preceding vehicle 108d is positioned immediately ahead of the host vehicle 106. At block 802, the method 800 includes receiving remote vehicle data about one or more remote vehicles. More specifically, in one embodiment, block 802 includes receiving V2V remote vehicle data 604 transmitted from one or more remote vehicles 108 to the host vehicle 106 via a vehicular communication network 200 and one or more communication links between the host vehicle 106 and each of the one or more remote vehicles 108. In some embodiments, V2V remote vehicle data 604 is received from one or more remote vehicles 108 within a predetermine distance (e.g., 300 m) from the host vehicle 106. As discussed above with FIGS. 1A, 1B, and 2, the host vehicle 106 is equipped with the V2V transceiver 110 that can communicate with other remote vehicles 108 operable for V2V communication on the roadway 102. For example, the V2V transceiver 110 can communicate with the remote vehicle 108a via a V2V transceiver 112a, the remote vehicle 108b via a V2V transceiver 112b, the remote vehicle 108c via a V2V transceiver 112c, and the remote vehicle 108g via a V2V transceiver 112d.

To facilitate communication, a communication link is established between the host vehicle 106 and the one or more remote vehicles 108 operable for V2V communication on the roadway 102. The communication link can be established between V2V transceivers. For example, the V2V transceiver 110 can continuously search for signals from other V2V transceivers, such as by emitting a periodic signal that searches for a reply. In other embodiments, the V2V transceiver 110 may emit periodic signals searching for a reply from an in-range V2V transceiver. If a V2V transceiver replies, then a communications link may be established. An exemplary communication link 203 between the host vehicle 106 and the remote vehicle 108a is shown in FIG. 2.

As discussed above with FIG. 6, the host vehicle 106 can receive V2V remote vehicle data 604 from one or more of the remote vehicles 108 equipped for V2V communication. Thus, the V2V remote vehicle data 604, as discussed above with FIG. 6, can contains parameters of the remote vehicle 108 that transmitted the V2V remote vehicle data 604. In some embodiments, the V2V remote vehicle data 604 is contained in a message packet transmitted from one or more of the remote vehicles 108. For example, the message packet can be in a Basic Safety Message (BSM) format as defined for DSRC standards. Vehicles can periodically broadcast BSMs to announce their position, velocity, and other attributes to other vehicles. Information and data received by the host vehicle 106 can be saved to data logger system 402 and/or the data 310 and processed by the C-ACC computer system 302.

Referring again to block 802 of FIG. 8, in one embodiment, receiving remote vehicle data includes receiving remote vehicle data transmitted from a leading vehicle positioned ahead of the host vehicle and the preceding vehicle. For example, in FIGS. 1A and 1B, the host vehicle 106 can receive V2V remote vehicle data 604 from the leading vehicle 108a. In one embodiment, the V2V remote vehicle data 604 includes an acceleration rate of the leading vehicle 108a.

In another embodiment, receiving remote vehicle data at block 802 includes receiving remote vehicle data about remote vehicles and/or obstacles within a proximity of the host vehicle. For example, the remote vehicle data can include an acceleration rate of a preceding vehicle 108d. In the embodiments discussed herein, the acceleration rate of the preceding vehicle 108d can be detected by the host vehicle 106 using sensors on-board the host vehicle 106, for example, radar sensors. Thus, the remote vehicle data sensed by the host vehicle 106 can be sensed remote vehicle data 606. For example, with respect to the host vehicle 106 and FIG. 6, the host vehicle 106 detects sensed remote vehicle data 606 of the preceding vehicle 108d using the radar system 414. Although the systems and methods discussed herein utilize acceleration data sensed by radar, it is understood that in other embodiments, the acceleration data can be received via the vehicle communication network 200 if the preceding vehicle 108d is operably equipped for V2V communication with the host vehicle 106.

Referring again to FIG. 8, at block 804, the method 800 includes accessing host vehicle data from the host vehicle. As discussed above with FIG. 6, the host vehicle data 602 can be accessed from the vehicle sensor system 322 via the bus 330. In some embodiments, the host vehicle data 602 includes a velocity of the host vehicle 106 and an acceleration rate of the host vehicle 106, however it is understood that the host vehicle data 602 can include other types of data about the host vehicle 106.

Figure 9:
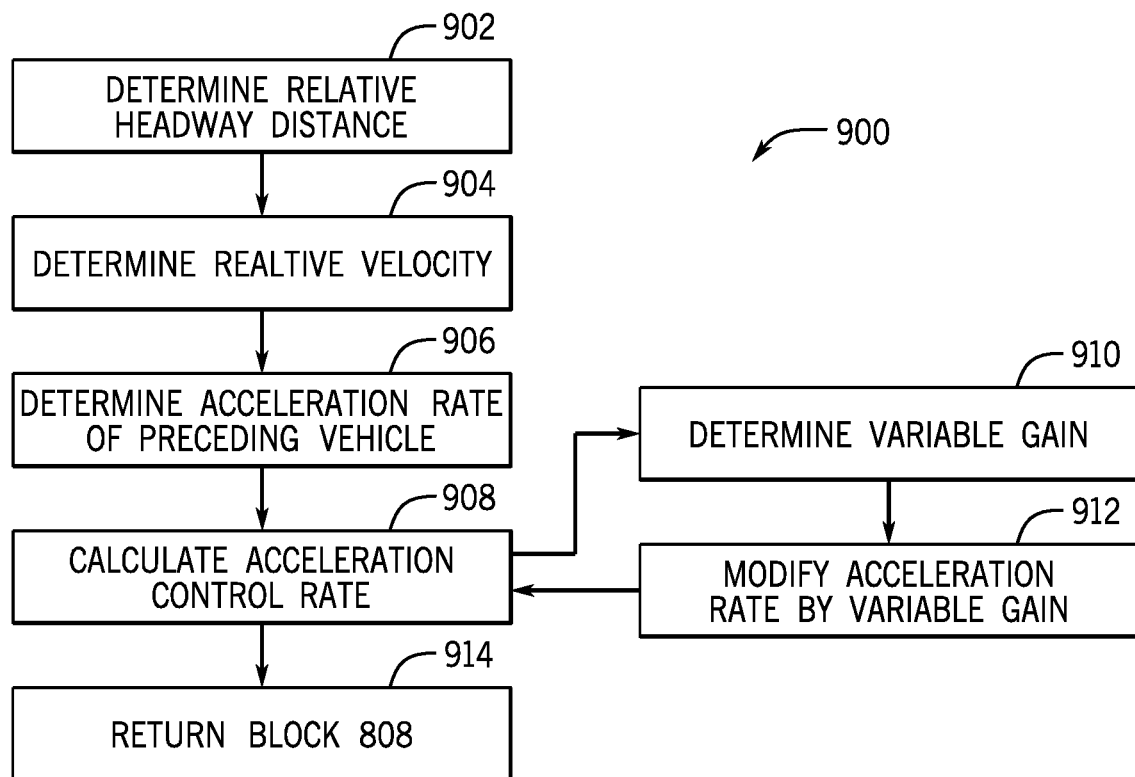
FIG. 9 is a process flow diagram of a method for calculating an acceleration control rate for a host vehicle according to an exemplary embodiment.

At block 806, the method 800 includes calculating an acceleration control rate for the host vehicle. In one embodiment, the acceleration control rate is calculated by the processor 304 according to the C-ACC control model discussed above with equations (1)-(5). Block 806 will now be described in greater detail with respect to FIG. 9. FIG. 9 illustrates a method 900 for calculating an acceleration control rate accordingly to an exemplary embodiment. At block 902, the method 900 includes determining a relative headway distance between the host vehicle and the preceding vehicle with respect to a headway reference distance. For example, as discussed above with equation (1), the processor 304 can calculate a distance control component based on a relative distance between the host vehicle 106 and the preceding vehicle 108d and a headway reference distance. The headway reference distance is a desired separation (e.g., distance) between the host vehicle 106 and the preceding vehicle 108d. The headway reference distance can be predetermined and stored, for example at the memory 306.

At block 904, the method 900 includes determining a relative velocity between a velocity of the host vehicle and a velocity of the preceding vehicle. For example, as discussed above with equation (2), the processor 304 can calculate a velocity control component based on a velocity of the host vehicle 106 and a velocity of the preceding vehicle 108d. At block 906, the method 900 includes determining an acceleration rate of the preceding vehicle. For example, as discussed above with block 802 of FIG. 8, the host vehicle 106 can determine the acceleration rate of the preceding vehicle 108d using the radar system 414.

At block 908, the method 900 includes calculating an acceleration control rate for the host vehicle to maintain the headway reference distance between the host vehicle and the preceding vehicle. In particular, the acceleration control rate for the host vehicle is based on the relative headway distance, the relative velocity, the acceleration rate of the preceding vehicle, and the acceleration rate of the leading vehicle. Thus, in one embodiment, the processor 304 calculates the acceleration control rate for the host vehicle 106 according to equation (5) discussed above.

In one embodiment, calculating the acceleration control rate for the host vehicle can be based on a variable gain associated with the acceleration rate of the leading vehicle. For example, as shown in equations (4) and (5), $K_{dsrc}$ is a leading vehicle acceleration dynamic gain coefficient. Accordingly, at block 910 the method 900 can include determining the variable gain. In one embodiment, the variable gain is based on a distance between the host vehicle and the leading vehicle. In some embodiments, the variable gain is based on a distance headway between the host vehicle and the leading vehicle and a time headway between the host vehicle and the leading vehicle. The distance headway, in some embodiments, is the relative headway distance.

The variable gain can be a function of a distance between the host vehicle and the leading vehicle. The variable gain can increase as the distance between the host vehicle and the leading vehicle decreases. As an illustrative example with reference to FIG. 1B, according to one embodiment, a variable gain where the remote vehicle 108a is the leading vehicle would be less than a variable gain where the remote vehicle 108c is the leading vehicle based on the distance to the host vehicle 106. In other embodiments, the variable gain can be a function of a distance headway between the host vehicle and the leading vehicle and/or a time headway between the host vehicle and the leading vehicle. The variable gain can increase as the distance headway and/or the time headway increases. The variable gain determined at block 910 can be used to modify the acceleration rate of the host vehicle by the variable gain at block 912. Further, similar to block 806 of FIG. 8, the acceleration control rate can be calculated at block 908.

Referring back to FIG. 8, the method 800 includes at block 808 controlling a vehicle control system of the host vehicle. In one embodiment, block 808 can include controlling the vehicle control system of the host vehicle according to the acceleration control rate. For example, the acceleration control rate can be output by the C-ACC control system 300 to the ECU 320 in order to control one or more vehicle systems according to the acceleration control rate. For example, the C-ACC control system 300 via the ECU 320 can begin to automatically decelerate or accelerate the host vehicle 106 based on the acceleration control rate by controlling the brake actuator 608 and/or the throttle actuator 610. Alternatively or simultaneously, with acceleration and/or braking of the host vehicle 106, controlling the vehicle control system of the host vehicle at block 808 can include controlling the vehicle interface system 328. For example, the C-ACC control system 300 can generate information, suggestions, warnings, and/or alerts and provide the same to a driver on display device 510. In other embodiments, tactile feedback can be provided according to the acceleration control rate. For example, the AFP of the acceleration pedal 514 can provide feedback with active force as the driver pushes the acceleration pedal 514 to encourage acceleration and/or deceleration based on the acceleration control rate.

Figure 10:
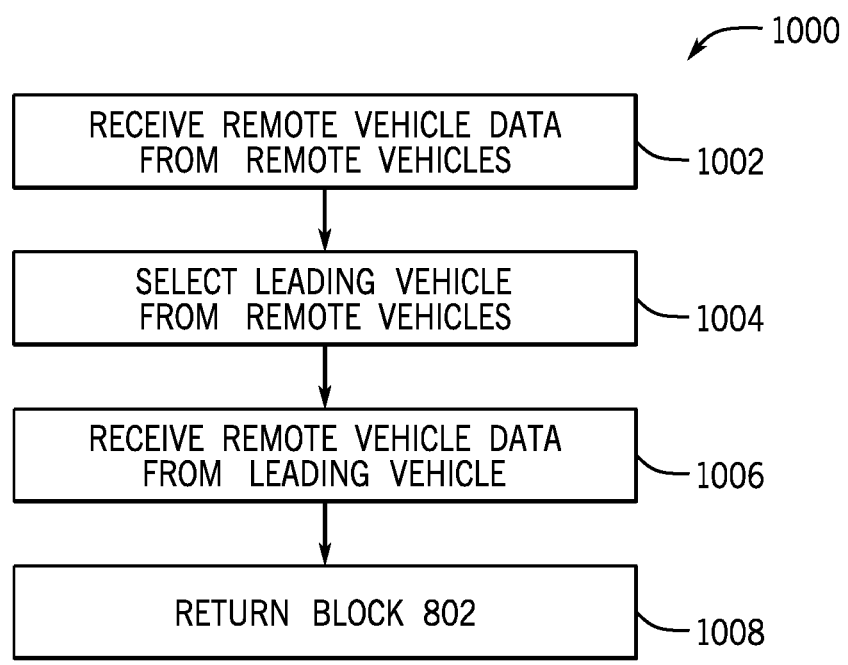
FIG. 10 is a process flow diagram of a method for selecting a leading vehicle according to an exemplary embodiment.

As mentioned above with method 800, the acceleration control rate is based in part on the acceleration rate of a leading vehicle. Appropriate control of the host vehicle can depend on which remote vehicle is identified as the leading vehicle. As will now be described with reference to FIG. 10, in some embodiments, the leading vehicle is selected based on the remote vehicle data, specifically, the V2V remote vehicle data 604 transmitted between the host vehicle 106 and one or more of the remote vehicles 108. FIG. 10 illustrates a method 1000 for selecting a leading vehicle from a plurality of remote vehicles according to an exemplary embodiment. At block 1002, the method 1000 includes receiving remote vehicle data from a plurality of remote vehicles. For example, as discussed above with block 802, the host vehicle 106 is equipped with the V2V transceiver 110 that can communicate with other vehicles operable for V2V communication on the roadway 102.

At block 1004, the method 1000 includes selecting the leading vehicle from the plurality of remote vehicles by selecting the leading vehicle based on the remote vehicle data received at block 1002. In one embodiment, selecting the leading vehicle from the plurality of remote vehicles includes selecting the remote vehicle that has the greatest impact on the operation of the host vehicle and/or the travel path of the host vehicle. The processor 304 can determine which remote vehicle of the plurality of remote vehicles has the greatest impact on the host vehicle based on the V2V remote vehicle data 604 transmitted from the plurality of remote vehicles 108 and host vehicle data 602 about the host vehicle 106. For example, determining which remote vehicle 108 has the greatest impact on the host vehicle 106 can be based on speed, distance, braking, among others.

In one embodiment, selecting the leading vehicle from the plurality of remote vehicles includes selecting the leading vehicle from the plurality of remote vehicles that is within a predetermined headway time threshold from the host vehicle. As an illustrative example with respect to FIG. 1B, the C-ACC control system 300 can set a predetermined headway time threshold, stored for example at the memory 306. In one embodiment, the predetermined headway time threshold is five (5) seconds from the host vehicle 106. Accordingly, in one embodiment, the C-ACC control system 300 selects a leading vehicle from the plurality of remote vehicles in vehicular communication with the host vehicle 106 (e.g., the remote vehicle 108*a*, the 108*b*, the 108*c*) that is within a five second headway time threshold from the host vehicle 106. As an illustrative example, the remote vehicle 108*c* has a three second headway time from the host vehicle 106, the remote vehicle 108*b* has a five second headway time from the host vehicle 106, and the remote vehicle 108*a* has a seven second headway time from the host vehicle 106. According to this example, the leading vehicle would be selected as either the remote vehicle 108*c* or the remote vehicle 108*b*, which are both within a five second headway time from the host vehicle 106.

In another embodiment, selecting the leading vehicle from the plurality of remote vehicles includes selecting the leading vehicle from the plurality of remote vehicles based on a deceleration rate of the plurality of remote vehicles. As discussed herein, the plurality of remote vehicles 108 in vehicular communication with the host vehicle 106 can transmit V2V remote vehicle data 604 including speed data, braking data, acceleration data, and deceleration data. Thus, in one embodiment, the leading vehicle is selected as the remote vehicle 108 having the greatest deceleration rate of the plurality of remote vehicles 108.

In another embodiment, selecting the leading vehicle from the plurality of remote vehicles includes selecting the leading vehicle from the plurality of remote vehicles based on a speed of the plurality of remote vehicles. As discussed herein, the plurality of remote vehicles 108 in vehicular communication with the host vehicle 106 can transmit V2V remote vehicle data 604 including speed data. Thus, in one embodiment, the leading vehicle is selected as the remote vehicle having the lowest speed of the plurality of remote vehicles. As an illustrative example with respect to FIG. 1B, the remote vehicle 108*c* has a speed of 35 mph, the remote vehicle 108*b* has a speed of 25 mph, and the remote vehicle 108*a* has a speed of 15 mph. In this example, the remote vehicle 108*a* would be selected as the leading vehicle based on having the lowest speed.

In another embodiment, selecting the leading vehicle from the plurality of remote vehicles includes selecting the leading vehicle from the plurality of remote vehicles based on a deceleration rate of the plurality of remote vehicles and a speed of the plurality of remote vehicles. In further embodiments, the leading vehicle is the remote vehicle having the lowest speed of the plurality of remote vehicles and that is within a predetermined headway time threshold from the host vehicle. In this embodiment and with reference to the examples discussed above, the remote vehicle 108*b* would be selected as the leading vehicle because the remote vehicle 108*b* is within a predetermined headway time threshold of five seconds from the host vehicle 106 and has the lowest speed out of the remote vehicles 108 that are within the predetermined headway time threshold.

Upon selecting the leading vehicle, at block 1006, the method 1000 includes receiving remote vehicle data from the leading vehicle, for example, an acceleration rate, as described above with block 802. It is understood that the acceleration rate can also be received at block 1002. At block 1008, the method 1000 can return to block 802 of method 800.

Figure 11:
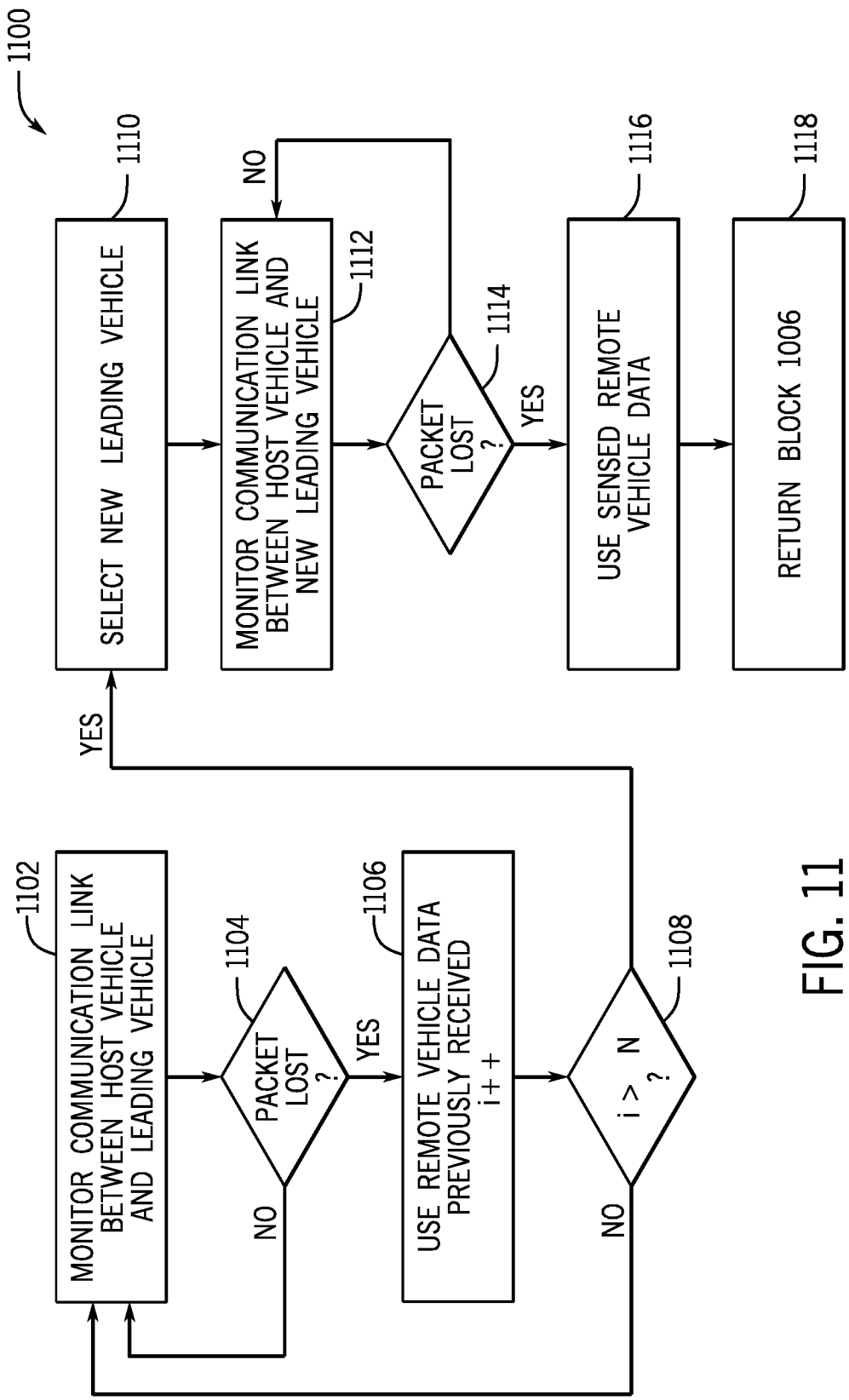
FIG. 11 is a process flow diagram of a method for monitoring a communication link for packet loss between a host vehicle and a remote vehicle according to an exemplary embodiment.

The V2V remote vehicle data 604 received from the leading vehicle is critical in providing an accurate response by the host vehicle 106. In some embodiments, the V2V remote vehicle data 604 could be skewed or unavailable due to vehicle communication network 200 issues or issues with the communication link between the host vehicle 106 and each of the remote vehicles 108. Thus, in some embodiments, selecting a leading vehicle at block 1004 and/or receiving V2V remote vehicle data 604 from the leading vehicle at block 1006 can include methods for monitoring wireless communication connectivity and quality. Referring now to FIG. 11, a method 1100 for monitoring communication between the host vehicle and the leading vehicle will be discussed in detail.

At block 1102, the method 1100 includes monitoring a communication link between the host vehicle and the leading vehicle. As discussed above with block 802 of FIG. 8, to facilitate communication, a communication link is established between the host vehicle 106 and the one or more remote vehicles 108 operable for V2V communication on the roadway 102. For example, in FIG. 2, the communication link 203 is shown between the host vehicle 106 and the remote vehicle 108*a*. The communication link 203 is monitored for packet loss and communication link signal strength. At block 1104, the method 1100 includes determining if a message packet has been lost. DSRC message packets are periodically broadcast to the host vehicle 106 from the leading vehicle 108*a*. In one embodiment, message packets are sent ten times per second. As the host vehicle 106 receives the message packets from the leading vehicle 108*a*, the host vehicle 106 can count and store the message packets via the data logger system 402 and/or the data 310 and processed by the C-ACC computer system 302. By tracking the message packets received, the host vehicle 106 at block 1104 can identify if a packet has been lost. In some embodiments, the host vehicle 106 can determine a packet loss error rate and compare the packet loss error rate to a predetermine threshold. In other embodiments, at block 1104, it is determined if the signal strength of the communication link 203 between the host vehicle 106 and the leading vehicle 108*a* is below a predetermined threshold.

If the determination at block 1104 is YES, the method 1100 proceeds to block 1106. At block 1106, the remote vehicle data from the message packet previously transmitted by the leading vehicle 108*a* is utilized, for example, for calculating an acceleration control rate at block 806 of FIG. 8. A counter i stored by the memory 306 indicating the number of packet losses is also incremented at block 1106.

At block 1108, the counter i is compared to a predetermined threshold N. If the number of lost packets i exceeds the predetermined threshold N, the method 1100 proceeds to block 1110. At block 1110, the method 1100 includes selecting a new leading vehicle. For example, in one embodiment, selecting a new leading vehicle from the plurality of remote vehicles includes selecting the new leading vehicle from the plurality of remote vehicles that is in closest proximity to the current leading vehicle. Referring to FIG. 1B, as an illustrative example, the remote vehicle 108a is the current leading vehicle. Selecting the new leading vehicle can be based on proximity to the current leading vehicle, namely, the remote vehicle 108a. Thus, in FIG. 1B, the processor 304 can select the remote vehicle 108b as the new leading vehicle because the remote vehicle 108b is the remote vehicle in closest proximity to the remote vehicle 108a. It is understood that in some embodiments, selecting the new leading vehicle can based on other factors (e.g., deceleration rate, speed) as described above with block 1004 of FIG. 10.

At block 1112, the method 1100 includes monitoring the communication link between the host vehicle and the new leading vehicle. The communication link between the host vehicle and the new leading vehicle is monitored for packet loss and signal strength, similar to block 1102. Accordingly at block 1114, it is determined if a message packet has been lost. In other embodiments, at block 1114 it is determined if the signal strength of the communication link between the host vehicle and the new leading vehicle is below a predetermined threshold. If the determination at block 1114 is YES, the method 1100 proceeds to block 1116. At block 1116, the processor 304 discards the V2V remote vehicle data 604 received from the leading vehicle (e.g., the new leading vehicle) for purposes of controlling a vehicle control system. For example, the processor 304 can calculate the acceleration control rate based only on host vehicle data 602 and sensed remote vehicle data 606 obtained by on-board sensors (e.g., using the radar system 414). Further, in some embodiments at block 1116, the communication link between the host vehicle 106 and the new leading vehicle 108b can be terminated. Controlling the quality of data as described with FIG. 11 mitigates the effects of skewed or unavailable V2V remote vehicle data 604 on the vehicle control methods described herein.

III. Methods for Hazard Detection

As mentioned above, the systems and methods described herein are generally directed to controlling a vehicle using a vehicle communication network that can include multiple vehicles and infrastructures. In some embodiments, systems and methods discussed herein detect hazards that may pose a threat to the operation and/or the travel path of a host vehicle based in part on vehicular communication with one or more of remote vehicles. Thus, the vehicle communication network 200 and the systems described in FIGS. 2-7 can be used to facilitate hazard detection and vehicle control using V2V communication by providing lane level hazard predictions in real-time.

Figures 12, 13:
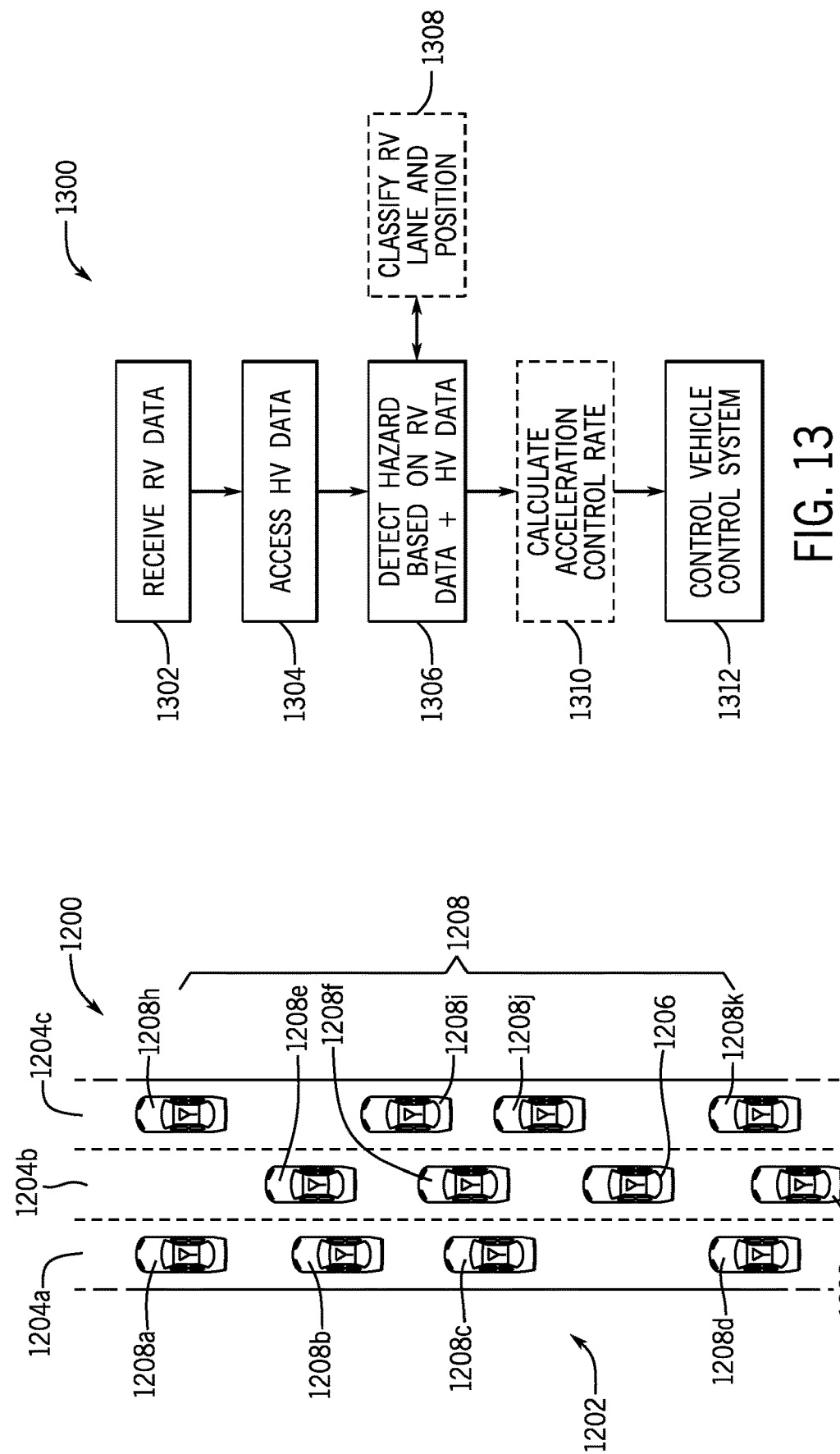
FIG. 12 is a schematic view of an exemplary traffic scenario for hazard detection according to one embodiment.
FIG. 13 is a process flow diagram of a method for detecting a hazard and controlling a vehicle control system according to an exemplary embodiment.

FIG. 12 illustrates an exemplary traffic scenario 1200 that will be used to describe some of the systems and methods for hazard detection discussed herein. The traffic scenario 1200 is a simplified version of the traffic scenario 100 of FIG. 1A. In FIG. 12, the roadway 1202 has a first lane 1204a, a second lane 1204b, and a third lane 1204c. It is understood that the roadway 1202 can have various configurations not shown in FIG. 12, and can have any number of lanes. The roadway 1202 includes a host vehicle 1206 and remote vehicles. For simplicity, the remote vehicles will be generally referred to herein as remote vehicles 1208. Further, for simplicity, the host vehicle 1206 and the remote vehicles 1208 all include V2V transceivers, although they are not individually numbered in FIG. 12. It is understood that the host vehicle 1206 and the remote vehicles 1208 can have the same or similar components and functions as the host vehicle 106 and the remote vehicles 108 discussed above with FIGS. 1A, 1B, 2-7. For example, the host vehicle 1206 can transmit, receive, and/or exchange communications including data, messages, images, and/or other information with other vehicles, user, or infrastructures, using DSRC and the vehicle communication network 200 of FIG. 2.

By using vehicle information from the remote vehicles 1208 surrounding the host vehicle 1206 via DSRC, the host vehicle 1206 gains situational awareness of upcoming hazards and/or can provide better control of vehicle systems in anticipation of upcoming hazards or lane level issues. For example, acceleration and deceleration parameters (e.g., C-ACC computer system 302) can be controlled to smooth braking and eliminate hard braking phantom traffic jams based on upcoming hazards or lane level issues. Accordingly, the dynamics (e.g., motion) of the host vehicle 1206 and/or an interface of the host vehicle 1206 (e.g., the vehicle interface system 328) can be controlled based, in part, on data from DSRC communication with the remote vehicles 1208. Thus, information propagated by the remote vehicles 1208 ahead of and/or behind the host vehicle 1206 provides valuable information to the host vehicle 1206 that can increase safety and provide a smoother driving experience. Detailed systems, methods, and illustrative examples of hazard detection and vehicle control will now be discussed in more detail.

FIG. 13 illustrates a method 1300 for controlling a vehicle control system of a host vehicle using hazard detection. At block 1302, the method 1300 includes receiving remote vehicle data. For example, as discussed above with block 802 of FIG. 8, the host vehicle 1206 is equipped with a V2V transceiver that can communicate with other vehicles operable for V2V communication on the roadway 1202. Thus, the host vehicle 1206 can receive V2V remote vehicle data 604 from remote vehicles 1208 that are equipped for DSRC communication. At block 1304, the method 1300 includes accessing host vehicle data. For example, as discussed with block 804 of FIG. 8 and with FIG. 6, the host vehicle data 602 can be accessed from the vehicle sensor system 322 via the bus 330. At block 1306, the method 1300 includes detecting a hazard based on the remote vehicle data and the host vehicle data. In some embodiments, detecting the hazard includes identifying for each remote vehicle 1208 a longitudinal position (e.g., ahead or behind) with respect to the host vehicle 1206, a lane the remote vehicle 1208 is travelling in with respect to the host vehicle 1206, and for remote vehicles 1208 not in the same lane as the host vehicle 1206, a lateral direction (e.g., left, right) with respect to the host vehicle 1206. Accordingly, in one embodiment, detecting a hazard at block 1306 can include at block 1308, classifying one or more of the remote vehicles 1208 by lane and/or position relative to the host vehicle 1206. Block 1308 will be discussed in further detail herein with respect to FIGS. 14A and 14B.

In FIG. 13 at block 1310, the method 1300 can optionally include calculating an acceleration control rate based on the hazard. In one embodiment, the processor calculates the acceleration control rate for the host vehicle 1206 according to the control model discussed above with respect to equations (1)-(5). For example, in one embodiment, detecting the hazard at block 1306 can include selecting a leading vehicle as described with block 1004 of FIG. 10 in accordance with the hazard. For example, as will be discussed herein, in one embodiment, a remote vehicle having the greatest deceleration rate and/or the lowest (e.g., slowest) speed in a lane can be identified as a hazard. This remote vehicle could be selected as a leading vehicle having the greatest impact on the operation and/or travel path of the host vehicle 1206. Thus, the acceleration rate of this remote vehicle can be used to calculate the acceleration control rate at block 1310. At block 1312, the method 1300 can include controlling a vehicle control system based on the hazard and/or according to the acceleration control rate, similar to block 808 of FIG. 8.

As mentioned above, in some embodiments discussed herein, hazard detection includes identifying for each remote vehicle a longitudinal position (e.g., ahead or behind) with respect to the host vehicle, a lane the remote vehicle is travelling in with respect to the host vehicle, and for remote vehicles not in the same lane as the host vehicle, a lateral direction (e.g., left, right) with respect to the host vehicle. Generally, V2V remote vehicle data 604 received at block 1302 of FIG. 12 is parsed and a position of a remote vehicle and previous positions of the remote vehicle are compared to a position of the host vehicle. Methods for classifying the remote vehicles 1208 by lane and position with respect to the host vehicle 1206 will now be discussed in more detail with reference to FIG. 14A.

Figure 14A:
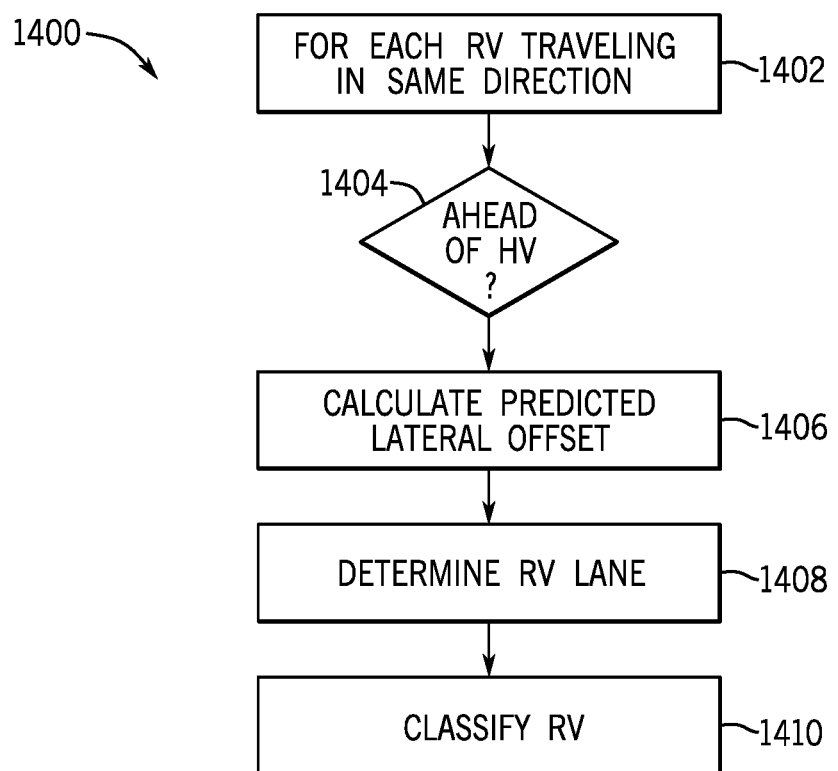
FIG. 14A is a process flow diagram of a method for classifying a remote vehicle according to an exemplary embodiment.

FIG. 14A illustrates a method 1400 for classifying remote vehicles according to an exemplary embodiment. In particular, the method 1400 provides for lane level classification of remote vehicles relative to the host vehicle. For each remote vehicle 1208 travelling in the same direction as the host vehicle 1206 at block 1402, the method 1400 proceeds to block 1404, where it is determined if the remote vehicle is positioned ahead of the host vehicle 1206. More specifically, at block 1404, the processor 304 determines a longitudinal position (e.g., ahead or behind) with respect to the host vehicle 1206. In one embodiment, the processor 304 can use the position data received from the remote vehicles 1208 to determine a longitudinal position. For example, if a remote vehicle azimuth degree is greater than −90 degrees and less than 90 degrees, the remote vehicle is determined to be ahead of the host vehicle 1206. As an illustrative example in FIG. 12, the remote vehicles 1208*a-c*, 1208*e-f*, and 1208*h-j* are ahead of the host vehicle 1206, while the remote vehicles 1208*d*, 1208*g*, and 1208*k* are behind the host vehicle 1206. If the remote vehicle 1208 is ahead of the host vehicle 1206, the method 1400 proceeds to block 1406. At block 1406, the method 1400 includes calculating and/or predicting a predicted lateral offset between the remote vehicle 1208 and the host vehicle 1206. In some embodiments, block 1406 also includes calculating and/or predicting a predicted longitudinal offset between the remote vehicle 1208 and the host vehicle 1206.

Figure 14B:
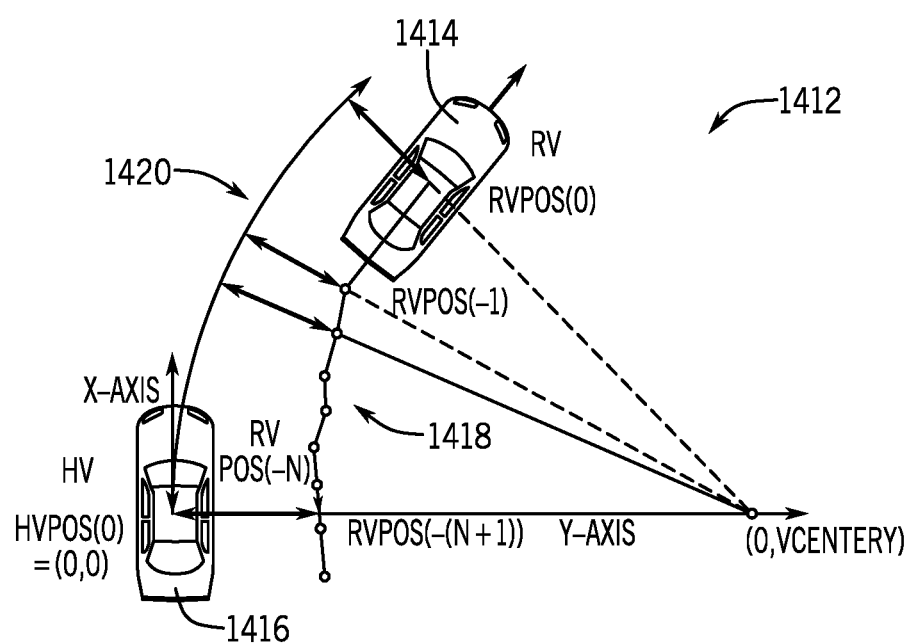
FIG. 14B is a illustrative example used to describe classifying a remote vehicle ahead of the host vehicle of FIG. 14A according to an exemplary embodiment.

Block 1406 will now be described in more detail with FIG. 14B, which is a schematic diagram 1412 of a remote vehicle 1414 ahead of a host vehicle 1416 and travelling in the same direction on a curved roadway 1420. The remote vehicle 1414 and the host vehicle 1416 are shown within an x-axis and y-axis coordinate frame with a reference point (0, VCenterY). In one embodiment, the lateral offset (Predicted LatOffset) and the longitudinal offset (Predicted LongOffset) are predicted using a current position of the host vehicle 1416 (HVvehiclePos(0)) and a remote vehicle path trail 1418 of the remote vehicle 1414. The remote vehicle path trail 1418 is comprised of path history points, which are shown in FIG. 14B as circles along the remote vehicle path trail 1418. The past history points can be remote vehicle data, either received by V2V communication or sensed by the host vehicle 1416, and stored by the host vehicle 1416.

The remote vehicle path trail 1418 is defined by a line segment that joins a current position of the remote vehicle RVPos(0) to consecutive path history points of the remote vehicle RVPos(−1) to remote RVPos(−N), where N is the total number of path history points. In one embodiment, to calculate the longitudinal offset (Predicted LongOffset), a series of longitudinal offset points are determined based on individual line segment distances connecting the current position of the host vehicle 1416 vehiclePos(0) to the closest path history points along the remote vehicle path trail 1418 along the y-axis. If the roadway is curved, as shown in FIG. 14B, longitudinal offset (Predicted LongOffset) can be based on a predicted path 1420 (e.g., arc, radius of the predicted path 1420) and a heading of the host vehicle 1416.

To determine a predicted lateral offset (Predicted LatOffset), in one embodiment, a series of lateral offset points are calculated along the remote vehicle path trail 1418 based on a perpendicular distance between the current position of the host vehicle 1416 and a closest point on the remote vehicle path trail 1418 from the current position of the host vehicle 1416 along the x-axis. For a curved roadway as shown in FIG. 14B, a predicted lateral offset (Predicted LatOffset) can be based on a perpendicular distance between a current position of the remote vehicle 1414 (RVPOS(0)) and a projected arc length of the host vehicle 1416. Additional lateral offset points can be based on the arc length of the remote vehicle path trail 1418.

Figure 14C:
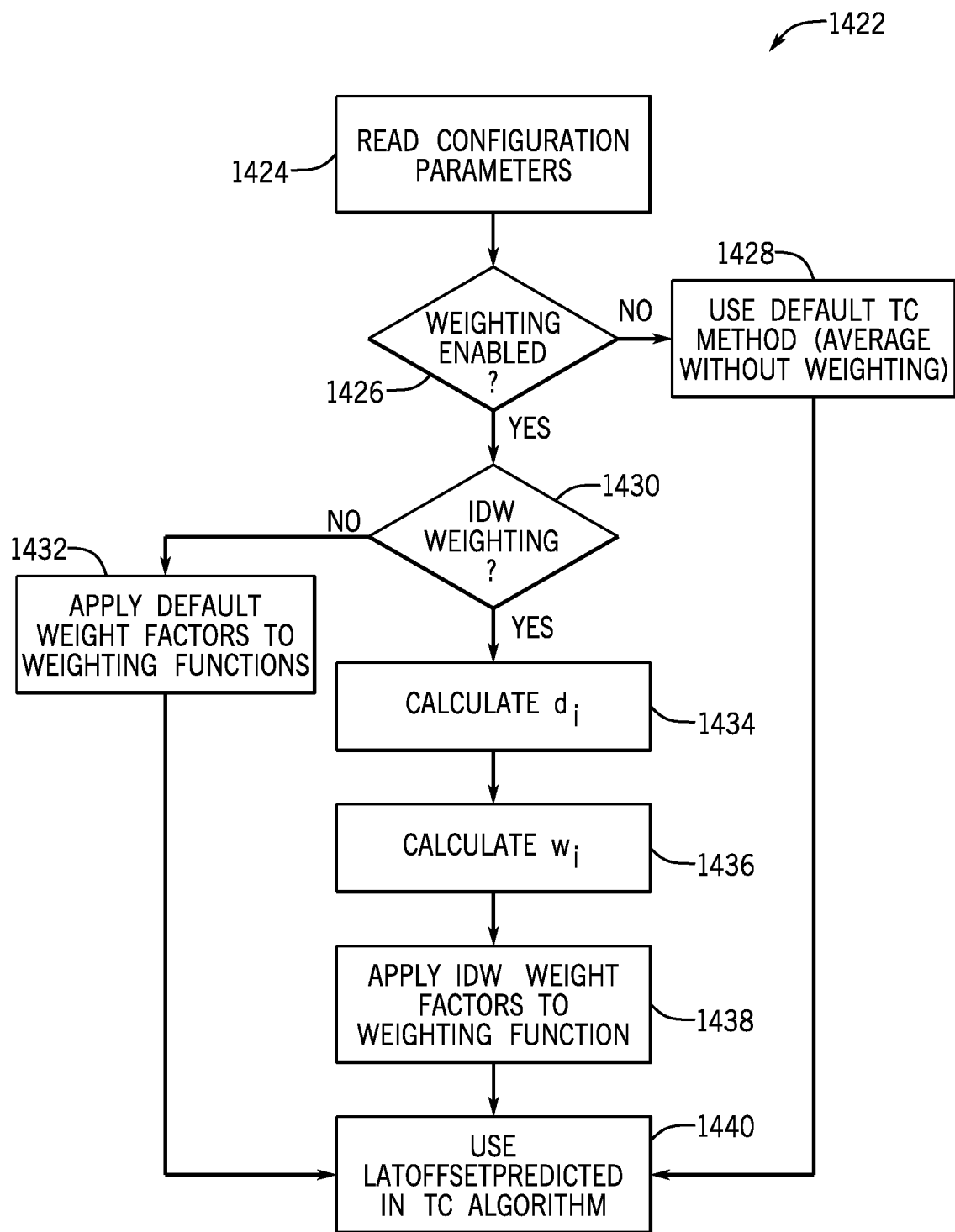
FIG. 14C is a process flow diagram of a method for predicting lateral offset for classifying a remote vehicle according an exemplary embodiment.

Based on the calculated lateral offset points, a predicted lateral offset can be determined. For example, in one embodiment, the predicted lateral offset is determined by averaging each lateral offset point. In another embodiment, calculating the predicted lateral offset considers weighted factors. More specifically, in one embodiment, calculating the predicted lateral offset includes calculating the predicted lateral offset based on one or more perpendicular distances between the current position of the host vehicle and one or more path history points of the remote vehicle, and a distance between consecutive path history points of the remote vehicle and a current position of the remote vehicle. Referring now to FIG. 14C, a detailed method 1422 for predicting lateral offset according to an exemplary embodiment is shown. At block 1424, configuration parameters are read, for example, from a look-up table stored at the data 310. At block 1426, it is determined whether weighting is enabled based on the configuration parameters from block 1424. If weighting is not enabled, the method proceeds to block 1428 and the predicted lateral offset is calculated using averaging as discussed above, without weighting. For example, the predicted lateral offset can be determined by calculating an average of multiple lateral offset points.

If weighting is enabled at block 1426, at block 1430 it is determined if inverse distance weighting (IDW) is enabled based on the configuration parameters from block 1424. IDW provides more significance to path history points closer in two dimensional Euclidean distance to the current position of the remote vehicle. In one embodiment, the weight value can decrease as the distance of the path history points increase from the current position of the remote vehicle. If IDW is not enabled, at block 1432, the predicated lateral offset is calculated using an average with a default weight factor. For example, the default weight factor can be expressed mathematically as:

$$w_i = \frac{1}{i} \qquad (6)$$

If IDW is enabled, the method 1422 proceeds to block 1434 where the two dimensional Euclidean distance between consecutive path history points (e.g., consecutive path history points on the remote vehicle path trail 1418) is calculated according to the following function:

$$di = \sqrt{(x_c - x_1)^2 + (y_c - y_1)^2} + \sum_{n=1}^{i+1} \sqrt{(x_n - x_{n-1})^2 + (y_n - y_{n-1})^2} \quad (7)$$

where $x_c$ is a current x-axis position of the remote vehicle, $y_c$ is a current y-axis position of the remote vehicles, $x_1$ is the remote vehicle most recent path history x-axis position (RVPosX(−1)), $y_1$ is the remote vehicle most recent path history y-axis position (RVPosY(−1)), $x_n$ is the remote vehicle $n^{th}$ path history x-axis position, and $y_n$ is the remote vehicle $n^{th}$ path history y-axis position. The two-dimensional Euclidean distance considers the distance between consecutive path history points of the remote vehicle 1414 and the current position of the remote vehicle 1414. Referring again to FIG. 14C, at block 1436, a weight factor is calculated for the IDW function based on the distance between consecutive path history points as determined at block 1434. In one embodiment, the weight factor can be expressed as:

$$w_i = \frac{1}{d_i^p} \quad (8)$$

where p is a power factor used to control weighting memory. Thus, the weight factor in equation (8) is dependent on the distance between consecutive path history points of the remote vehicle 1414 and the current position of the remote vehicle 1414. For example, in one embodiment, the weight value can decrease as the distance of the path history points increase from the current position of the remote vehicle. Accordingly, at block 1438, the weight factor is applied to calculate the predicted lateral offset. This can be expressed mathematically as:

$$LatOffsetPredicted = \frac{LatOffset_1 + \sum_{k=3}^{M+2} w_{k-2} \cdot LatOffset_k}{1 + \sum_{i=1}^{M} w_i} \quad (9)$$

At block 1440, the predicted lateral offset is used to classify the lane and position of the remote vehicle and the process returns to block 1408 of FIG. 14A. Referring again to FIG. 14A, at block 1408, the method 1400 includes determining and/or assigning a lane to the remote vehicle based on the predicted lateral offset. The lane is determined and/or assigned relative to the host vehicle and can include a directional component with respect to the host vehicle and/or the host vehicle lane. In one embodiment, the remote vehicle lane can be determined based on the predicted lateral offset with respect to the lane widths. Data about the lane widths of the roadway 1202 can be obtained, for example, from map component data 314. The classification can include a lane identifier (e.g., adjacent lane, same lane), a direction of the lane relative to the host vehicle and/or the host vehicle lane (e.g., right, left), and a distance associated with the direction of the lane relative to the host vehicle and/or the host vehicle lane (e.g., far left, far right). The lane assignments and/or lane classifications of the remote vehicle can include, but are not limited to, the same lane as the host vehicle, in a right adjacent lane with respect to the host vehicle, in a right far lane with respect to the host vehicle, in the left adjacent lane with respect to the host vehicle, and in a left far lane with respect to the host vehicle. For example, in FIG. 12, the remote vehicle 1208e is in the same lane (i.e., the second lane 1204b) as the host vehicle 1206, the remote vehicle 1208c is in the left adjacent lane (i.e., the first lane 1204a), and the remote vehicle 1208j is in the right adjacent lane (i.e., the third lane 1204c). It is understood that other types (e.g., discrete values, numerical values, continuous values) of lane classifications can be implemented.

At block 1410, the method 1400 includes classifying the remote vehicle at a lane level relative to the host vehicle. This can be based on the remote vehicle lane determined at block 1408. The classification can include a lane identifier (e.g., adjacent lane, same lane), a direction of the lane relative to the host vehicle and/or the host vehicle lane (e.g., right, left), and a longitudinal position relative to the host vehicle (e.g., ahead, behind). For example, a remote vehicle in the same lane as the host vehicle is classified as in the same lane and ahead of the host vehicle. A remote vehicle in the left adjacent lane is classified in the left adjacent lane and ahead of the host vehicle. A remote vehicle in the right adjacent lane is classified in the right adjacent lane and ahead of the host vehicle. As an illustrative example with respect to FIG. 12, the remote vehicle 1208c can be classified as in the left adjacent lane 1204a and ahead of the host vehicle 1206. It is understood that other types (e.g., discrete values, numerical values, continuous values) of remote vehicle classifications can be implemented. As will be discussed herein, these classifications will be used to facilitate determination of lane level hazards.

Figure 15:
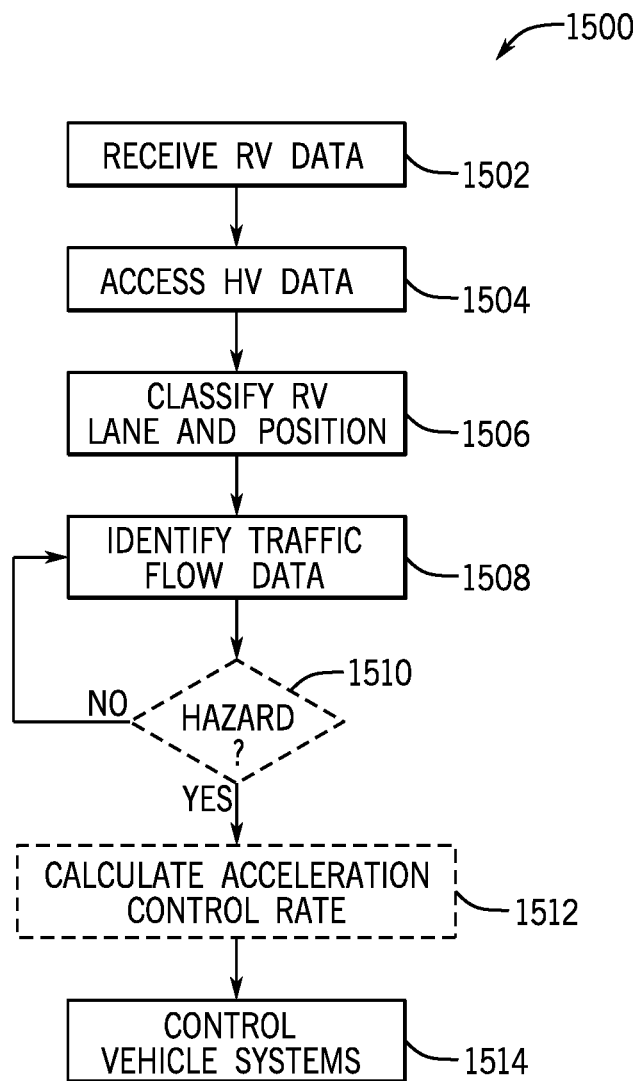
FIG. 15 is a process flow diagram of a method for detecting traffic flow hazards based on vehicle communication and controlling a vehicle control system according to an exemplary embodiment.

Referring now to FIG. 15 an exemplary method 1500 for hazard detection using vehicle communication is shown according to another exemplary embodiment. In one embodiment, the method 1500 can be used for lane level speed hazard detection. Traffic flow condition monitoring helps avoid unnecessary travel delays and stress to drivers, especially in congested traffic scenarios. Using DSRC communication as described herein, lane level speed monitoring with V2V remote vehicle data can help provide a driver of a host vehicle with lane level traffic flow information and/or can be used to control the host vehicle to anticipate and avoid lane level traffic flow issues. FIG. 15 will be described in reference to FIGS. 2-7, 12 and 13. At block 1502, the method 1500 includes receiving remote vehicle data as described above with block 1302 of FIG. 13. Further, at block 1504, the method 1500 includes accessing host vehicle data as discussed above with block 1304 of FIG. 13. At block 1506, the method 1500 includes classifying the lane and position of each remote vehicle with respect to the host vehicle as discussed above with block 1308 of FIG. 13. At block 1508, the method 1500 includes calculating lane level traffic flow data.

In one embodiment, calculating lane level traffic flow data at block 1508 can include determining a traffic flow speed for each lane by averaging the speed of each remote vehicle in each lane ahead of the host vehicle. As an illustrative example, with respect to FIG. 12, a traffic flow speed for the first lane 1204a can be determined by averaging the speed data (e.g., received at block 1502) for remote vehicles 1208a, 1208b, and 1208c, which are in the first lane 1204a and positioned ahead of the host vehicle 1206. Traffic flow speed for the lanes 1204b and 1204c can similarly be determined.

In another embodiment, calculating lane level traffic flow data at block 1508 can include identifying a remote vehicle in each lane having the lowest (e.g., minimum) speed among all remote vehicles in the respective lane. For example, the processor 304 can determine the speed of each remote vehicle ahead of the host vehicle 1206 based on the remote vehicle data received at block 1502. For each lane, the processor 304 determines which remote vehicle has the lowest speed. As an illustrative example, in the first lane 1204*a*, the remote vehicle 1208*a* may have a speed of 45 mph, the remote vehicle 1208*b* may have a speed of 30 mph, and the remote vehicle 1208*c* may have a speed of 35 mph. In this example, the processor 304 identifies the remote vehicle 1208*b* has having the lowest speed in the first lane 1204*a*. Remote vehicles with minimum speed for the lanes 1204*b* and 1204*c* can similarly be determined.

In some embodiments the method 1500 can optionally include at block 1510 determining if a traffic flow hazard is detected based on the traffic flow data. A traffic flow hazard can affect the operation and/or the travel path of the host vehicle 1206. For example, in one embodiment, if a remote vehicle in the same lane as the host vehicle is identified as having a minimum speed that is less than a predetermined threshold, the processor 304 can determined that a hazard exists. In some embodiments, if the determination at block 1510 is NO, the method can return to block 1508. Otherwise, the method 1500 can optionally include at block 1512, calculating an acceleration control rate of the host vehicle. The acceleration control rate can be based on the traffic flow information. For example, the acceleration control rate can be determined based on the control model discussed above with equations (1)-(5). In one embodiment, the leading vehicle can be selected as described at block 1004 of FIG. 10 based on the remote vehicle in the same lane as the host vehicle identified as having the lowest speed and/or the greatest deceleration rate.

At block 1514, the method 1500 includes controlling a vehicle control system based on the traffic flow data and/or the traffic flow hazard. For example, the processor 304 can generate visual feedback on the display 510 illustrating the traffic flow in each lane and/or identifying a remote vehicle as a traffic flow hazard. For example, a graphic showing a remote vehicle in the same lane as the host vehicle identified as having the lowest speed can be highlighted to warn the driver about the potential traffic flow hazard. It is understood that other types of feedback based on the traffic flow data can be provided via the vehicle interface system 328. In other embodiments as described above with block 808 of FIG. 8, one or more vehicle systems 404 can be controlled based on the acceleration control rate and/or the hazard. For example, the acceleration control rate can be output by the C-ACC control system 300 to the ECU 320 in order to control one or more vehicle systems according to the acceleration control rate.

Figure 17:
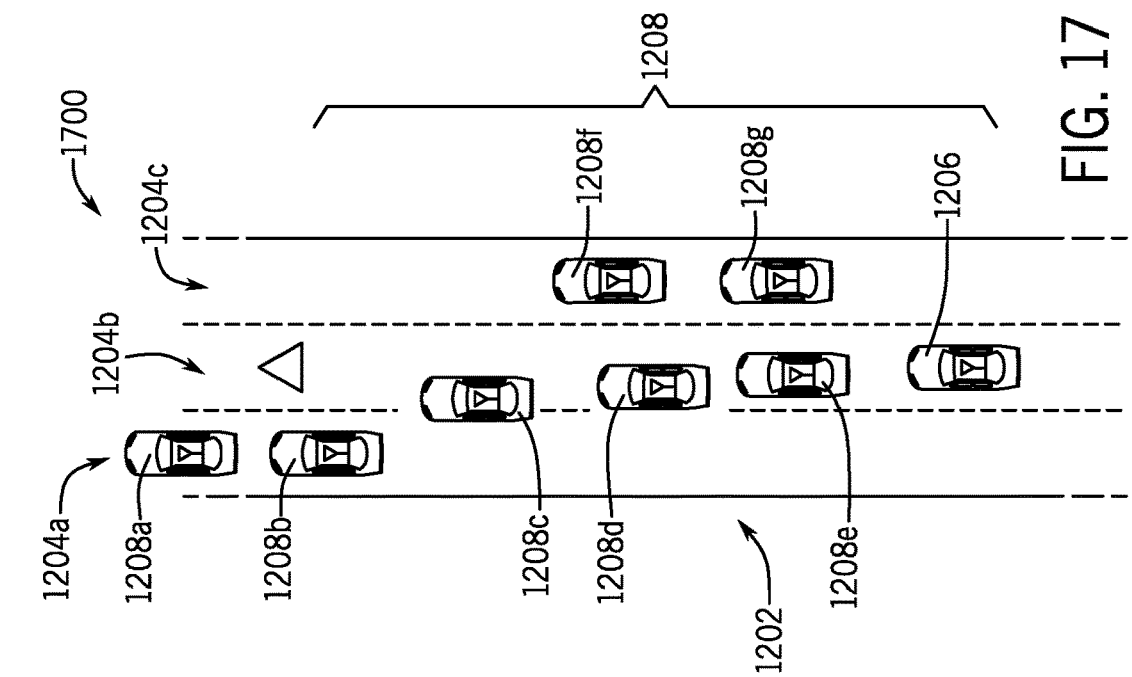
FIG. 17 is a schematic view of a traffic scenario for detecting a hazard according to an exemplary embodiment.
Figure 16:
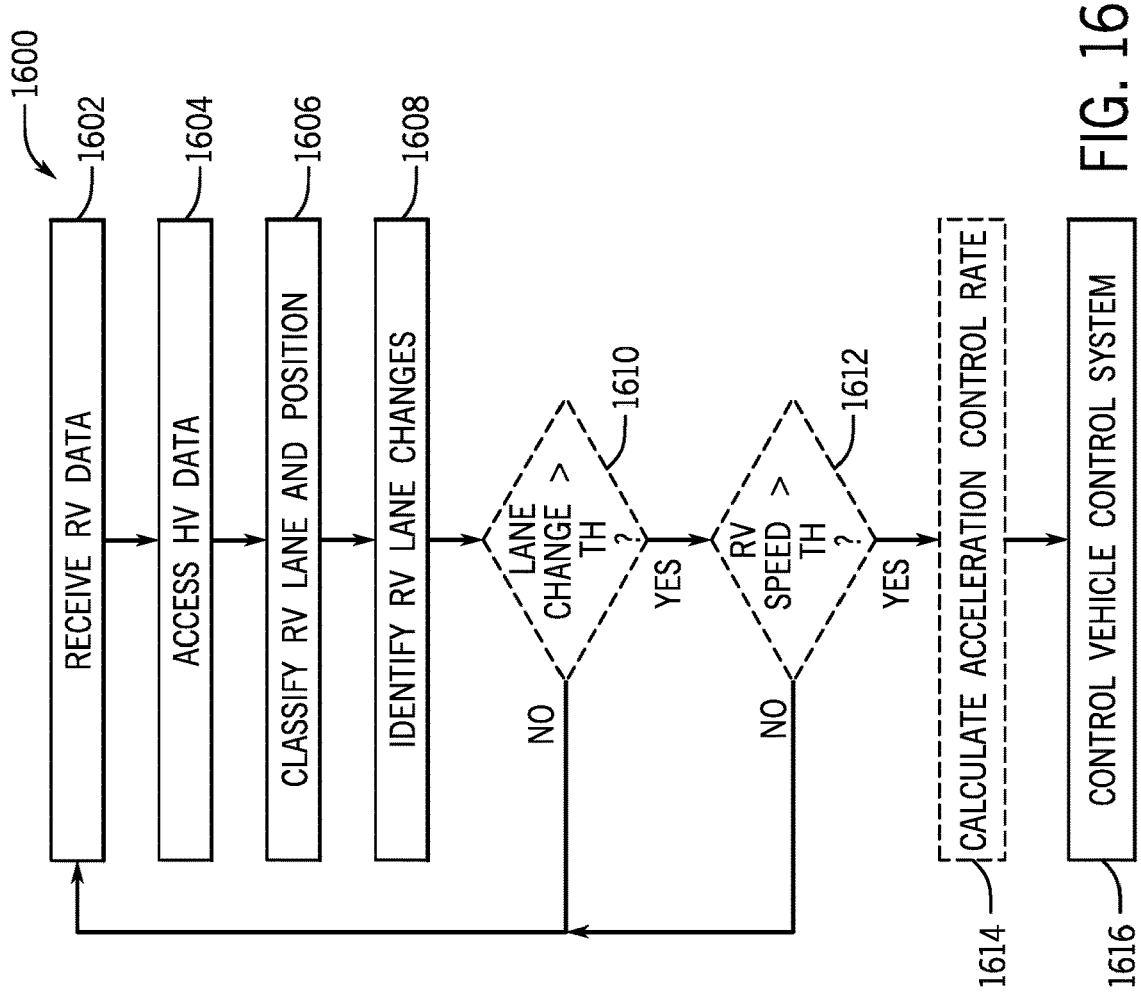
FIG. 16 is a process flow diagram of a method for detecting a hazard based on remote vehicle lane change and controlling a vehicle control system according to an exemplary embodiment.

Another method for hazard detection using vehicle communication will now be described with reference to FIG. 16. Specifically, FIG. 16 shows a method 1600 for hazard detection based on identifying remote vehicle lane changes according to an exemplary embodiment. FIG. 16 will be described with reference to FIGS. 2-7 and 13. At block 1602, the method 1600 includes receiving remote vehicle data as described above with block 1302 of FIG. 13. Further, at block 1604, the method 1600 includes accessing host vehicle data as discussed above with block 1304 of FIG. 13. At block 1606, the method 1500 includes classifying the lane and position of each remote vehicle with respect to the host vehicle as discussed above with block 1308 of FIG. 13 and with FIGS. 14A, 14B, and 14C. In some embodiments, at block 1606, remote vehicles travelling ahead of the host vehicle and in the same lane as the host vehicle are identified (e.g., as classified in FIG. 14A). An illustrative example will be described with respect to FIG. 17, which shows a traffic scenario 1700 similar to the traffic scenario 1200 of FIG. 12. For simplicity, like numerals represent like elements. In FIG. 17, remote vehicles 1208*c*, 1208*d*, and 1208*e* are travelling ahead of the host vehicle 1206 in the same lane as the host vehicle 1206.

Referring again to FIG. 16, at block 1608 the method 1600 includes identifying lane changes of the remote vehicles ahead of the host vehicle. In one embodiment, the processor 304 analyzes the trajectory (e.g., current position and previous position) of each remote vehicle 1208 relative to the host vehicle 1206 trajectory to determine if one or more of the remote vehicles 1208 have changed lanes within a predetermined time window. The processor 304 can predict ongoing lane changes by analyzing a turn signal status of each remote vehicle 1208, relative lateral distance between the remote vehicle 1208 and the host vehicle 1206, lateral acceleration, yaw rate, and heading. In another embodiment, for each remote vehicle 1208 travelling ahead of the host vehicle in the same lane as the host vehicle 1206, it is determined if a turn signal of the remote vehicle 1208 is activated to determine a number of lane changes.

At block 1610, it is determined if the number of active turn signals and/or the number of identified lane changes exceeds a predetermined threshold. If the determination at block 1610 is NO, a hazard is not detected and the method 1600 can proceed back to block 1602. Otherwise, at block 1612, it is determined if the speed of the remote vehicles 108 is less than a predetermined speed threshold. This decrease in speed can indicate that one or more of the remote vehicles 1208 are slowing down in a similar manner prior to changing lanes. If the determination at block 1612 is NO, a hazard is not detected and the method 1600 can proceed back to block 1602. Otherwise, at block 1614, the method 1600 can optionally include calculating an acceleration control rate. In one embodiment, the processor 304 calculates the acceleration control rate for the host vehicle 1206 according to the control model discussed above with respect to equations (1)-(5). Further, at block 1616, the method 1600 can include controlling a vehicle control system of the host vehicle based on the lane changes and/or the acceleration control rate. For example, the processor 304 can generate visual feedback on the display 510 illustrating the hazard and/or providing a notification about the hazard. For example, the processor 304 can generate a graphic that illustrates a potential hazard in the same lane as the host vehicle. The lane and/or hazard can be highlighted to warn the driver about the potential traffic flow hazard. It is understood that other types of feedback based on the traffic flow data can be provided via the vehicle interface system 328. In other embodiments as described above with block 808 of FIG. 8, one or more vehicle systems 404 can be controlled based on the acceleration control rate and/or the hazard. For example, the acceleration control rate can be output by the C-ACC control system 300 to the ECU 320 in order to control one or more vehicle systems according to the acceleration control rate.

IV. Methods for Merge Assist

Figure 18:
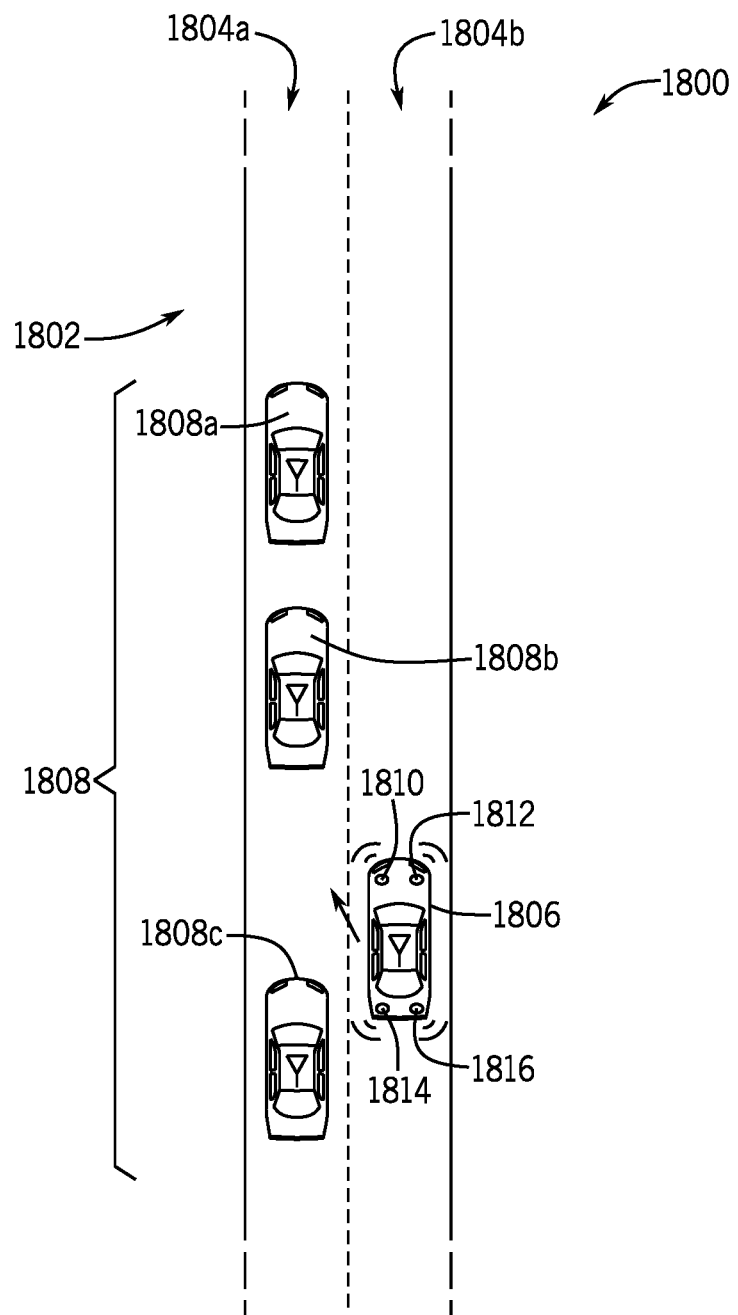
FIG. 18 is a schematic view of an exemplary traffic scenario for merge assist according to one embodiment.

As mentioned above, the systems and methods described herein are generally directed to controlling a vehicle using a vehicle communication network that can include multiple vehicles and infrastructures. In some embodiments, cooperative merge assistance can be provided using a vehicle communication network between vehicles equipped for V2V (e.g., DSRC) communication. For example, DSRC communication can be used to assist a host vehicle merging into a lane with congested traffic. FIG. 18 illustrates an exemplary traffic scenario 1800 that will be used to describe system and methods for cooperative merge assistance. In FIG. 18, the traffic scenario 1800 involves one or more vehicles on a roadway 1802 having a first lane 1804a and a second lane 1804b. It is understood that the roadway 1802 can have various configurations not shown in FIG. 18, and can have any number of lanes.

The traffic scenario 1800 includes a host vehicle 1806 travelling in lane 1804b with an intent to merge into lane 1804a. In some embodiments, the lane 1804a will be referred to as a merging lane. Remote vehicles are travelling in lane 1804a. The remote vehicles will be generally referred to by element number 1808. However, more specifically, the remote vehicles 1808 can be referred to as a remote vehicle 1808a, a remote vehicle 1808b, and a remote vehicle 1808c. In some embodiments, the remote vehicles 1808 can be referred to as a plurality of remote vehicles 1808. Similar to the host vehicle 106 discussed with FIGS. 1A, 1B, and 2-7, the host vehicle 1806 can transmit, receive, and/or exchange communications including data, messages, images, and/or other information with other vehicles, user, or infrastructures, using DSRC. For simplicity, in FIG. 18, the host vehicle 1806 and the remote vehicles 1808 all include V2V transceivers. It is understood that the host vehicle 1806 and the remote vehicles 1808 can include the same or similar components and functions as discussed above with the host vehicle 106 and the remote vehicles 108. Throughout this description of cooperative merge assistance, reference will be made to the components of FIGS. 2-7.

The host vehicle 1806 can include a plurality of midrange radars or other sensing devices that can be part of the radar system 414. In FIG. 18, the plurality of midrange radars may include a front left midrange radar 1810 located at a front left corner area of the host vehicle 1806, a front right midrange radar 1812 located at a front right corner area of the host vehicle 1806, a rear left midrange radar 1814 located at a rear left corner area of the host vehicle 1806, and a rear right midrange radar 1816 located at a rear right corner area of the host vehicle 1806. However, in other embodiments, the plurality of midrange radars can be placed in any suitable position on the host vehicle 1806.

Figure 19:
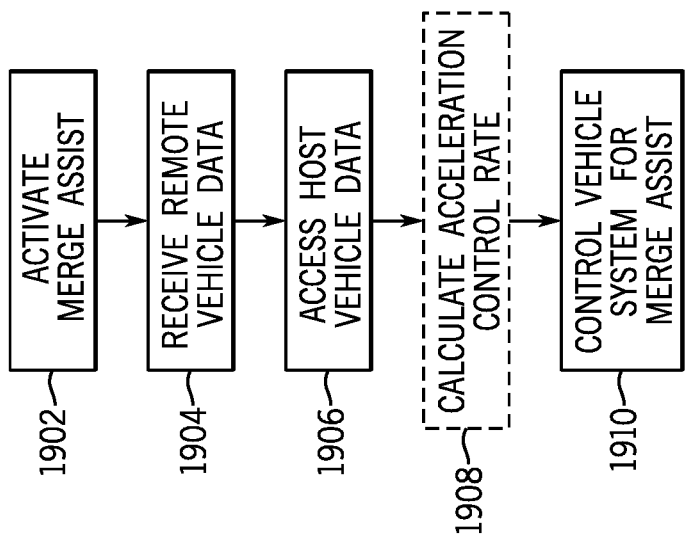
FIG. 19 is a process flow diagram for providing merge assist using a vehicle communication network according to an exemplary embodiment.

Referring now to FIG. 19 a process flow diagram of a method 1900 for providing cooperative merge assistance using a vehicle communication network according to an exemplary embodiment is shown. At block 1902, the method 1900 includes activating a merge assist system (e.g., the vehicle computer system 302). For example, user input (e.g., from a driver) can be received from the input portion of the vehicle interface system 328 to activate a merge assist mode. At block 1904, the method 1900 includes receiving remote vehicle data about one or more remote vehicles, as discussed above with block 802 of FIG. 8. The remote vehicle data can include V2V remote vehicle data 604 from the remote vehicles 1808 and/or sensed remote vehicle data 606 about the remote vehicles 1808. In one embodiment, the processor 304 can receive speed data transmitted from the one or more remote vehicles 1808 travelling in a merge lane (e.g., the lane 1804a) via the vehicle communication network 200. For example, the processor 304 can receive speed data transmitted from the one or more remote vehicles 1808 via the vehicle communication network 200.

Additionally, in some embodiments, position data of the one or more remote vehicles 1808 can be received from a sensor system of the host vehicle 1806 that monitors an area around the host vehicle 1806. For example, the processor 304 can receive position data about one or more of the remote vehicles 1808 via the plurality of midrange sensors (e.g., sensed remote vehicle data 606 from the radar system 414) as discussed above with FIG. 18. At block 1906, the method 1900 includes accessing host vehicle data from the host vehicle. For example, as discussed above with block 804 of FIG. 8, the host vehicle data 602 can be accessed from the vehicle sensor system 322 via the bus 330.

At block 1908, the method 1900 can optionally include calculating an acceleration control rate. In some embodiments, calculating the acceleration control rate can be calculated with some or all of the components shown in equations (1)-(5) and discussed with block 806 of FIG. 8. More specifically, the processor 304 calculates the acceleration control rate for the host vehicle 1808 according to the control model discussed above in equations (1)-(5). In one embodiment, which will be discussed herein, the acceleration control rate of the host vehicle 1806 can be based on an average of the speed data received at block 1904. At block 1910, the method 1900 can include controlling a vehicle system of the host vehicle, similar to block 808 of FIG. 8. For example, in one embodiment, the processor 304 can control the host vehicle 1806 according to the acceleration control rate by providing automatic braking and/or acceleration for speed control based on the acceleration control rate. In some embodiments, the processor 304 can control the vehicle interface system 328 to provide merge assist feedback to the driver of the host vehicle 1806. In other embodiments, an active force pedal (AFP) of the acceleration pedal 514 can be controlled to provide active feedback force to the driver's foot as the driver pushes the acceleration pedal 514. The method 1900 will now be described in more detail with reference to FIGS. 20 and 21.

Figure 20:
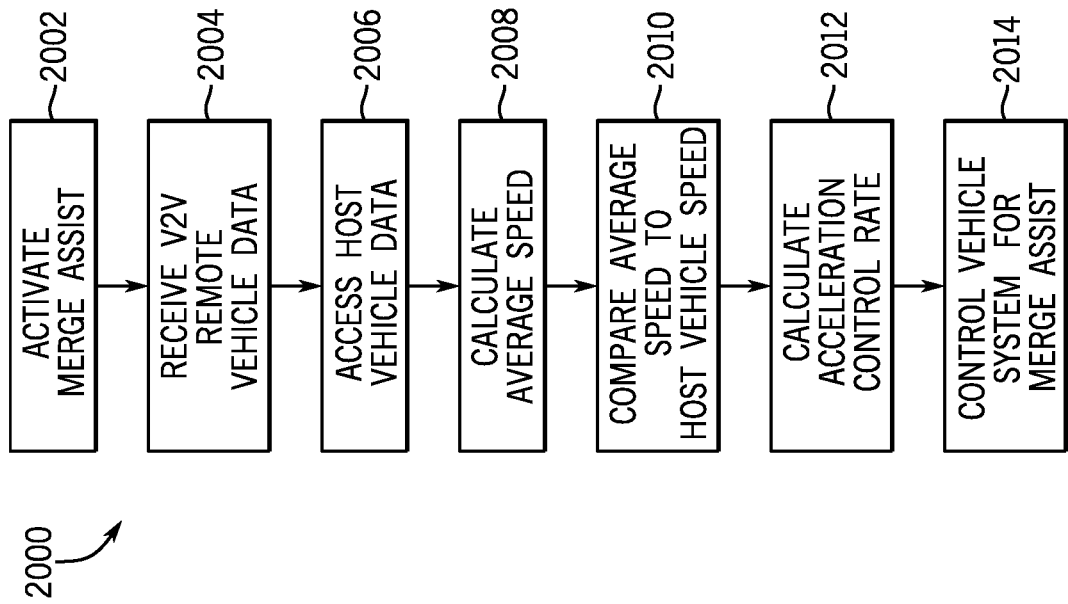
FIG. 20 is a process flow diagram for providing merge assist with speed guidance using a vehicle communication network according to an exemplary embodiment.

In one embodiment, merge assistance is provided to the host vehicle by providing speed guidance. The speed guidance assists the host vehicle 1806 to a proper speed for merging relative to the remote vehicles 1808. FIG. 20 illustrates a method 2000 for speed guidance using the vehicle communication network 200. At block 2002, the method 2000 includes activating a merge assist system similar to block 1902 of FIG. 19. At block 2004, the method 2000 includes receiving V2V remote vehicle data 604 via the vehicle communication network 200. More specifically, the processor 304 can receive speed data transmitted from the one or more remote vehicles 1808 travelling in a merge lane (i.e., the lane 1804a) via the vehicle communication network 200. For example, the processor 304 can receive speed data transmitted from the one or more remote vehicles 1808 via the vehicle communication network 200.

At block 2006, the method 2000 can include accessing host vehicle data from the host vehicle. For example, as discussed above with block 804 of FIG. 8, host vehicle data 602 can be accessed from the vehicle sensor system 322 of the host vehicle 1806 via the bus 330. In one embodiment, the processor 304 accesses and/or retrieves a speed of the host vehicle 1806 and a position of the host vehicle 1806.

At block 2008, the method 2000 includes calculating an average speed of the one or more remote vehicles 1808 that are in the merge lane (i.e., the lane 1804a). The processor 304 can calculate the average speed based on the speed data received from each of the remote vehicles 1808 via the vehicle communication network 200 at block 2004. Additionally, the processor 304 can compare the average speed to the speed of the host vehicle 1806 at block 2010. Based on the comparison, at block 2012, the method 2000 can include calculating an acceleration control rate based on the average speed and/or the comparison between the average speed to the host vehicle 1806. The acceleration control rate can be calculated by the processor 304 to minimize a difference between the average speed of the one or more remote vehicles 1808 and the speed of the host vehicle 1506.

Said differently, the average speed can be used to calculate and/or set a target acceleration rate of the host vehicle 1806. The processor 304 can determine whether the speed of the host vehicle 1806 is above or below the target acceleration rate. For example, if the processor 304 determines the speed of the host vehicle 1806 is less than the target acceleration rate, the processor 304 at block 2014 can control a vehicle system of the host vehicle 1806 to inform the driver and/or automatically control the host vehicle 1806 to increase acceleration, as discuss herein. For example, the processor 304 can send a command based on the comparison to the AFP of the acceleration pedal 514 thereby providing a soft feedback that encourages the driver to provide more acceleration in order to merge into the lane 1804a. Alternatively or in addition, the processor 304 can provide a visual indication to increase acceleration to the vehicle interface system 328. Further, in some embodiments, at block 2014, the processor 304 can output the acceleration control rate to the vehicle system to control motion of the host vehicle 1806 according to the acceleration control rate.

If the processor 304 determines that the speed of the host vehicle 1806 is greater than the target speed of the host vehicle 1806, the processor 304 at block 2014 can send commands to control the AFP of the acceleration pedal 514 to provide active force feedback that simulates a pushing force (e.g., pushing back or against) to the foot of the driver. The active force feedback that simulates the pushing force can be provided with a feedback force that correlates to a difference between the speed of the host vehicle 1806 and the target speed of the host vehicle 1806. Thus, the driver of the host vehicle 1806 is encouraged to accelerate and/or decelerate the host vehicle 1806 with a force that correlates to the difference between the speed of the host vehicle 1806 and the target speed of the host vehicle 1806. Further, the processor 304 can provide a visual indication to decrease and/or increase speed to the vehicle interface system 328. The brightness of the visual indication can be synchronized with the AFP feedback force that is positively correlated to the difference in speed.

Figure 21:
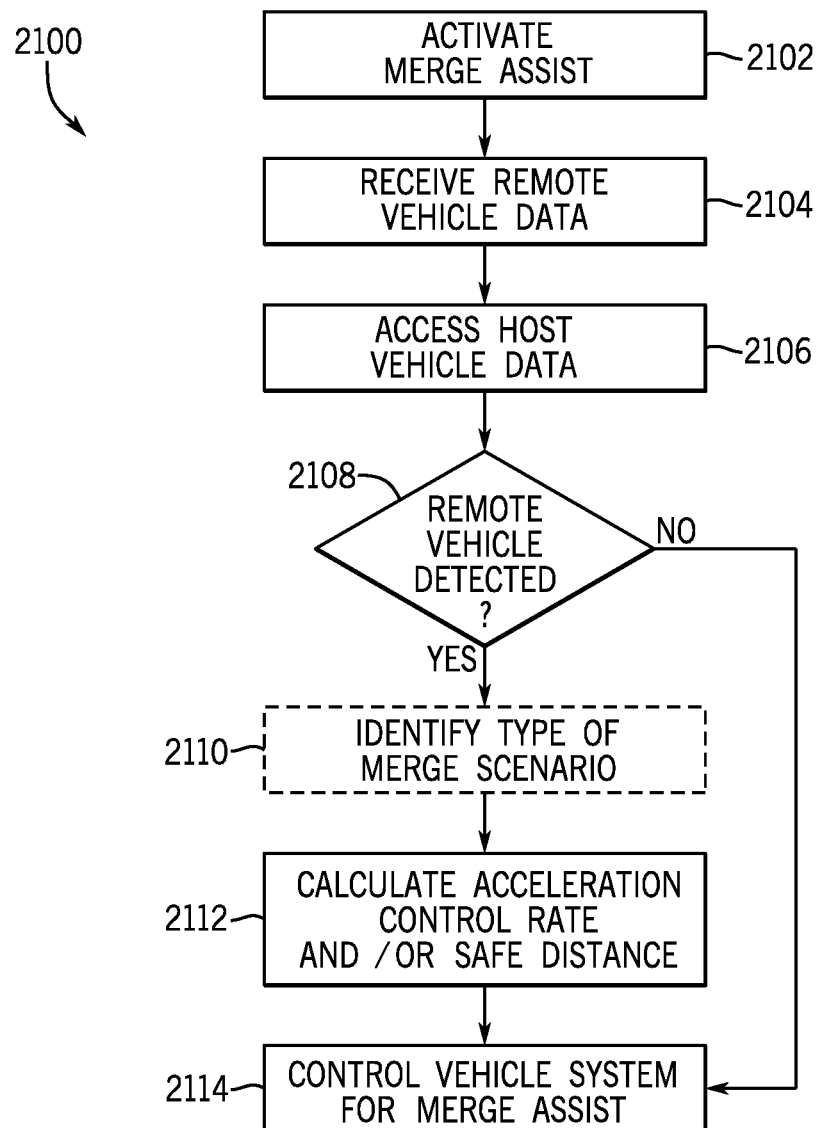
FIG. 21 is a process flow diagram for providing merge assist with position guidance using a vehicle communication network according to an exemplary embodiment.

In addition to providing speed guidance as discussed above with FIG. 20, the systems and methods discussed herein can determine accurate positioning for merge assistance. Referring now to FIG. 21, a method 2100 for merge assistance using position guidance according to an exemplary embodiment is shown. At block 2102, the method 2100 includes activating a merge assist system similar to block 1902 of FIG. 19. At block 2104, the method 2100 includes receiving remote vehicle data. In one embodiment, the processor 304 can receive V2V remote vehicle data 604 (e.g., speed data) as discussed above at block 2004 of FIG. 20. Further, in this embodiment, the processor 304 can receive sensed remote vehicle data 606. More specifically, the processor 304 can receive position data about one or more of the remote vehicles 1808 via the plurality of midrange sensors (e.g., sensed remote vehicle data from the radar system 414). Additionally, the method 2100 at block 2106 can include accessing host vehicle data 602 as discussed above with block 804 of FIG. 8.

At block 2108, it is determined if any objects (e.g., remote vehicles 1808, hazards) are detected based on the sensed remote vehicle data 606. More specifically, the processor 304 determines if one or more remote vehicles 1808 are in an area around the host vehicle 1806 based on the position data. If the determination at block 2108 is NO, the method 2100 can proceed to block 2114 to control the vehicle system 404 of the host vehicle 1806 based on the position data. For example, FIG. 22A illustrates a traffic scenario 2202 which is a simplified illustration of the traffic scenario 1800 including the host vehicle 1806. In this example, no radar objects (e.g., remote vehicles, hazards) are detected in the merge lane 1804a. Accordingly, the processor 304 can control the vehicle interface system 328 to provide a visual indication that it is safe to merge the host vehicle 1806 into the merge lane 1804a. For example, the vehicle interface system 328 can provide a green light on the display 510. In other embodiments, the processor 304 may control one or more vehicle systems 404 to assist the driver and/or the host vehicle 1806 to merge in to the merge lane 1804a.

Figure 22F:
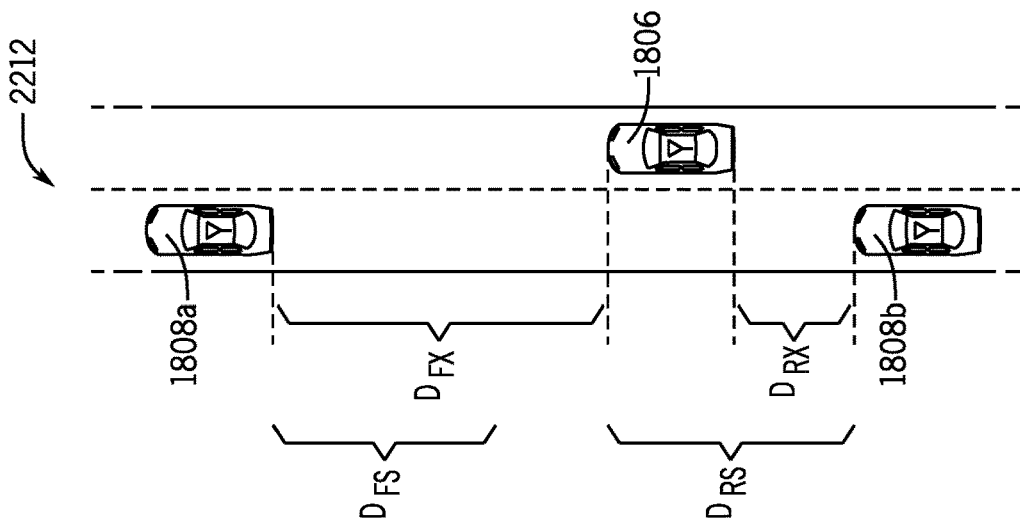
FIG. 22F is an illustrative embodiment of the host vehicle in between scenario according to a rear safe distance, according to an exemplary embodiment.
Figure 22E:
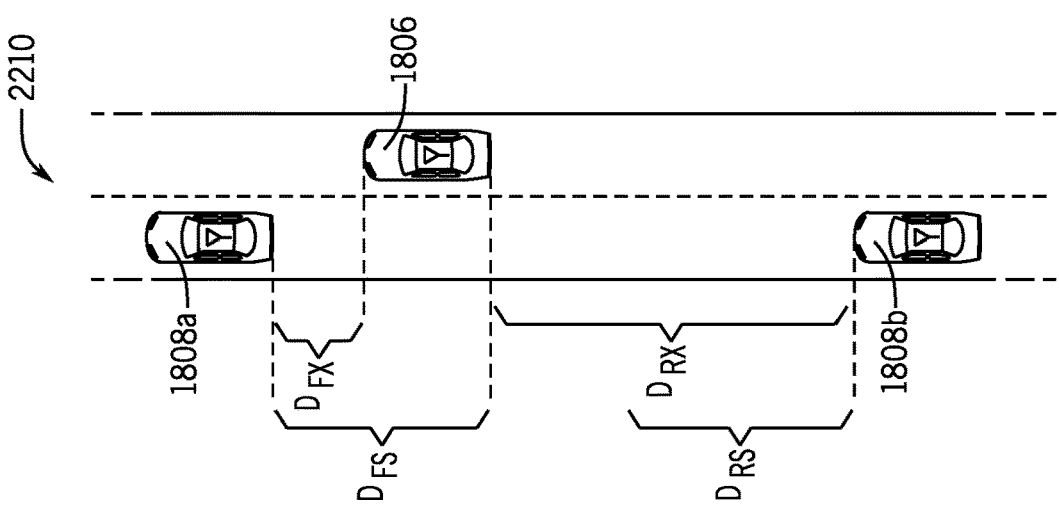
FIG. 22E is an illustrative embodiment of the host vehicle in between scenario according to a front safe distance, according to an exemplary embodiment.
Figure 22D:
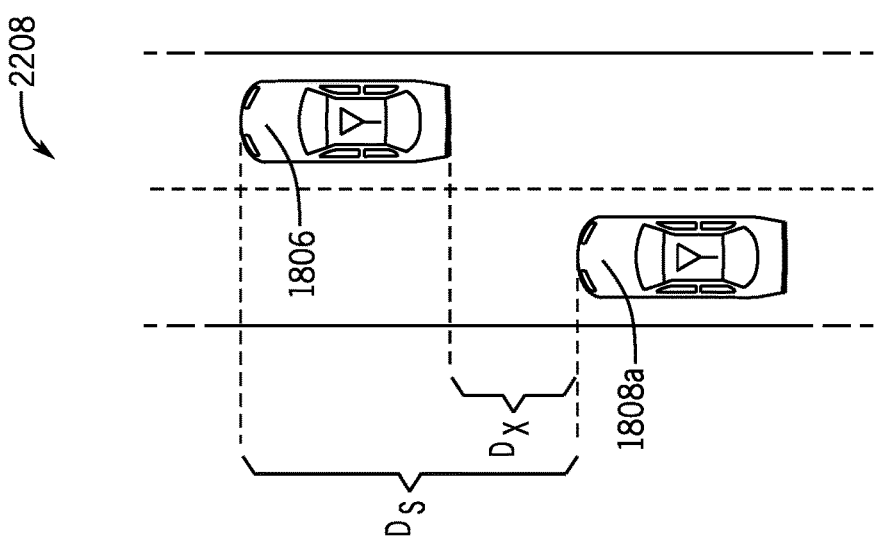
FIG. 22D is an illustrative embodiment of the host vehicle at lead merge scenario, according to an exemplary embodiment.

Referring again to FIG. 21, if the determination at block 2108 is YES, the method 2100 can optionally proceed to block 2110 to identify a type of merge scenario based on a relative position of the host vehicle 1806 to the one or more remote vehicles 1808. In one embodiment, the vehicle computer system 302 stores merge model data 318. The merge model data 318 can be used to identify the type of merge scenario. Thus, control of the vehicle systems 404 implemented at block 2114 can be based, in part, on the type of merge scenario. Additionally, in some embodiments, the remote vehicle classification method described in FIGS. 13, 14A, and 14C can be used to identify and classify the type of merge scenario. In one embodiment, the type of merge scenario is one of: a side by side merge scenario as shown in FIG. 22B, a tail merge scenario as shown in FIG. 22C, a lead merge scenario as shown in FIG. 22D, or an in-between merge scenario as shown in FIGS. 22E and 22F. Each of these scenarios will be discussed in more detail herein.

At block 2112, the method 2100 can optionally include calculating an acceleration control rate and/or calculating a safe distance for merging into the lane based on a relative position of the host vehicle 1206 to the one or more remote vehicles 1808, a speed of the host vehicle 1806, and a speed of the one or more remote vehicles 1808. In some embodiments, the acceleration control rate and/or the safe distance is also calculated based on the type of merge scenario determined at block 2112. It is understood that in some embodiments, calculating the acceleration control rate can be implemented using equations (1)-(5) discussed above.

With reference to FIG. 22B, a side by side merge scenario 2204 is shown. More specifically, at least one of the remote vehicles, namely, the remote vehicle 1808a is located adjacent to the host vehicle 1806 in the merge lane 1804a. The remote vehicle 1808a is detected based on the sensed remote vehicle data 606 received at block 2104. In this example, based on the type of merge scenario, at block 2112, the processor 304 can calculate an acceleration control rate to slow down the host vehicle 1806. The processor 304, at block 2114, can control a braking system based on the acceleration control rate by providing a deceleration rate. In one embodiment, the deceleration rate is 0.08 G. Alternatively and/or in addition to the automatic braking control, the processor 304 can provide a visual indication to the vehicle interface system 328 to alert and/or encourage an increase in acceleration to merge. For example, a visual indication can be provided on the display 510 to advise the driver of the host vehicle 1806 to slow down by providing a red colored lighting indication. The red color lighting indication could also indicate to the driver that it is not acceptable to merge into the merge lane 1804a. Additionally, the processor 304 can control the AFP by providing a large counter feedback force. In one embodiment, the large counter feedback force may include a 100% counter force.

Referring again to FIG. 21, as mentioned above, at block 2112, the method 2100 can also include determining a safe distance for merging into the merge lane. In one embodiment, the safe distance is a safe boundary for the host vehicle 1806 to merge into the merge lane 1804a based on one or more remote vehicles 1808 in the merge lane 1804a. In some embodiments, the safe distance is based on the type of merge scenario identified at block 2110. With reference to FIG. 22C, a tail merge scenario 2206 according to an exemplary embodiment is shown. Here, the host vehicle 1806 is positioned adjacent (e.g., in the adjacent lane) to the remote vehicle 1808a and at the tail end of the remote vehicle 1808a. In one embodiment, the processor 304 determines the host vehicle 1806 is positioned to the side (e.g., adjacent) of the remote vehicle 1808a and at the tail end of the remote vehicle 1808a and can identify the type of merge scenario as a tail merge scenario based on the merge models 318. Based on the type of merge scenario, at block 2112, the processor 304 calculates an acceleration control rate to slow down the host vehicle 1806.

In another embodiment, the processor 304 determines a safe distance for the host vehicle 1806 to merge into the merge lane 1804a according to the following equation:

$$DS = m + 1.5s*(V_{HV} - V_{RV}) \qquad (10)$$

where m is a constant variable in meters, $V_{HV}$ is a speed of the host vehicle 1806, and $V_{RV}$ is a speed of the remote vehicle 1808a. In some embodiments, the safe distance is limited to a predetermined range, that can be based in part on the merge type. For example, for a tail merge scenario, between 4 and 25 meters. In one illustrative example, the constant variable m is 5 m. However, in some embodiments, the safe distance equation (10) shown above can be based on the speed of the host vehicle 1806 and the speed of the remote vehicle 1808a. For example, if the processor 304 determines the speed of the host vehicle 1806 is greater than the speed of the remote vehicle 1808a, the constant variable m can be increased (e.g., from 5 m to 10 m) resulting in a larger safe distance. However, if the speed of the host vehicle 1806 is less than the speed of the remote vehicle 1808a, the constant variable m can be decreased (e.g., from 5 m to 2 m) resulting in a smaller safe distance.

In one embodiment, the processor 304 determines an actual distance $D_X$ between the host vehicle 1806 and the remote vehicle 1808a as shown in FIG. 22C. The processor 304 can compare the actual distance to the safe distance. If the actual distance is less than the safe distance, then the processor 304 determines it is not safe for the host vehicle 1806 to merge into the lane 1804a because there is a risk of collision between the host vehicle 1806 and the remote vehicle 1808a. Accordingly, in one embodiment, at block 2114, the processor 304 can control the vehicle interface system 328 to provide feedback to slow down the host vehicle 1806. For example, a visual indication can be provided on the display 510 indicating it is not safe to merge. Otherwise, if the processor 304 determines the actual distance is greater than the safe distance, the processor 304 determines it is safe for the host vehicle 1806 to merge into the lane 1804a. The processor 304 can control the vehicle interface system 328 to provide feedback that it is safe to merge into the lane 1804a. For example, the processor 304 can control the display 510 to display a green light indicator.

In another embodiment, calculating the safe distance at block 2112 can also include calculating a control value for controlling a vehicle system. For example, upon determining the actual distance between the host vehicle 1806 and the remote vehicle 1808a is less than the safe distance, the processor 304 can calculate a control value as a function of a difference between the actual distance and the safe distance. In one embodiment, the control value is calculated according to the following equation:

$$CV = \frac{D_X - [5m + 1.5s*(V_{HV} - V_{RV})]}{5m} \qquad (11)$$

The control value can be saturated to a predetermined range. In one example, the control value is saturated to a range of −1 to 0. The control value can be used to control one or more of the vehicle systems 404 at block 2114. For example, upon determining the actual distance is less than the safe distance, the processor 304 can calculate an acceleration control rate, based in part on the control value. As another example, the processor 304 can control the display 510 to provide a red colored light with a brightness that can be modified and/or adjusted based on the control value. For example, the brightness of the red colored light can increase as the control value increases. Thus, the closer the host vehicle 1806 is to the remote vehicle 1808a, the higher the control value and/or the stronger the feedback. In another embodiment, the AFP counter force (e.g., feedback force) can be adjusted and/or modified based on the control value. The AFP feedback force can increase as the control value increases.

Referring now to FIG. 22D, a lead merge scenario 2208 is shown according an exemplary embodiment. Here, the host vehicle 1806 is positioned to the side (e.g., in the adjacent lane) of the remote vehicle 1808a and at the front end of the remote vehicle 1808a. In one embodiment, the processor 304 determines the host vehicle 1806 is positioned to the side of the remote vehicle 1808a and at the front end of the remote vehicle 1808a, and can identify the type of merge scenario as a lead merge scenario based on the merge model 318. In some embodiments, the processor 304 can calculate an acceleration control rate to speed up the host vehicle 1806 based on the type of merge scenario.

In another embodiment, the processor 304 determines a safe distance for the host vehicle 1806 to merge into the merge lane 1804a according to the following equation:

$$DS = m + 1.5s*(V_{HV} - V_{RV}) \qquad (12)$$

where m is a constant variable in meters, $V_{HV}$ is a speed of the host vehicle 1806 and $V_{RV}$ is a speed of the remote vehicle 1808a. In some embodiments, the safe distance is limited to a predetermined range. For example, between 5 and 12 meters. In one illustrative example, the constant variable m is 8 m. However, in some embodiments, the safe distance equation shown above can be based on the speed of the host vehicle 1806 and the speed of the remote vehicle 1808a. For example, if the processor 304 determines the speed of the host vehicle 1806 is greater than the speed of the remote vehicle 1808a, the constant variable m can be increased (e.g., from 8 m to 12 m) resulting in a larger safe distance. However, if the speed of the host vehicle 1806 is less than the speed of the remote vehicle 1808a, the constant variable m can be decreased (e.g., from 8 m to 4 m) resulting in a smaller safe distance.

In one embodiment, the processor 304 determines an actual distance $D_X$ between the host vehicle 1806 and the remote vehicle 1808a as shown in FIG. 22D. The processor 304 can compare the actual distance to the safe distance. If the actual distance is less than the safe distance, then the processor 304 determines it is not safe for the host vehicle 1806 to merge into the lane 1804a because there is a risk of collision between the host vehicle 1806 and the remote vehicle 1808a. Accordingly, in one embodiment, at block 2014, the processor 304 can control the vehicle interface system 328 to provide feedback to increase the speed of the host vehicle 1806. For example, a visual indication can be provided on the display 510 indicating it is not safe to merge. Otherwise, if the processor 304 determines the actual distance is greater than the safe distance, the processor 304 determines it is safe for the host vehicle 1806 to merge into the lane 1804a. In this scenario, the processor 304 can control the vehicle interface system 328 to provide feedback that it is safe to merge into the lane 1804a. For example, the processor 304 can control the display 510 to display a green light indicator.

In another embodiment, calculating the safe distance at block 2112 can also include calculating a control value for controlling the vehicle system. For example, upon determining the actual distance between the host vehicle 1806 and the remote vehicle 1808a is less than the safe distance, the processor 304 can calculate a control value as a function of a difference between the actual distance and the safe distance. In one embodiment, the control value is calculated according to the following equation:

$$CV = \frac{D_X - [8m + 1.5s*(V_{HV} - V_{RV})]}{8m + 1.5s*(V_{HV} - V_{RV})} \tag{13}$$

The control value can be saturated according to a predetermined range. For example, in one embodiment, the control value is saturated to a range of −1 to 0. The control value can be used to control one or more vehicle systems 404 at block 2114. For example, upon determining the actual distance is less than the safe distance, the processor 304 can calculate an acceleration control rate, based in part on the control value. As another example, the processor 304 can control the display 510 to provide a blue colored light with a brightness that can be modified and/or adjusted based on the control value. For example, the brightness of the blue colored light can increase as the control value increases. Thus, the closer the host vehicle 1806 is to the remote vehicle 1808a, the higher the control value and the stronger the feedback.

With reference to FIGS. 22E and 22F, an in-between merge scenario 2210 and 2212 according to an exemplary embodiment is shown. In FIG. 22E, the host vehicle 1806 is positioned is positioned adjacent (e.g., in the adjacent lane) to the remote vehicles 1808a and 1808b and in-between the remote vehicles 1808a and 1808b. In this embodiment, at block 2112, the processor 304 calculates a safe distance based on a front safe distance from the host vehicle 1806 to the remote vehicle 1808a and a rear safe distance from the host vehicle 1806 to the remote vehicle 1808b. More specifically, the front safe distance is calculated according to the following equations:

$$\text{Front}_{DS} = m + 1.5s*(V_{HV} - V_{RVF}) \tag{14}$$

where m is a constant variable in meters, $V_{HV}$ is a speed of the host vehicle 1806 and $V_{RVF}$ is a speed of the front remote vehicle 1808a. In some embodiments, the safe distance is limited to a predetermined range, that can be based in part, on the merge type. For example, for an in-between scenario as shown in FIG. 22E, the safe distance can be limited between 4 and 20 meters. In one embodiment, the processor 304 determines an actual front distance $D_{FX}$ between the host vehicle 1806 and the front remote vehicle 1808a. The processor 304 can compare the actual front distance to the front safe distance. If the actual front distance is less than the safe front distance, then the processor 304 determines it is not safe for the host vehicle 1806 to merge into the lane 1804a because there is a risk of collision between the host vehicle 1806 and the front remote vehicle 1808a. Accordingly, in one embodiment, at block 2114, the processor 304 can control the vehicle interface system 328 to provide feedback to slow down the host vehicle 1806. For example, a visual indication can be provided on the display 510 indicating it is not safe to merge.

In another embodiment, calculating the safe distance at block 2112 can also include calculating a control value for controlling the vehicle system. For example, upon determining the actual front distance between the host vehicle 1806 and the front remote vehicle 1808a is less than the safe front distance, the processor 304 can calculate a control value as a function of a difference between the actual front distance and the safe front distance. In one embodiment, the control value is calculated according to the following equation:

$$\text{Front}_{CV} = \frac{D_{FX} - [5m + 1.5s*(V_{HV} - V_{RVF})]}{5m} \tag{15}$$

The control value can be saturated to a predetermined range. In one example, the control value is saturated to a range of −1 to 0. The control value can be used to control one or more vehicle systems 404 at block 2114. For example, upon determining the actual front distance is less than the safe distance, the processor 304 can calculate an acceleration control rate, based in part on the control value. As another example, the processor 304 can control the display 510 to provide a red colored light with a brightness that can be modified and/or adjusted based on the control value. For example, the brightness of the red colored light can increase as the control value increases. Thus, the closer the host vehicle 1806 is to the front remote vehicle 1808a, the higher the control value and the stronger the feedback. In another embodiment, the AFP counter force (e.g., feedback force) can be adjusted and/or modified based on the control value. The AFP feedback force can increase as the control value increases.

With reference to in-between merge scenario 2212 of FIG. 22F, the host vehicle 1806 is closer to the rear remote vehicle 1808b than the front remote vehicle 1808a. This is in contrast to the in-between merge scenario 2210 of FIG. 22E where the host vehicle 1806 was closer to the front remote vehicle 1808a than the rear remote vehicle 1808b. In the embodiment of FIG. 22F, at block 2112, the processor 304 calculates a safe distance based on a rear safe distance from the host vehicle 1806 to the rear vehicle 1808b. More specifically, the rear safe distance is calculated according to the following equations:

$$\text{Rear}_{DS} = m + 1.5s*(V_{HV} - V_{RVR}) \tag{16}$$

where m is a constant variable in meters, is a speed of the host vehicle 1806 and $V_{RVR}$ is a speed of the rear remote vehicle 1808b. In some embodiments, the safe distance is limited to a predetermined range, that can be based in part, on the merge type. For example, for an in-between scenario as shown in FIG. 22F, the safe distance can be limited between 5 and 8 meters. In one embodiment, the processor 304 determines an actual rear distance $D_{RX}$ between the host vehicle 1806 and the rear remote vehicle 1808b as shown in FIG. 22F. The processor 304 can compare the actual rear distance to the rear safe distance. If the actual rear distance is less than the safe rear distance, then the processor 304 determines it is not safe for the host vehicle 1806 to merge into the lane 1804*a* because there is a risk of collision between the host vehicle 1806 and the rear remote vehicle 1808*b*. Accordingly, in one embodiment, at block 2114, the processor 304 can control the vehicle interface system 328 to provide feedback to increase the speed of the host vehicle 1806. For example, a visual indication can be provided on the display 510 indicating it is not safe to merge.

In another embodiment, calculating the safe distance at block 2112 can also include calculating a rear control value for controlling the vehicle system. For example, upon determining the actual rear distance between the host vehicle 1806 and the rear remote vehicle 1808*a* is less than the rear safe distance, the processor 304 can calculate a control value as a function of a difference between the actual rear distance and the safe rear distance. In one embodiment, the control value is calculated according to the following equation:

$$\text{Rear}_{CV} = \frac{D_X - [8m + 1.5s*(V_{HV} - V_{RV})]}{8m + 1.5s*(V_{HV} - V_{RV})} \quad (17)$$

The control value can be saturated to a predetermined range. In one example, the control value is saturated to a range of −1 to 0. The control value can be used to control one or more vehicle systems 404 at block 2114. For example, upon determining the actual rear distance is less than the rear safe distance, the processor 304 can calculate an acceleration control rate, based in part on the control value. As another example, the processor 304 can control the display 510 to provide a blue colored light with a brightness that can be modified and/or adjusted based on the control value. For example, the brightness of the blue colored light can increase as the control value increases. Thus, the closer the host vehicle 1806 is to the rear remote vehicle 1808*b*, the higher the control value and the stronger the feedback.

Based on the equations above, if the processor 304 determines that the actual rear distance is greater than the rear safe distance and the actual front rear distance is greater than the front safe distance, the processor 304 determines that it is safe for the host vehicle 1806 to merge into the lane 1804*a*. The processor 304 can control the vehicle interface system 328 to provide feedback that it is safe to merge into the lane 1804*a*. For example, the processor 304 can control the display 510 to display a green light indicator.

V. Methods for Vehicle Control in Tailgating Scenarios

The systems and methods discussed above can also be applied to a tailgating scenario. During a tailgating scenario, a following vehicle is driving closely behind a host vehicle such that the distance (e.g., headway distance) between the two vehicles does not guarantee that a collision can be avoided when either vehicle stops. At highway speeds, it is recommended that the headway distance between a host vehicle and a following vehicle be maintained by a distance, measured in time, of at least two seconds. A distance of less than two seconds can be considered tailgating, and tailgating can increase the likelihood of rear end collisions. Tailgating also creates other challenges for the host vehicle. For example, a driver of the host vehicle can become nervous in the presence of a tailgating vehicle since the likelihood of collision can increase during sudden braking of the host vehicle. Systems and methods for handling tailgating vehicles, which can be implemented in part or in whole with the systems and methods discussed above, will now be discussed.

Figure 23A:
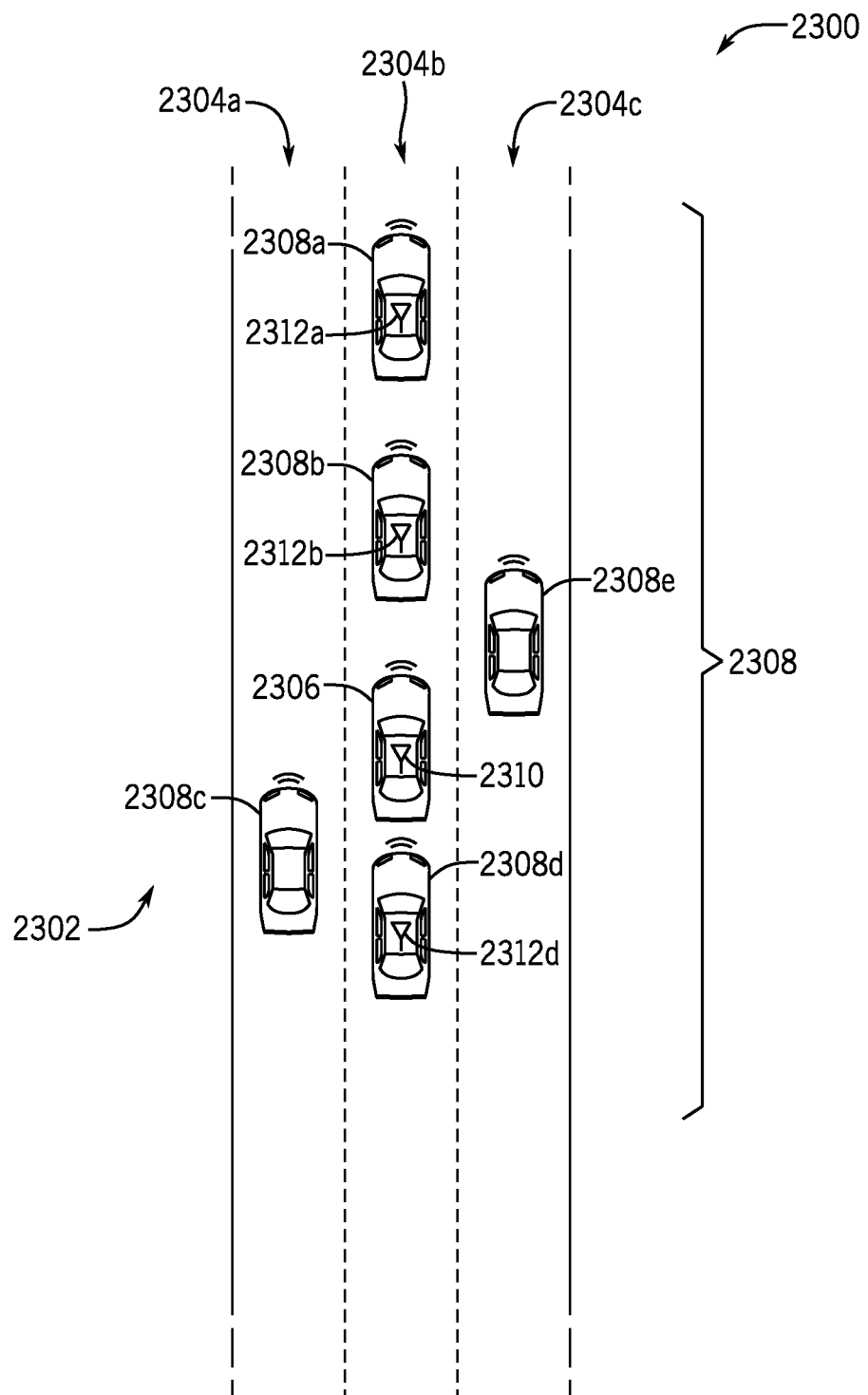
FIG. 23A is a schematic view of an exemplary traffic scenario with a tailgating scenario according to one embodiment.

FIG. 23A illustrates an exemplary traffic scenario 2300 that will be used to describe some of the systems and methods for vehicle control in tailgating scenarios. The traffic scenario 2300 is a simplified version of the traffic scenario 100 of FIG. 1A. For simplicity, like numerals represent like elements. In FIG. 23A, the roadway 2302 has a first lane 2304*a*, a second lane 2304*b*, and a third lane 2304*c*. It is understood that the roadway 2302 can have various configurations not shown in FIG. 23A, and can have any number of lanes. The traffic scenario 2300 includes a host vehicle 2306 and remote vehicles. For simplicity, the remote vehicles will be generally referred to herein as remote vehicles 2308.

It is understood that the host vehicle 2306 and the remote vehicles 2308 can have the same or similar components and functions as the host vehicle 106 and the remote vehicles 108 discussed above with FIGS. 1A, 1B, 2-7. For example, the host vehicle 2306 can transmit, receive, and/or exchange communications including data, messages, images, and/or other information with other vehicles, user, or infrastructures, using DSRC via a vehicle-to-vehicle (V2V) transceiver 2310 and the vehicle communication network 200 of FIG. 2. Further, the remote vehicle 2308*a*, the remote vehicle 2308*b*, and the remote vehicle 2308*d*, can use its respective V2V transceiver to communicate with one another and the host vehicle 2306. Although not shown in FIG. 23A, in some embodiments, the remote vehicle 2308*c* and the remote vehicle 2308*e* can also include equipment for communication using the vehicle communication network 200.

Figure 23B:
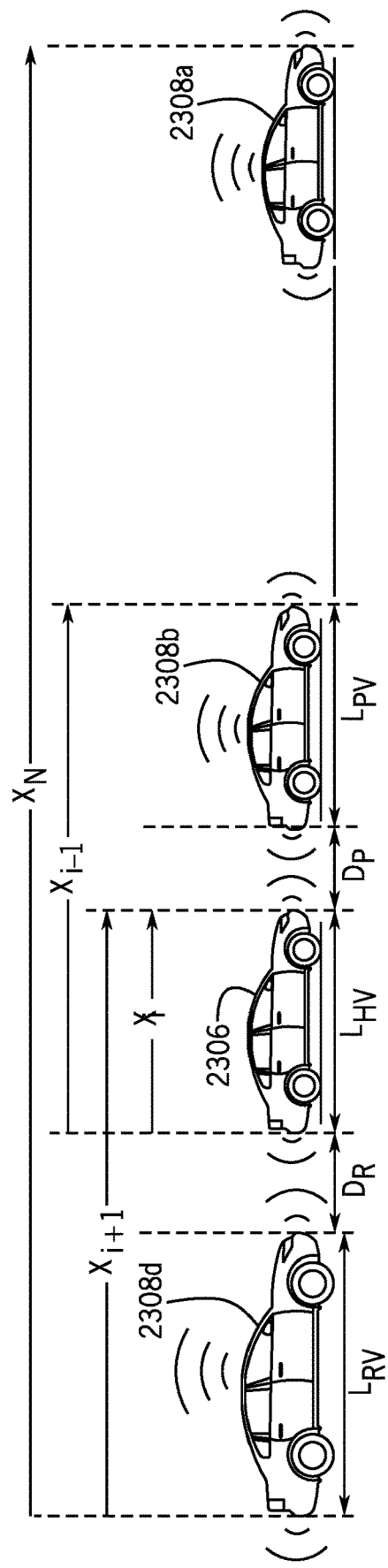
FIG. 23B is a schematic view of vehicles in the second lane 2304b of FIG. 23A according to an exemplary embodiment.

Referring now to FIG. 23B, a schematic view is shown of the host vehicle 2306 and the remote vehicles 2308 travelling in the second lane 2304*b* of FIG. 23A. More specifically, as show from left to right, the remote vehicle 2308*a*, the remote vehicle 2308*b*, the host vehicle 2306, and the remote vehicle 2308*d*. As mentioned above, the components shown in FIG. 23B can have the same or similar components and functions as the host vehicle 106 and the remote vehicles 108 discussed above with FIGS. 1A and 1B. In this embodiment, and in the exemplary tailgating systems and methods discussed herein, the remote vehicle 2308*a* can be referred to as a leading vehicle, the remote vehicle 2308*b* can be referred to as a preceding vehicle, and the remote vehicle 2308*d* can be referred to as a rear vehicle or a following vehicle. In some embodiments, the preceding vehicle can be referred to as a first vehicle and the rear vehicle or the following vehicle can be referred to as a second vehicle. The rear vehicle 2308*d* is a remote vehicle driving behind the host vehicle 2306 in the same lane (i.e., the second lane 2304*b*) as the host vehicle 2306. In some embodiments, the rear vehicle 2308*d* can be identified and referred to as a tailgating vehicle. As will be discussed herein in more detail, a tailgating vehicle can be identified based on a comparison of a distance and/or a time headway distance between the host vehicle 2306 and the rear vehicle 2308*d* to a predetermined threshold. Further, the tailgating vehicle can be identified as a hazard with respect to the embodiments discussed above in Section III.

Generally, the embodiments discussed herein include control of vehicles systems based, in part, on information regarding a rear vehicle driving behind a host vehicle and in the same lane as the host vehicle. In some embodiments, control of one or more of the vehicle systems is performed based on the rear vehicle, the host vehicle, a preceding vehicle and/or a leading vehicle. In particular, the methods and systems discussed herein provide braking control and/or Cooperative Adaptive Cruise Control (C-ACC). In some embodiments, these methods and systems can utilize the vehicle communication network 200 shown in FIG. 2.

Figure 24:
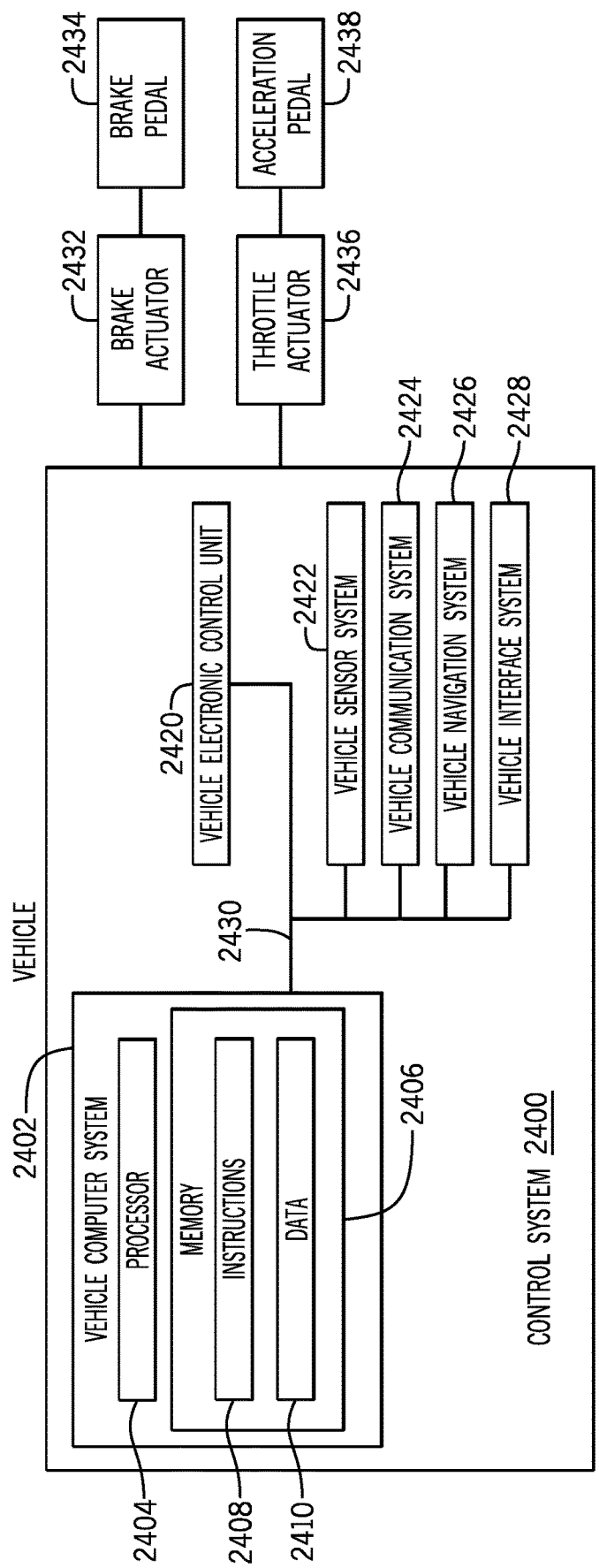
FIG. 24 is a block diagram of a vehicle control system of a vehicle according to an exemplary embodiment.

The host vehicle 2306 will now be described in more detail with reference to FIG. 24. FIG. 24 is a block diagram of an exemplary control system 2400 of the host vehicle 2306 for use with tailgating scenarios. In particular, FIG. 24 is a simplified diagram of the control system 300 of FIG. 3, but includes detailed components of a braking system that are originally shown in FIGS. 5 and 6. For simplicity, like numerals in FIGS. 3 and 24 represent like elements. Further, it is understood that the control system 2400 can include other components not shown and/or discussed in detail above with FIG. 3.

The components associated functions shown in FIG. 24 can be implemented with other vehicles. For example, the remote vehicles 2308 can include one or more of the components and functionalities of the control system 2400. Further, in some embodiments, the control system 2400 will be referred to as a braking control system and/or a C-ACC control system. Other braking systems and/or C-ACC systems associated with some vehicles may include different elements and/or arrangements as configured to the control system 2400, but can be configured to communicate over the vehicle communication network 200 with one or more other braking systems, C-ACC systems, vehicle control systems, or merge assist systems.

In FIG. 24, the control system 2400 includes a vehicle computer system 2402. In some embodiments discussed herein, the vehicle computer system 2402 will be referred to as a braking computer system 2402 and/or a C-ACC computer system 2402. In other embodiments, the vehicle computer system 2402 can be associated with another type of vehicle control system or can be a general vehicle computing device that facilitates the functions described herein. As discussed above in detail with FIG. 3, the control system 2400 includes a processor 2404, a memory 2406, instructions 2408, and data 2410. The vehicle computer system 2402 can communicate with various components of the host vehicle 2306 using, for example, a bus 2430. As discussed above in detail with FIG. 3, the vehicle computer system 2402 can communicate with the vehicle electronic control unit (ECU) 2420, a vehicle sensor system 2422, a vehicle communication system 2424, a vehicle navigation system 2426, and a vehicle interface system 2428.

As discussed with FIGS. 5 and 6, acceleration and/or deceleration commands (e.g., according to an acceleration control rate) can be executed using, in part, a brake actuator and/or a throttle actuator. As shown in FIG. 24, the control system 2400 includes a brake actuator 2432 operatively connected to a brake pedal 2434. The control system 2400 also includes a throttle actuator 2436 operatively connected to an acceleration pedal 2438. The brake actuator 2432 controls deceleration (vehicle speed decreases) by controlling, for example, brake fluid pressure via a master cylinder, fluid pressure control values, and brake wheel cylinders (not shown). The deceleration can also be controlled by driver input received by stepping on the brake pedal 2434, in which the brake actuator 2432 produces brake fluid pressure, which is transmitted to the brake wheel cylinders.

In contrast, the throttle actuator 2436 controls acceleration (vehicle speed increases) by varying the opening of a throttle valve (not shown). The acceleration can be controlled, in part, by driver input received by stepping on the acceleration pedal 2438. The brake actuator 2432, the brake pedal 2434, the throttle actuator 2436, and the acceleration pedal 2438 can include various sensors which are represented in FIG. 24 by the vehicle sensor system 2422. In some embodiments, these components can be part of a brake assist system or any other type of braking control system Sensors associated with the brake actuator 2432, the brake pedal 2434, the throttle actuator 2436, and the acceleration pedal 2438 can include, but are not limited to, acceleration sensors, wheel speed sensors, brake fluid pressure sensors, brake pedal travel sensors, brake pedal force sensors, and brake pedal application sensors. As will be discussed herein in more detail, the control system 2400 controls the brake actuator 2432 (e.g., braking force) and the throttle actuator 2436 (e.g., opening of the throttle valve), for example, based on an acceleration control rate, to bring the host vehicle 2306 to a speed closer to the acceleration control rate generated by the C-ACC computer system 2402.

Figure 25:
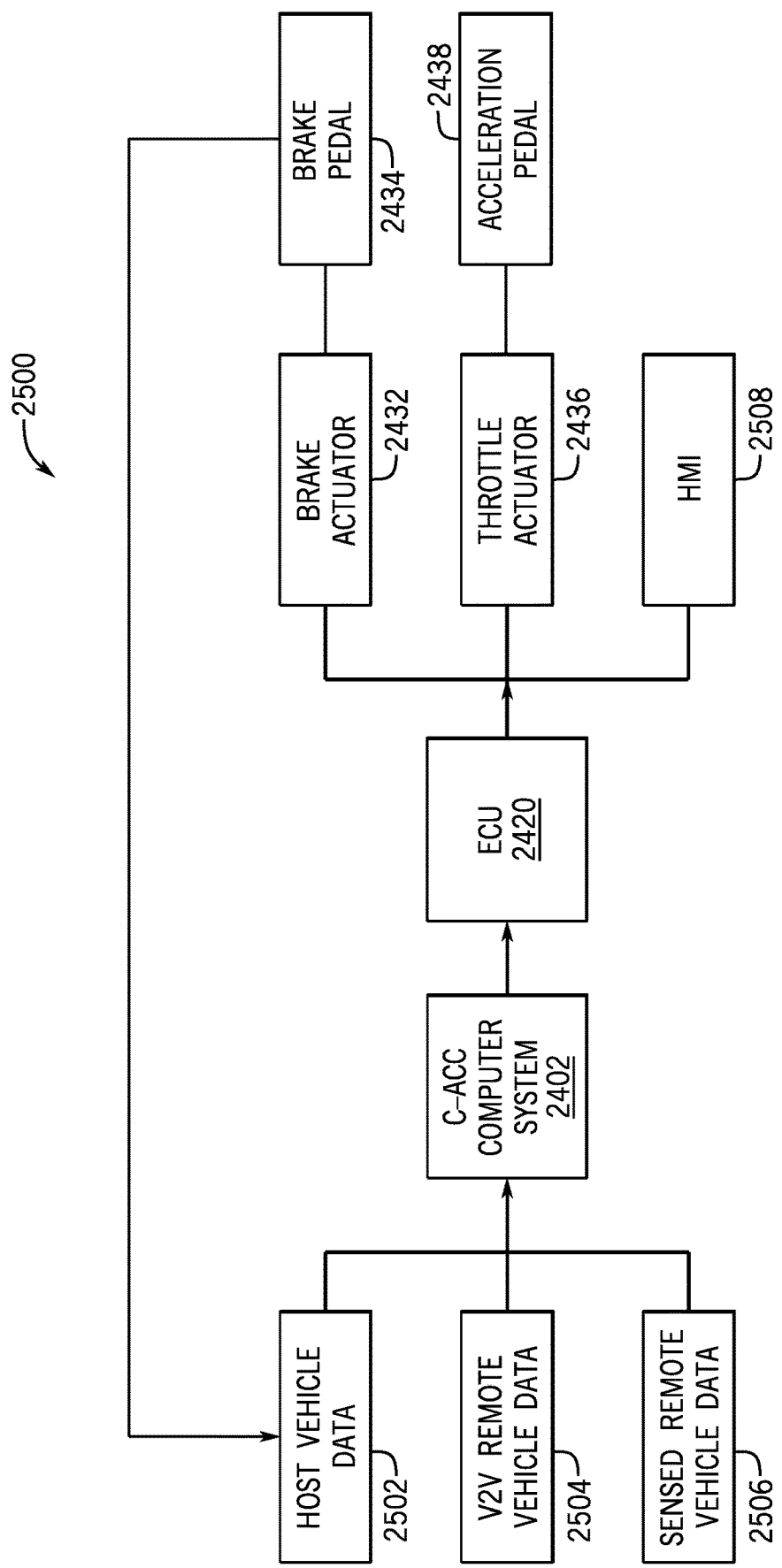
FIG. 25 is a schematic view of a C-ACC and/or braking control model for controlling a vehicle control system according to an exemplary embodiment.

Referring now to FIG. 25, an exemplary control model 2500 for braking control and/or C-ACC control for tailgating scenarios is shown. FIG. 25 is similar to the C-ACC control model of FIG. 6, but includes specific brake components. In particular, FIG. 25 includes the brake pedal 2434 and the acceleration pedal 2438. For simplicity, like numerals in FIG. 6 and FIG. 25 represent like elements. As discussed above in detail with FIG. 6, the control model 2500 receives as inputs host vehicle data 2502, V2V remote vehicle data 2504, and sensed remote vehicle data 2506. The host vehicle data 2502 includes vehicle dynamics data about the host vehicle 106. For example, speed, acceleration, velocity, yaw rate, steering angle, throttle angle, range or distance data, among others. The host vehicle data 2502 can be accessed from the vehicle sensor system 2422 via the bus 2430. Further, as shown in FIG. 25, the brake pedal 2434 and/or the acceleration pedal 2438 can be sources of host vehicle data 2502. The host vehicle data 2502 can be provided via sensors discussed above (e.g., vehicle sensor system 2422) associated with the brake actuator 2432, the throttle actuator 2436, the brake pedal 2434 and/or the acceleration pedal 2438. In some embodiments, host vehicle data 2502 provided by sensors associated with the brake actuator 2432, the throttle actuator 2436, the brake pedal 2434 and/or the acceleration pedal 2438, can be referred to herein as host vehicle braking data.

As discussed in detail with FIG. 6, the V2V remote vehicle data 2504 includes remote vehicle dynamics data about one or more of the remote vehicles 2308 communicated via the vehicle communication network 200. The V2V remote vehicle data 2504 can include speed, acceleration, velocity, yaw rate, steering angle, and throttle angle, range or distance data, among others, about one or more of the remote vehicles 2308. In some embodiments, V2V remote vehicle data 2504 associated with a braking operation of a remote vehicle can be referred to herein as V2V remote vehicle braking data. As discussed above, the sensed remote vehicle data 2506 can include data about one or more of the remote vehicles 2308 and/or other objects in proximity to the host vehicle 2306, received and/or sensed by the vehicle sensor system 2422. In some embodiments, sensed remote vehicle data 2506 associated with a braking operation of a remote vehicle can be referred to herein as sensed remote vehicle braking data.

The host vehicle data 2502, the V2V remote vehicle data 2504, and the sensed remote vehicle data 2506 can be input to the computer system 2402, is processed using the control algorithms with tailgating scenarios discussed herein. In one embodiment, the computer system 2402 can output acceleration and/or deceleration commands to the ECU 2420, which then executes said commands to the respective vehicle system, for example, the brake actuator 2432 and/or the throttle actuator 2436.

A. Methods for Brake Boost Control

Generally, some drivers find it challenging to apply hard-braking (e.g., emergency braking, panic braking) in an emergency situation, for example, when a preceding vehicle suddenly decelerates. It can be even more challenging to provide hard-braking in the presence of a tailgating vehicle. Drivers may be hesitant to brake when they are aware a tailgating vehicle is present because braking could potentially lead to a rear-end collision with the tailgating vehicle. Accordingly, brake assistance can be provided based on a panic brake operation, a preceding vehicle and/or a tailgating vehicle. In some embodiments, V2V communication of this brake assistance can be provided to other vehicles to further mitigate risk of collision. In the systems and methods discussed herein, a tailgating vehicle (e.g., a tailgater) includes a vehicle following a subject vehicle (e.g., a host vehicle) and separated by a distance and/or a time headway that is sufficiently small to warrant further analysis for various reasons. For example, as discussed herein, a brake boost operation can be applied to a subject vehicle to reduce the likelihood of the following vehicle (e.g., a tailgater) rear ending the subject vehicle.

Referring now to FIG. 26A an exemplary method 2600 for braking control with tailgating scenarios will be described with reference to FIGS. 23A, 23B, 24, and 25. The method 2600 includes, at block 2602, detecting, using one or more vehicle sensors, a panic brake operation. In other embodiments, the panic brake operation can be referred to as a hard-brake operation or an emergency brake operation. The processor 2404 can use host vehicle braking data (e.g., host vehicle data 2502) captured via the vehicle sensor system 2422 to determine if a panic brake operation is occurring. In one embodiment, the processor 2404 can detect a panic brake operation based on a change of a braking pressure of the vehicle control system 2400 of the host vehicle 2306 with respect to time. The processor 2404 can calculate the change of the breaking pressure and compare the change of the braking pressure to a panic brake pressure threshold. In another embodiment, the processor 2404 can monitor a change of a braking pressure of the braking system with respect to time.

At block 2604, the method 2600 includes, detecting, using the one or more vehicle sensors, a rear vehicle in the same lane as the host vehicle, but behind the host vehicle (e.g., generally longitudinally aligned, or aligned in the same direction of travel). For example, the processor 2404 can detect the rear vehicle 2308d driving behind the host vehicle 2306 and in the same lane as the host vehicle 2306 based on sensed remote vehicle data 2506. In one embodiment, the processor 2404 can receive position data about one or more of the remote vehicles 2308 via a plurality of midrange sensors (e.g., sensed remote vehicle data 2506 from the radar system 414). With respect to the illustrative example in FIG. 23B, the rear vehicle 2308d can be detected as a second vehicle (e.g., a rear vehicle, a following vehicle) driving behind the host vehicle 2306 and in the same lane (i.e., 2304b) as the host vehicle 2306. In one embodiment, which will be discussed in detail with FIG. 27, block 2604 can also include determining if the rear vehicle 2308d is a tailgating vehicle.

At block 2606, the method 2600 includes, determining, using the one or more vehicle sensors, a time-to-collision value between the host vehicle and the rear vehicle. The time-to-collision value represents an amount of time before a collision between the host vehicle 2306 and the rear vehicle 2308d will occur. In one embodiment, the time-to-collision value is based only a driver braking pressure provided by operation of the brake pedal 2434 (e.g., deceleration rate determined at block 2608). Thus, the time-to-collision threshold can be an amount of time before a collision between the host vehicle 2306 and the rear vehicle 2308d will occur based on an amount of deceleration provided by only the driver via input to the brake pedal 2434. In some embodiments, the processor 2404 can calculate a time-to-collision value between the host vehicle 2306 and the rear vehicle 2308d based on a speed of the host vehicle 2306, a speed of the rear vehicle 2308d, and/or a distance or time headway between the host vehicle 2306 and the rear vehicle 2308d.

At block 2608, the method 2600 includes, determining, using the one or more vehicle sensors, a deceleration rate of the host vehicle. The deceleration rate can be based on a driver braking pressure provided by operation of the brake pedal 2434 of the braking system. Thus, the deceleration rate is an amount of deceleration provided by only the driver via input to the brake pedal 2434. For example, the processor 2404 can calculate the deceleration rate of the host vehicle 2306 based on host vehicle braking data received from a brake pedal travel sensor and/or a brake pedal force sensor.

Further, at block 2610, the method 2600 includes, controlling the braking system based on the time-to-collision value and the deceleration rate. In one embodiment, controlling the braking system includes increasing the braking pressure of the vehicle control system 2400 to an amount greater than the driver braking pressure based on the time-to-collision value and the deceleration rate. Thus, the processor 2404 can control the vehicle control system 2400 (e.g., the braking system) by generating a braking signal that increases the braking pressure of the braking system to an amount greater than braking pressure provided by the driver only. This operation can be referred to as a brake boost operation, which increases a force the brake pedal 2434 exerts on the brake master cylinder by using, for example, engine vacuum and pressure.

In another embodiment, a brake boost operation may not be applied at block 2610 (e.g., the brake boost operation is suppressed). Instead, only braking provided according to the driver braking pressure is executed. According to this embodiment, when the time-to-collision value is less than a time-to-collision threshold or the deceleration rate is greater than a deceleration rate threshold, controlling the vehicle control system 2400 at block 2610, includes braking the host vehicle 2306 only according to the driver braking pressure. In another embodiment, which will be described in detail with FIG. 27, when the time-to-collision value is less than a time-to-collision threshold or the deceleration rate is greater than a deceleration rate threshold, controlling the braking system at block 2610 includes not executing a brake boost operation (e.g., suppressing the brake boost operation).

In one embodiment, controlling the vehicle control system 2400 at block 2610 also includes using V2V communication via the vehicle communication network 200. For example, if a brake boost operation is executed by increasing the braking pressure, the host vehicle 2306 can communicate information about the brake boost operation (e.g., deceleration rate, warning, alert) to the rear vehicle 2308d using the vehicular communication network 200 (e.g., via DSRC messages). In other embodiments, the vehicle control system 2400 can control one or more vehicle systems to provide one or more notifications to the tailgating vehicle, for example, visual indicators or brake light indications that can be perceived as a warning to a driver of the tailgating vehicle.

Figure 27:
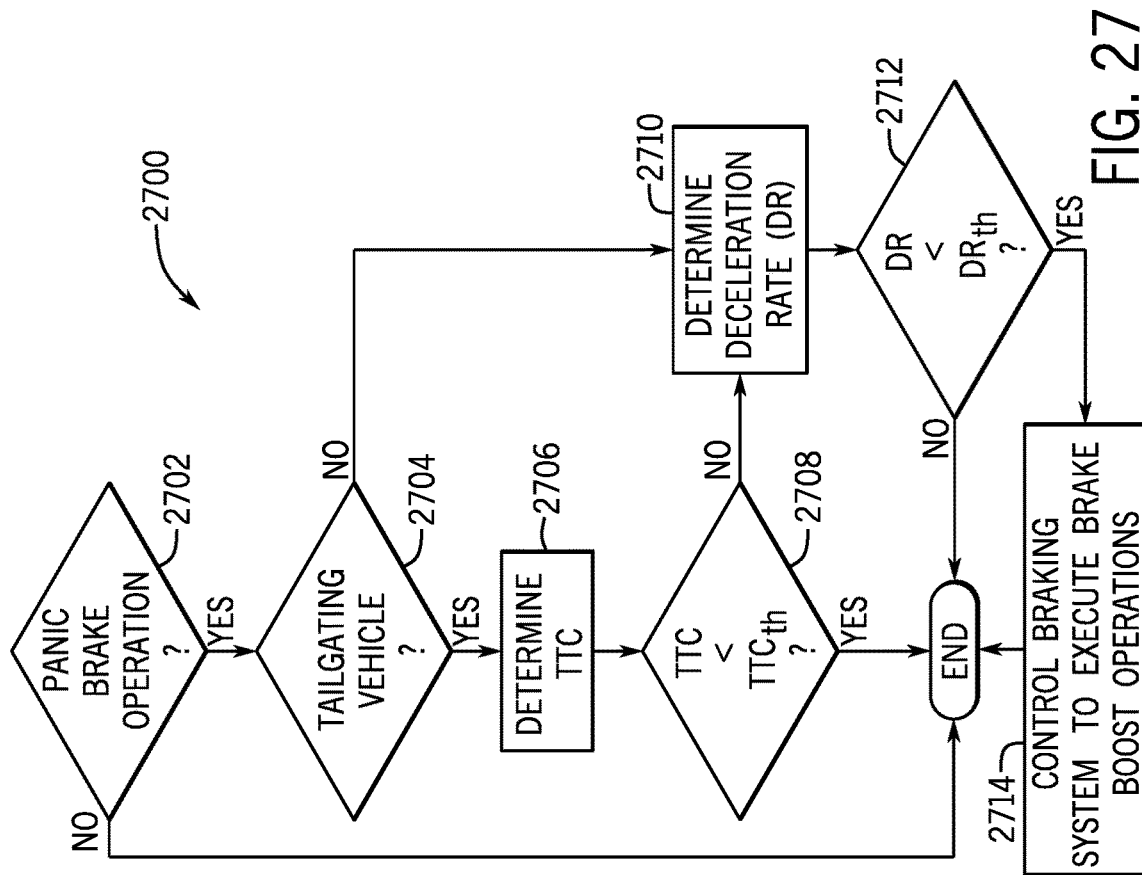
FIG. 27 is a process flow diagram of showing a detailed view of the method of FIG. 26 according an exemplary embodiment.
Figure 26:
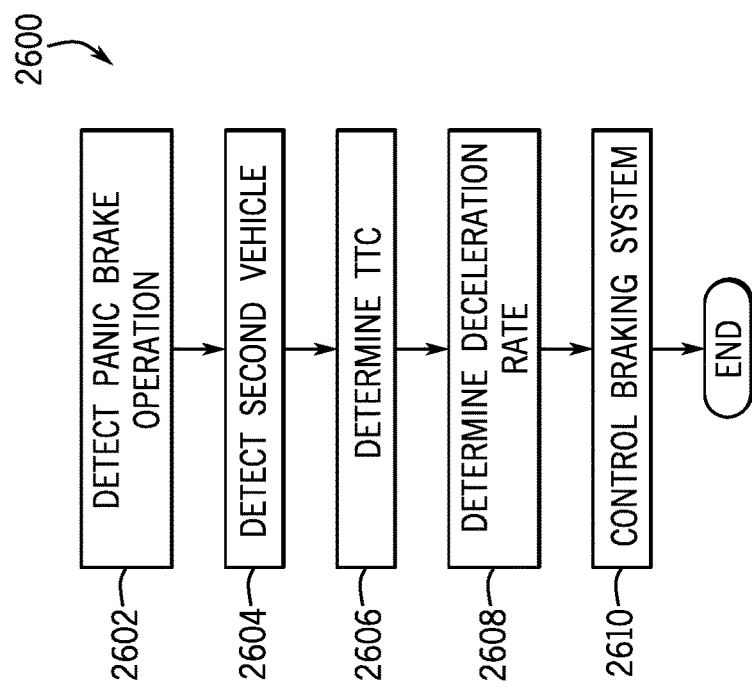
FIG. 26 is a process flow diagram of a method for controlling a vehicle system of a host vehicle with a tailgating scenario according to an exemplary embodiment.

The method 2600 of FIG. 26 will now be described in greater detail with the method 2700 of FIG. 27. At block 2702, similar to block 2602 of the method 2600, the method 2700 includes, detecting, using one or more vehicle sensors, a panic brake operation. As an illustrative example with reference to FIG. 28, a graph 2800 displays exemplary braking pressure over time for a strong brake pressure 2802, a weak brake pressure 2804, and a boosted brake pressure 2806. At point 2808, a panic brake operation is detected as shown by a sharp rise over a small amount of time in the braking pressure. Thus, in this embodiment, the processor 2404 can calculate the change of the breaking pressure and compare the change of the braking pressure to a panic brake pressure threshold. Alternatively, the processor 2404 can monitor a change of a braking pressure of the braking system with respect to time.

If the determination at block 2702 is YES, the method 2700 proceeds to block 2704, otherwise, the method 2700 ends. At block 2704, the method 2700 includes determining whether a tailgating vehicle is present with respect to the host vehicle. In particular, it is determined whether the rear vehicle 2308d is a tailgating vehicle. This determination can be based on one or more factors, for example, a distance between the host vehicle 2306 and the rear vehicle 2308d and/or a speed threshold. As used herein, a headway distance can be defined as a distance between a first vehicle and a second vehicle in front of the first vehicle. In some embodiments a headway distance can include a temporal component as a time headway distance, defined as a measurement of the time past a set point between a first and second vehicle. The headway distance and time headway distance calculations can include preset times and/or distances based on one or more factors, for example, road conditions, speed, weather conditions, among others.

Thus, in one embodiment, it is determined whether the rear vehicle 2308d is a tailgating vehicle based on comparing a distance between the host vehicle 2306 and the rear vehicle 2308d to a tailgating distance threshold (e.g., 100 meters). In another embodiment, a rear headway distance between the host vehicle 2306 and the rear vehicle 2308d is compared to a tailgating headway distance threshold (e.g., 0.5-2 seconds). In some embodiments, block 2702 can include determining if the rear headway distance is within a predetermined range (e.g., tolerance value) of the tailgating headway distance threshold. For example, if the rear headway distance between within 1 second (+/−1) of the tailgating headway distance threshold.

Methods described above with block 2604 in FIG. 26 for detecting a rear vehicle can also be used to determine whether the rear vehicle is a tailgating vehicle. For example, the processor 2404 can receive position data about the second vehicle via a plurality of midrange sensors (e.g., sensed remote vehicle data 2506 from the radar system 414). From the position data, the processor 2404 can compare a distance between the host vehicle 2306 and the rear vehicle 2308d to a tailgating headway distance threshold. In other embodiments, from the position data, the processor 2404 can determine a rear headway distance of the rear vehicle 2308d with respect to the host vehicle 2306, and compare the rear headway distance to a tailgating headway distance threshold. With reference to the illustrative example of FIG. 23B, it is determined whether the rear vehicle 2308d is a tailgating vehicle based on the distance $D_R$, which is a distance between the front of the rear vehicle 2308d and the tail end of the host vehicle 2306.

If the determination at block 2704 is YES, the method 2700 proceeds to block 2706, otherwise the method 2700 proceeds to block 2710. At block 2706, similar to block 2606 of the method 2600, the method 2700 includes, determining, using the one or more vehicle sensors, a time-to-collision value between the host vehicle and the second vehicle. At block 2708, the time-to-collision value is compared to a time-to-collision threshold. More specifically, it is determined if the time-to-collision value is less than the time-to-collision threshold. The time-to-collision threshold can be an amount of time that triggers a collision warning or actuates control of one or more vehicle systems to mitigate collision. In one embodiment, the time-to-collision threshold is about 1-2 seconds. If the determination at block 2708 is YES, the method 2700 ends. Thus, in one embodiment, when the time-to-collision value is less than the time-to-collision threshold (e.g., 1-2 seconds), the vehicle control system 2400 is controlled to not execute a brake boost operation (e.g., suppress the brake boost operation). Since the time-to-collision value does not meet the critical threshold (e.g., the time-to-collision threshold), the vehicle control system 2400 does not assist braking control and the only braking provided is that from the driver via driver input at the brake pedal 2434.

If the determination at block 2708 is NO, the method 2700 proceeds to block 2710. Thus, in this embodiment, if a tailgating vehicle is not present at block 2704 or the time-to-collision value is greater than the time-to-collision threshold, the method 2700 proceeds to block 2710. At block 2710, the method 2700 includes determining a deceleration rate, similar to block 2608 of method 2600. More specifically, the deceleration rate can be based on a driver braking pressure provided by operation of the brake pedal 2434. Further, at block 2712, the method 2700 includes comparing the deceleration rate to a deceleration rate threshold. Specifically, it is determined whether the deceleration rate is less than the deceleration rate threshold. In some embodiments, the deceleration rate threshold is about 0.1 g-0.8 g. For example, in some embodiments, the deceleration rate threshold is 0.5 g. In other embodiments, at block 2712, it can be determined if the deceleration rate is within a predetermine range (e.g., tolerance value) of the deceleration rate threshold. For example, if the deceleration rate is within 0.2 g (+/−0.2 g) of the deceleration rate threshold. In some embodiments, the deceleration rate threshold is referred to as a max deceleration rate.

If the determination at block 2712 is NO, the method 2700 ends. Thus, in one embodiment, if the deceleration rate is greater than the deceleration rate threshold (e.g., 0.5 g), the vehicle control system 2400 is controlled to not execute a brake boost operation (e.g., suppress the brake boost operation). Accordingly, the vehicle control system 2400 does not assist braking control and only provides braking based on driver input at the brake pedal 2434. This can be due to the fact that the driver input alone is providing a sufficient braking pressure. For example, with reference to FIG. 28, at point 2810, the braking pressure for the strong brake pressure 2802 is greater than 0.5 g, and the braking pressure for the weak brake pressure 2804 is less than 0.5 g.

Figure 28:
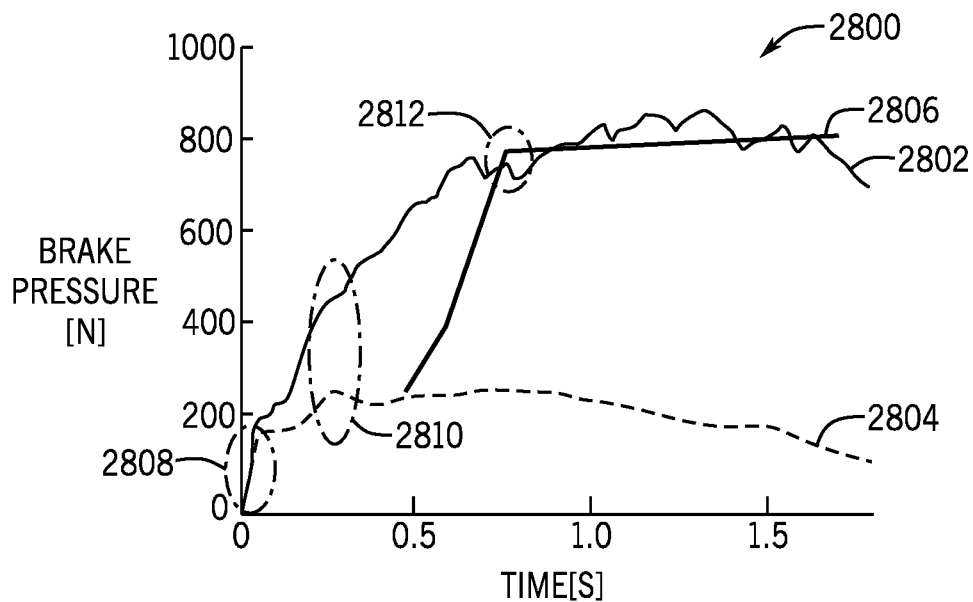
FIG. 28 is a graph showing brake pedal force versus time according to an exemplary embodiment.

However, if the determination at block 2712 is YES, the method 2700 proceeds to block 2714 where controlling the vehicle control system 2400 (e.g., the braking system) includes executing a brake boost operation. For example, when the time-to-collision value is greater than the time-to-collision threshold at block 2708 (NO), and the deceleration rate is less than the deceleration rate threshold at block 2712 (YES), controlling the vehicle control system 2400 at block 2714 includes executing a brake boost operation by increasing the braking pressure of the braking system to an amount greater than the driver braking pressure (i.e., greater than the braking provided by driver input at the brake pedal 2434 only). As shown in FIG. 28, the weak brake pressure 2804 can be boosted according to the boosted brake pressure 2806 to increase the braking pressure to an amount similar to the strong brake pressure 2802. Thus, the boosted brake pressure 2806 is exemplary braking pressure after the panic brake operation is detected and the brake boost operation is executed.

In another embodiment, when the time-to-collision value is greater than the time-to-collision threshold at block 2708 (NO), and the deceleration rate is less than the deceleration rate threshold at block 2712 (YES), controlling the braking system at block 2714 includes executing a brake boost operation by increasing the braking pressure of the braking system to an amount greater than the driver braking pressure to thereby increase the deceleration rate to a maximum deceleration rate. In some embodiments, the maximum deceleration rate is about 0.1 g-0.8 g. For example, in one embodiments, the maximum deceleration rate is 0.5 g. Accordingly, a potential rear-end collision can be mitigated using brake assistance following the panic brake operation and in view of a preceding vehicle and/or a tailgating vehicle.

Additionally, as discussed above with FIG. 26, in some embodiments controlling the braking system at block 2714 also includes using V2V communication via the vehicle communication network 200. For example, if a brake boost operation is executed by increasing the braking pressure, the host vehicle 2306 can communicate information about the brake boost operation (e.g., deceleration rate, warning, alert) to the rear vehicle 2308*d* using the vehicular communication network 200 (e.g., via DSRC messages). In other embodiments, visual notifications can be provided, for example, visual indicators or brake light indications that can be perceived as a warning to a driver of the tailgating vehicle. Accordingly, brake assistance and communication of brake assistance can be applied to the host vehicle 2306 to reduce the likelihood of the rear vehicle 2308*d* rear ending the host vehicle 2306.

B. Methods for C-ACC Tailgate Control

In addition to or in lieu of brake boost operation, the systems and methods described herein can provided C-ACC control with tailgating scenarios. As discussed in detail in Section I above, motion of the host vehicle 2306 can be controlled, for example, by the C-ACC control system 2400. In particular, the C-ACC control system 2400 can control longitudinal motion of the host vehicle 2306. For example, the C-ACC control system 2400 can control acceleration and/or deceleration of the host vehicle 2306 in relation to the preceding vehicle 2308*b* by generating an acceleration control rate using the C-ACC control model equations (1)-(5). However, in some embodiments, controlling the motion of the host vehicle 2306 can consider the rear vehicle 2308*d*, which can be a tailgating vehicle. Thus, the C-ACC control system 2400 can dynamically adjust deceleration of the host vehicle 2306 to mitigate risk of tailgater related accidents.

As discussed in detail above with equations (1) and (2), a control algorithm for C-ACC control can include a distance control component based on the relative distance between the host vehicle 2306 and the preceding vehicle 2308*b* and a preceding headway reference distance. The control algorithm can also include a velocity control component shown in equation (3) based on the relative velocity between the host vehicle 2306 and the preceding vehicle 2308*b*. Thus, the distance and velocity components of the control algorithm maintain a predetermined preceding headway reference distance between the host vehicle 2306 and the preceding vehicle 2308*b*. If a preceding vehicle is not present, the distance and velocity components of the control algorithm can be set to predetermined values (e.g., desired values input by a driver).

In the embodiments discussed herein, if the rear vehicle 2308*d*, which can be a tailgating vehicle, is present, the acceleration control rate based on the preceding vehicle 2308*b* can be determined and/or modified based on the rear vehicle 2308*d*. More specifically, the acceleration control rate can be determined and/or modified based on a predetermined rear headway reference distance. Accordingly, in one embodiment, an acceleration control reference is based on and/or can be modified according to a rear headway distance component, which can be expressed mathematically as:

$$a_{ref_{rear}} = K_{rear}(x_i - x_{i+1} - h\dot{x}_{i+1} - L_{RV}) \quad (18)$$

where $x_{i+1}$ is a distance from a rear end of the rear vehicle 2308*d* to the front end of the host vehicle 2306, $x_i$ is a length of the host vehicle 2306, $h\dot{x}_{i+1}$ is a predetermined rear headway reference distance and $L_{RV}$ is the length of the rear vehicle 2308*d*. These variables are schematically shown in FIG. 2366. It is understood that information about the rear vehicle 2308*d* (e.g., distance, velocity) is sensed remote vehicle data 2506 (e.g., radar data detected using radar sensors), but it is understood that in other embodiments the information about the rear vehicle 2308*d* can be V2V remote vehicle data 2504 received by the host vehicle 2306 using DSRC via the vehicle communication network 200. Further, in other embodiments, the information about the rear vehicle 2308*d* can be V2V remote vehicle data 2504 received by the host vehicle 2306 from roadside equipment (RSE) 116. Thus, in some embodiments, the acceleration control rate can be determined and/or modified based on the distance control component and the velocity control component of equation (3) and the rear vehicle component as shown in equation (18), which can be expressed mathematically as:

$$a_{ref} = K_p(x_{i-1} - x_i - h\dot{x}_i - L_{PV}) + K_v(v_{i-1} - v_i) + K_{rear}(x_i - x_{i+1} - h\dot{x}_{i+1} - L_{RV}) \quad (19)$$

where $x_{i-1}$ is a distance from a rear end of the host vehicle 2306 to the front end of the preceding vehicle 2308*b*, $x_i$ is a length of the host vehicle 2306, $h\dot{x}_i$ is a pre-determined headway reference distance and $L_{PV}$ is the length of the preceding vehicle 2308*b*, and where is a velocity of the preceding vehicle 2308*b*, $v_i$ is the velocity of the host vehicle 2306. Thus, an acceleration control rate can be generated and/or modified by the C-ACC computer system 302 based on a relative headway distance between the host vehicle 2306 and the preceding vehicle 2308*b* with respect to a headway reference distance, a relative velocity between a velocity of the host vehicle 2306 and a velocity of the preceding vehicle 2308*b*, and a relative rear headway distance between the host vehicle 2306 and the rear vehicle 2308*d* with respect to a rear headway reference distance. It is understood that, in some embodiments, the information about the preceding vehicle 2308*b* (e.g., distance, velocity) is sensed remote vehicle data 2506 (e.g., radar data detected using radar sensors), but it is understood that in other embodiments the information about the preceding vehicle 2308*b* can be V2V remote vehicle data 2504 received by the host vehicle 2306 using DSRC via the vehicle communication network 200. Further, in other embodiments, the information about the preceding vehicle 2308*b* can be V2V remote vehicle data 2504 received by the host vehicle 2306 from roadside equipment (RSE) 116.

It is appreciated that in some embodiments, the acceleration control reference of equation (7) can also consider information about the leading vehicle 2308a. For example, the acceleration control rate can be modified and/or generated based on an acceleration rate of the leading vehicle 2308a and/or a leading vehicle acceleration dynamic gain coefficient. Thus, the acceleration control rate can be generated and/or modified by the C-ACC computer system 302 using the distance component, the velocity component, the rear vehicle component of the rear vehicle 2308d, and an acceleration component of the leading vehicle 2308a. This can be expressed mathematically as, $$a_{ref} = K_p(x_{i-1} - x_i - L_{PV}) + K_v(v_{i-1} - v_i) + K_{rear}(x_i - x_{i+1} - h\dot{x}_{i+1} - L_{RV}) + K_a \cdot a_L \quad (20)$$

where $a_L$ is an acceleration rate of the leading vehicle 2308a and $K_a$ is a leading vehicle acceleration dynamic gain coefficient. In some embodiments, similar to those described in Section I(C) and Section II above, the acceleration rate of the leading vehicle 2308a is received by the host vehicle 2306 from the leading vehicle 2308a using DSRC via the vehicle communication network 200. However, it is understood that in other embodiments, the acceleration rate of the leading vehicle 2308a can be received by the host vehicle 2306 from RSE 116 and/or other remote vehicles.

Figure 29:
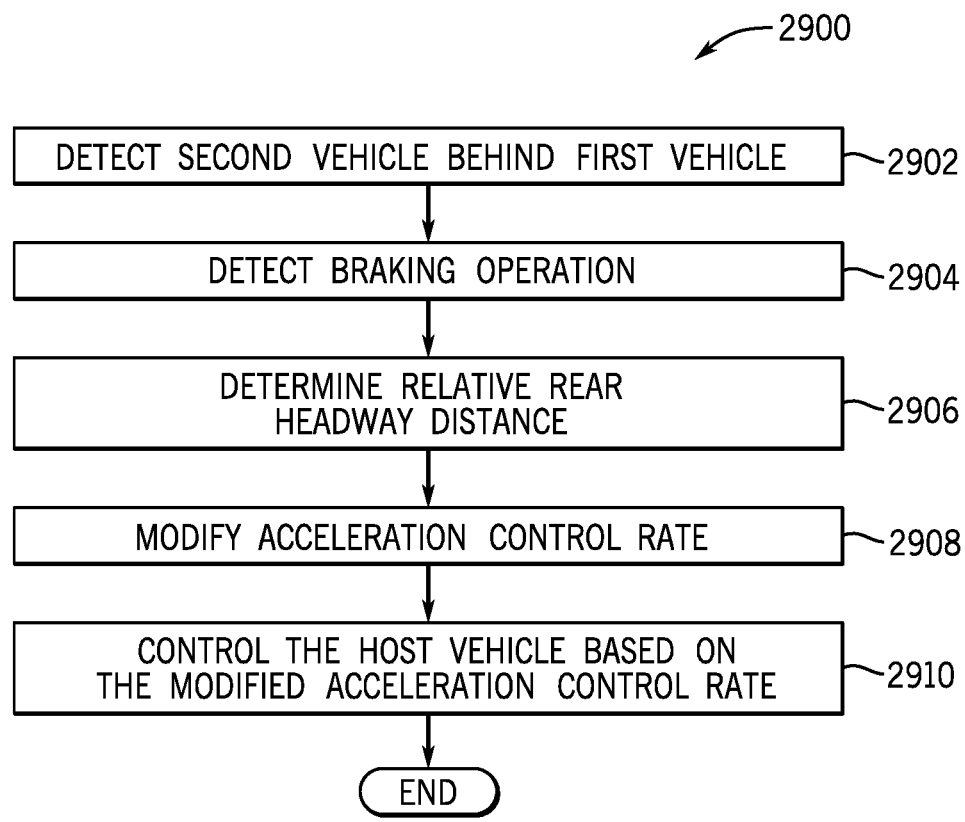
FIG. 29 is a process flow diagram of another method for controlling a vehicle system of a host vehicle with a tailgating scenario according to an exemplary embodiment.

Referring now to FIG. 29, an exemplary method 2900 for controlling a host vehicle based on a preceding vehicle and a tailgating vehicle will now be described according to an exemplary embodiment and with reference to the control algorithm of equations (18)-(20). FIG. 29 will also be described with reference to FIGS. 23A, 23B, 24, and 25. In the embodiment shown in FIG. 29, a vehicle control system will be referred to as a C-ACC control system 2400. Further, it is understood that one or more of the components of FIG. 29 can be implemented with one or more of the components of FIGS. 8-10 discussed above in detail in Section II. Additionally, one or more of the components of FIG. 29 can be can be combined, omitted or organized with other components or organized into different architectures.

Referring now to method 2900, at block 2902, the method 2900 includes, detecting, using the one or more vehicle sensors, a rear vehicle driving behind the host vehicle and in the same lane as the host vehicle. For example, the vehicle computer system 2402 can detect whether a rear vehicle is driving behind the host vehicle 2306 and in the same lane as the host vehicle 2306 based on sensed remote vehicle data 2506. With respect to the illustrative example shown in FIGS. 23A and 23B, the rear vehicle 2308d can be detected as driving behind the host vehicle 2306 and in the same lane (i.e., the second lane 2304b) as the host vehicle 2306. As will be described in detail below, the rear vehicle 2308d can be a tailgating vehicle and longitudinal motion of the host vehicle 2306 can be adjusted dynamically based on the preceding vehicle 2308b and/or the rear vehicle 2308d.

In some embodiments, the determination at block 2902 can be based, in part, on V2V remote vehicle data 2504. In one embodiment, the processor 2404 can receive position data about one or more of the remote vehicles 2308 via a plurality of midrange sensors (e.g., sensed remote vehicle data 2506 from the radar system 414). In one embodiment, which will be discussed in detail with FIG. 30, block 2904 can also include determining if the rear vehicle 2308d is a tailgating vehicle.

At block 2904, the method 2900 includes detecting, using one or more vehicle sensors, a braking operation. More specifically, the braking operation is initiated by the vehicle system of the host vehicle. The processor 2404 can detect a braking operation by monitoring host vehicle braking data (e.g., host vehicle data 2502) from the vehicle sensor system 2422. Based on the braking data, the processor 2404 can determine if a braking operation is being initiated and executed by, for example, the C-ACC control system 2400. This braking operation is in contrast to a braking operation initiated by, for example, a driver via driver input at the brake pedal 2434.

More specifically, in this embodiment, the braking operation detected at block 2902 causes the host vehicle 2306 to decelerate (vehicle speed decreases) based on an acceleration control rate generated by the C-ACC control system 2400 in order to maintain a preceding headway reference distance with the preceding vehicle 2308b. Thus, the braking operation detected at block 2902 is initiated at the host vehicle 2306 in response to the preceding vehicle 2308b to thereby increase the preceding headway distance between the host vehicle 2306 and the preceding vehicle 2308b. Thus, the acceleration control rate is calculated to achieve and/or maintain a preceding headway distance between the host vehicle 2306 and the preceding vehicle 2308b. Accordingly, the acceleration control rate generated by the C-ACC control system 2400 that initiates the braking operation detected at block 2902 is calculated without consideration of the rear vehicle 2308d. For example, if the preceding vehicle 2308b decelerates (e.g., the relative distance between the host vehicle 2306 and the preceding vehicle 2308b decreases with respect to the predetermined preceding headway reference distance), the C-ACC control system 2400 generates an acceleration control rate (e.g., based on the control algorithm shown in equation (5)) that brings the host vehicle 2306 to a speed closer to the preceding vehicle 2308b. Thus, the acceleration control rate can be based on the preceding vehicle 2308b using the distance component, the velocity component, and the acceleration component of the preceding vehicle 2308b. In some embodiments, the acceleration control rate can also be based on the acceleration component of the leading vehicle 2308a, as described above in Section I(C) and equations (1)-(5).

Thus, in this embodiment, the acceleration control rate will cause the host vehicle to decelerate at a particular rate and this deceleration is initiated by the host vehicle 2306 (e.g., via the C-ACC control system 2400). Said differently, the braking operation causes the host vehicle 2306 to decelerate based on an acceleration control rate generated by the C-ACC control system 2400 in order to maintain a preceding headway reference distance with the first vehicle 2308b. As an illustrative example, the acceleration control rate may be −0.5 m/s based on the preceding vehicle 2308b as discussed above. The current acceleration rate of the host vehicle 2306 may be 1.5 m/s, thus, the acceleration control rate executed at the host vehicle 2306 will cause the current acceleration control rate to decrease by 0.5 m/s to 1.0 m/s. This negative acceleration or decrease in the current acceleration control rate is achieved by controlling the host vehicle 2306 (e.g., the braking system) according to the acceleration control rate, for example, by initiating a braking operation at the host vehicle 2306.

In other embodiments, detecting and/or determining the braking operation at block 2904 includes receiving from the vehicle system of the host vehicle an acceleration control rate that when executed by the host vehicle initiates a braking operation by the vehicle system of the host vehicle. Thus, in this embodiment, the processor 2404 can receive an acceleration control rate generated by the C-ACC control system 2400. As discussed above, the acceleration control rate can be generated by the C-ACC control system 2400 to maintain a preceding headway reference distance with the first vehicle.

In some embodiments which will be discussed in further detail herein, the braking operation detected is a hard-braking operation (e.g., panic brake operation, emergency brake operation). Thus, in one embodiment, block 2904 can include determining whether the braking operation is a hard-braking operation. For example, the acceleration control rate can be compared to a predetermined braking threshold. As an illustrative example, braking that meets or exceeds 1 m/s can be considered a hard-braking operation.

At block 2906, the method 2900 includes, determining, using the one or more vehicle sensors, a relative rear headway distance between the host vehicle and the rear vehicle with respect to a rear headway reference distance. For example, as discussed above with equation (18), the processor 2404 can calculate a distance control component based on a relative distance between the host vehicle 206 and the rear vehicle 2308d and a rear headway reference distance. The rear headway reference distance is a desired separation (e.g., distance, time headway) between the host vehicle 2306 and the rear vehicle 2308d. The rear headway reference distance can be predetermined and stored, for example at the memory 2406. In some embodiments, the rear headway reference distance is set by the driver (e.g., via driver input).

At block 2908, the method 2900 includes, modifying the acceleration control rate based on the relative rear headway distance and the rear headway reference distance. Thus, the acceleration control rate based on the preceding vehicle 2308b is modified to consider the rear vehicle 2308d. For example, as discussed above with equation (19), the processor 2404 can determine and/or modify the acceleration control rate as a function of the acceleration of the host vehicle 2306, the preceding vehicle 2308b, and the rear vehicle 2308d.

Figure 31:
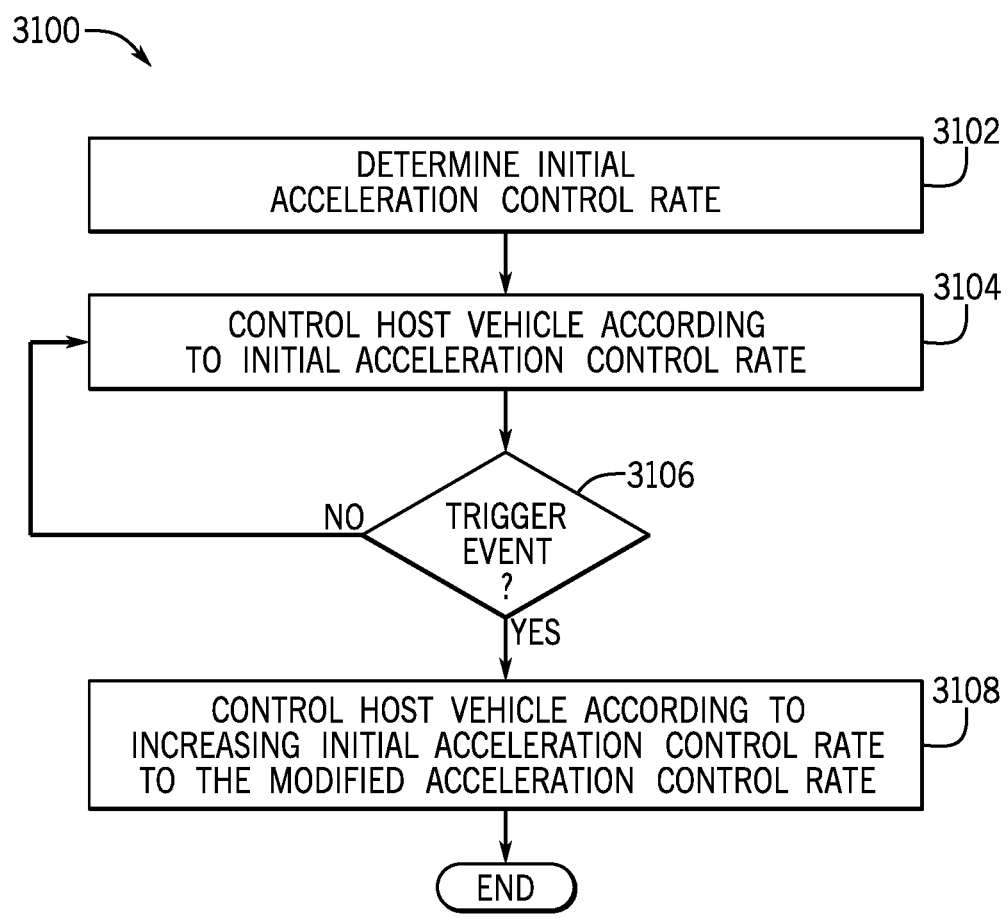
FIG. 31 is a process flow showing another detailed view of the method of FIG. 29 according an exemplary embodiment.

At block 2910, the method 2900 includes controlling the host vehicle 2306 based on the modified acceleration control rate. For example, in one embodiment, the processor 2404 can control the braking operation of the vehicle system to decelerate the host vehicle according to the modified acceleration control rate. As will be discussed in more detail herein with FIG. 31, the braking operation can be controlled by gradually decelerating the host vehicle 2306 according to the modified acceleration control rate. By modifying deceleration of the host vehicle 2306 by applying a smaller brake initially and then gradually applying braking to reach the modified acceleration control rate, more reaction time is given to the rear vehicle 2308d. Said differently, the acceleration control rate and thus the preceding headway reference distance can be modified so that the preceding headway reference distance gradually increases.

The method 2900 will now be discussed in more detail with reference to the method 3000 of FIG. 30. At block 3002, the method 3000 includes determining whether a tailgating vehicle is present with respect to the host vehicle. This determination can be based on one or more factors, for example, a distance between the host vehicle 2306 and the rear vehicle 2308d and/or a speed threshold. As used herein, a headway distance can be defined as a distance between a first vehicle and a second vehicle in front of the first vehicle. In some embodiments a headway distance can include a temporal component as a time headway distance, defined as a measurement of the time past a set point between a first and second vehicle. The headway distance and time headway distance calculations can include preset times and/or distances based on one or more factors, for example, road conditions, speed, weather conditions, among others.

Thus, in one embodiment, it is determined whether the rear vehicle 2308d is a tailgating vehicle based on comparing a distance between the host vehicle 2306 and the rear vehicle 2308d to a tailgating distance threshold (e.g., 100 meters). In another embodiment, a rear headway distance between the host vehicle 2306 and the rear vehicle 2308d is compared to a tailgating headway distance threshold (e.g., 0.5-2 seconds). In some embodiments, block 3002 can include determining if the rear headway distance is within a predetermined range (e.g., tolerance value) of the tailgating headway distance threshold. For example, if the rear headway distance between within 1 second (+/−1) of the tailgating headway distance threshold. Methods described above with block 2904 for detecting a rear vehicle can also be used to determine whether the rear vehicle 2308d is a tailgating vehicle.

If the determination at block 3002 is NO, the method 3000 the C-ACC control system 2400 controls motion of the host vehicle 2306 according to the acceleration control rate at block 3004, which is generated by the C-ACC control system 2400 in order to maintain a preceding headway reference distance with the preceding vehicle 2308b. Thus, the host vehicle 2306 is controlled according to the acceleration control rate without consideration of the rear vehicle 2308d (e.g., according to the control algorithm of equation (5)). Thus, in some embodiments, controlling the host vehicle 2306 based on the rear vehicle 2308d is only executed if the rear vehicle 2308d is a tailgating vehicle because the risk of rear-end collision with the host vehicle 2306 is higher if braking at the host vehicle 2306 is induced by the preceding vehicle 2308b.

In some embodiments, if the determination at block 3002 is YES, the method 3000 can optionally include at block 3006, determining whether the rear vehicle 2308d is tailgating the host vehicle 2306 for a predetermined period of time. Said differently, it is determined if the rear vehicle 2308d is within the tailgating distance threshold for a predetermined of time. This confirms that the rear vehicle 2308d is a tailgating vehicle and is consistently within a distance and/or headway distance that is sufficiently small to be considered tailgating. Thus, a temporal component is considered at block 3006 that quantifies how long the rear vehicle 2308d maintains a distance and/or headway distance to the host vehicle 2306 that is sufficiently small to be considered tailgating.

In other embodiments, block 3006 can include determining how many instances of tailgating the rear vehicle 2308d engages in with the host vehicle 2306 within a predetermined period of time. For example, if the rear vehicle 2308d comes within a distance of less than a two second headway distance to the host vehicle 2306, then increases the distance to more than a two second headway distance to the host vehicle 2306, and then decreases to a distance less than a two second headway distance to the host vehicle 2306, the rear vehicle 2308d is considered a tailgating vehicle at two different time intervals and/or instances. If these two different instances occur within a predetermined amount of time (e.g., two minutes), the rear vehicle 2308d is confirmed as a tailgating vehicle with respect to the host vehicle 2306.

If the determination at block 3006 is YES, the method 3000 can optionally proceed to block 3008, where the preceding headway reference distance, which is used to calculate the acceleration control rate by the C-ACC control system 2400, is modified to increase the following distance between the host vehicle 2306 and the preceding vehicle

2308b. Thus, in one embodiment, the preceding headway reference distance is increased at block 3008. Accordingly at block 3010, the processor 2404 and/or the C-ACC control system 2400 can modify the acceleration control rate to increase the following distance between the host vehicle 2306 and the preceding vehicle 2308b, and at block 3020, the C-ACC control system 2400 can control the host vehicle 2306 according to the modified acceleration control rate. Preemptively increasing the following distance between the host vehicle 2306 and the preceding vehicle 2308b after detection of a tailgating vehicle can provide additional time to the tailgating vehicle to react. Additionally, by preemptively increasing the following distance, the C-ACC control system 2400 can apply less braking force if heard-braking occurs by the preceding vehicle 2308b and/or the leading vehicle 2308a.

It is understood that in some embodiments, modifying the preceding headway reference distance and controlling the host vehicle 2306 accordingly can include the C-ACC control system 2400 modifying and/or overriding preset C-ACC gap times and/or levels. Thus, upon detection of a tailgating vehicle as discussed with block 3002 and 3006, the C-ACC control system 2400 can change and/or override a C-ACC gap time to increase the C-ACC gap time between the host vehicle 2306 and the preceding vehicle 2308b.

Figure 30:
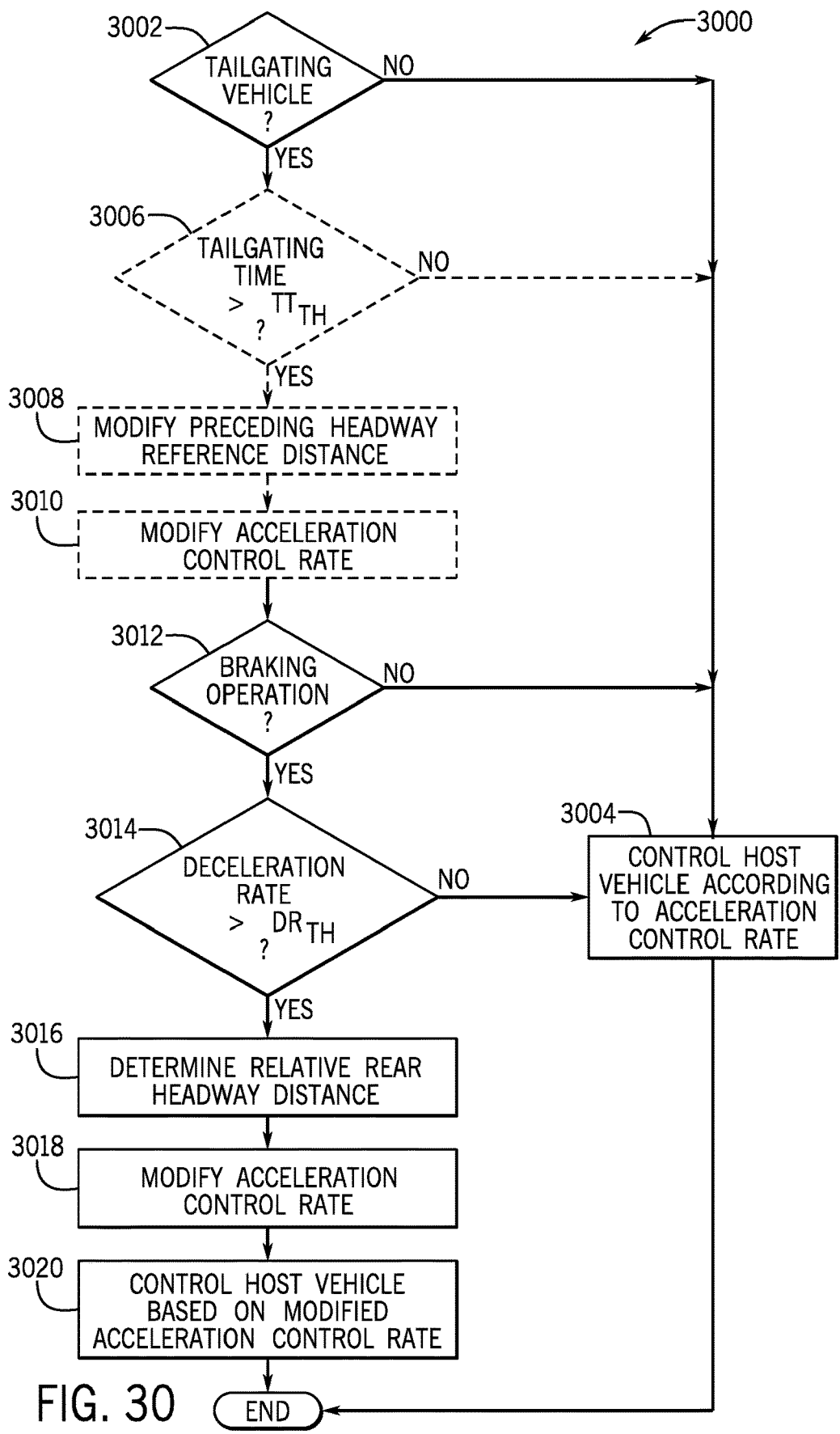
FIG. 30 is a process flow diagram showing a detailed view of the method of FIG. 29 according an exemplary embodiment.

Returning to the method 3000 of FIG. 30, at block 3012, similar to block 2902 of the method 2900, the method 3000 includes, detecting, using one or more vehicle sensors, a braking operation initiated by the host vehicle 2306. In some embodiments, the braking operation detected is a hard-braking operation (e.g., panic brake operation, emergency brake operation). Thus, in one embodiment, block 2904 can include determining whether the braking operation is a hard-braking operation. For example, the acceleration control rate can be compared to a predetermined braking threshold. As an illustrative example, braking that meets or exceeds 1 m/s can be considered a hard-braking operation. If the determination at block 3012 is YES, the method 3000 proceeds to block 3014, otherwise, the method proceeds to block 3004.

In some embodiments, even if a tailgating vehicle is detected, maintaining a safe following distance between the host vehicle 2306 and the preceding vehicle 2308b is given preference over the following distance between the tailgating vehicle and the host vehicle 2306. For example, if the distance between the host vehicle 2306 and the preceding vehicle 2308b decreases very abruptly, which causes a high deceleration rate at the host vehicle 2306, deference is given to maintaining the preceding a headway distance between the host vehicle 2306 and the preceding vehicle 2308b. Thus, at block 3014, the method 3000 can include comparing the acceleration control rate to a braking rate threshold. Here, it is determined whether the deceleration of the host vehicle 2306 meets a threshold. In some embodiments, this can be considered an extremely hard-braking operation. As an illustrative example, a deceleration rate that meets or exceeds 1.5 m/s can be considered an extremely hard-braking operation. In this instance, information about the rear vehicle 2308d can be ignored since the preceding vehicle 2308b is given priority. If the determination at block 3014 is YES, the method 3000 proceeds to block 3004, otherwise, the method proceeds to block 3016.

Thus, upon determining the acceleration control rate meets the braking rate threshold, controlling the braking operation of the host vehicle 2306 includes decelerating the host vehicle according to the acceleration control rate and the preceding vehicle 2308b (e.g., according to the control algorithm in equation (5)). Otherwise, the method 3000 proceeds to block 3016 to determine a rear vehicle component as described above with block 2906. Thus, at block 3018, the method 3000 includes modifying the acceleration control rate based on the relative rear headway distance and the rear headway reference distance. Here, the acceleration control rate based on the preceding vehicle 2308b is modified to consider the rear vehicle 2308d. For example, as discussed above with equation (19), the processor 2404 can determine and/or modify the acceleration control rate as a function of the acceleration of the host vehicle 2306, the preceding vehicle 2308b, and the rear vehicle 2308d.

At block 3020, the method 3000 includes controlling the host vehicle based on the modified acceleration control rate. For example, the C-ACC control system 2400 can execute control of the host vehicle 2306 according to the modified acceleration control rate. In one embodiment, block 3020 includes controlling deceleration of the host vehicle 2306. For example, controlling the braking operation of the host vehicle 2306 can include gradually decelerating the host vehicle 2306 according to the acceleration control rate, the preceding vehicle 2308b, and the rear vehicle 2308d. Accordingly, gradual deceleration that achieves a preceding headway distance and a rear headway distance can provide more reaction time for a tailgating vehicle. Controlling the braking operation in this manner will now be described with reference to the method 3100 of FIG. 31.

At block 3102, the method 3100 includes determining an initial acceleration control rate that is less than the modified acceleration control rate based on the relative rear headway distance and the rear headway reference distance. In this embodiment, controlling the braking operation includes gradually increasing deceleration of the host vehicle 2306 from the initial acceleration control rate to the modified acceleration control rate based on the relative rear headway distance and the rear headway reference distance. By modifying deceleration of the host vehicle 2306 by applying a smaller brake initially and then gradually applying braking to reach the modified acceleration control rate, more reaction time is given to the rear vehicle 2308d. Said differently, the acceleration control rate is modified thereby modifying the preceding headway reference distance based on the relative rear headway distance and the rear headway reference distance. The gradual deceleration of the vehicle thereby gradually increases the preceding headway reference distance.

Thus, at block 3104, the C-ACC control system 2400 can execute control of the host vehicle 2306 according to the initial acceleration control rate. At block 3106, the method 3100 can include detect and/or monitoring a trigger event to initiate a gradual increase in deceleration towards the modified acceleration control rate. For example, in one embodiment, the initial acceleration rate is maintained for a period of time until a braking operation is detected at the rear vehicle 2308d. Said differently, an initial preceding headway reference distance (i.e., less than the preceding headway reference distance achieved by the modified acceleration control rate) is maintained for a period of time.

The processor 2404 can receive position data about the rear vehicle 2308d via a plurality of midrange sensors (e.g., sensed remote vehicle data 2506) or can receive braking and/or position information from the rear vehicle 2308d using V2V communication (e.g., V2V remote vehicle data 2504). The processor 2404 can detect a braking operation at the rear vehicle 2308d using this position data. Thus, at block 3108, the method 3100 can include gradually increasing deceleration of the host vehicle from the initial acceleration control rate to the modified acceleration control rate based on the relative rear headway distance and the rear headway reference distance. According to this embodiment, a smaller brake is applied initially for a period of time, until the host vehicle 2306 determines that the rear vehicle 2308d has reacted to the initial deceleration of the host vehicle 2306 by applying a braking operation in response. Said differently, braking is applied so to gradually increase the initial preceding headway reference distance to the preceding headway reference distance achieved by the modified acceleration control rate.

It is understood that the embodiments disclosed in Section V with respect to tailgating scenarios can also be implemented in whole or in part with the methods discussed in Sections II-IV. For example, with respect to hazard detection, a tailgating vehicle can be considered a hazard, and vehicle control using V2V communication by providing lane level hazard predictions in real-time can be implemented as discussed above in Section III. Additionally, the tailgating control model can be used for merge assist, particularly in a lead merge scenario (FIG. 22d) and in-between scenarios (FIGS. 22E and 22F), where a remote vehicle is detected as a tailgating vehicle.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling a vehicle system that controls motion of a host vehicle relative to a first vehicle positioned immediately ahead of the host vehicle, comprising:
    detecting, using one or more vehicle sensors, a second vehicle driving behind the host vehicle and in the same lane as the host vehicle;
    detecting, using the one or more vehicle sensors, a braking operation initiated by the vehicle system of the host vehicle, wherein the braking operation causes the host vehicle to decelerate based on an acceleration control rate generated by the vehicle system in order to maintain a preceding headway reference distance with the first vehicle, and detecting the braking operation includes comparing the acceleration control rate to a braking rate threshold;
    determining, using the one or more vehicle sensors, a relative rear headway distance between the host vehicle and the second vehicle with respect to a rear headway reference distance;
    determining a modified acceleration control rate based on the relative rear headway distance and the rear headway reference distance, and an initial acceleration control rate based on the relative rear headway distance and the rear headway reference distance, wherein the initial acceleration control rate is less than the modified acceleration control rate;
    controlling the braking operation of the vehicle system to decelerate the host vehicle according to the initial acceleration control rate; and
    controlling the braking operation of the vehicle system to gradually decelerate the host vehicle from the initial acceleration control rate to the modified acceleration control rate.

2. The computer-implemented method of claim 1, including determining whether the second vehicle is a tailgating vehicle based on comparing a time headway distance between the host vehicle and the second vehicle to a tailgating headway distance threshold.

3. The computer-implemented method of claim 2, including upon determining the second vehicle is the tailgating vehicle for a predetermined period of time, increasing the preceding headway reference distance between the host vehicle and the first vehicle.

4. The computer-implemented method of claim 2, including upon determining the second vehicle is the tailgating vehicle and upon detecting a second vehicle braking operation at the second vehicle using the one or more vehicle sensors, gradually increasing the preceding headway reference distance between the host vehicle and the first vehicle.

5. The computer-implemented method of claim 1, wherein upon determining the acceleration control rate does not meet the braking rate threshold, controlling the braking operation of the vehicle system includes gradually decelerating the host vehicle according to the acceleration control rate, the first vehicle, and the second vehicle.

6. A vehicle system for a host vehicle that controls motion of the host vehicle relative to a first vehicle positioned immediately ahead of the host vehicle, comprising:
    a sensor system including one or more vehicle sensors; and
    a processor operatively connected for computer communication with the sensor system, wherein the processor:
    detects, using the one or more vehicle sensors, a second vehicle driving behind the host vehicle and in the same lane as the host vehicle;
    receives from the vehicle system of the host vehicle an acceleration control rate that when executed by the host vehicle initiates a braking operation by the vehicle system of the host vehicle to maintain a preceding headway reference distance with the first vehicle;
    determines, using the one or more vehicle sensors, a relative rear headway distance between the host vehicle and the second vehicle with respect to a rear headway reference distance;
    determines, using the one or more vehicle sensors, whether the second vehicle is within a tailgating headway distance threshold from the host vehicle for a predetermined period of time;
    determines a modified acceleration control rate based on the relative rear headway distance and the rear headway reference distance, and an initial acceleration control rate based on the relative rear headway distance and the rear headway reference distance, wherein the initial acceleration control rate is less than the modified acceleration control rate;
    controls the braking operation of the vehicle system to decelerate the host vehicle according to the initial acceleration control rate; and upon detecting a second vehicle braking operation at the second vehicle using the one or more vehicle sensors, controls the braking operation of the vehicle system to gradually decelerate the host vehicle from the initial acceleration control rate to the modified acceleration control rate.

7. The vehicle system of claim 6, wherein the processor modifies the acceleration control rate and controls the braking operation thereby increasing the preceding headway reference distance between the host vehicle and the first vehicle.

8. The vehicle system of claim 6, wherein the processor determines the acceleration control rate meets a braking rate threshold, and the processor controls the braking operation of the vehicle system by decelerating the host vehicle according to the acceleration control rate and the first vehicle.

9. The vehicle system of claim 6, wherein the processor determines the acceleration control rate does not meet a braking rate threshold, and the processor controls the braking operation of the vehicle system by gradually decelerating the host vehicle according to the acceleration control rate, the first vehicle, and the second vehicle.

10. A non-transitory computer-readable storage medium including instructions that when executed by a processor, cause the processor to:
  detect a second vehicle driving behind a host vehicle and in the same lane as the host vehicle;
  receive an acceleration control rate from a vehicle system of a host vehicle, wherein the acceleration control rate is generated by the vehicle system to maintain a preceding headway reference distance with a first vehicle positioned immediately ahead of the host vehicle;
  determine a braking operation initiated by the host vehicle based on the acceleration control rate by comparing the acceleration control rate to a braking rate threshold;
  calculate a relative rear headway distance between the host vehicle and the second vehicle with respect to a rear headway reference distance;
  calculates a modified acceleration control rate based on the relative rear headway distance and the rear headway reference distance, and an initial acceleration control rate based on the relative rear headway distance and the rear headway reference distance, wherein the initial acceleration control rate is less than the modified acceleration control rate;
  generates one or more braking signals to gradually increase deceleration of the host vehicle from the initial acceleration control rate to the modified acceleration control; and
  transmits the one or more braking systems to the vehicle system.

11. The non-transitory computer-readable storage medium of claim 10, wherein the processor determines whether the second vehicle is a tailgating vehicle based on comparing a time headway distance between the host vehicle and the second vehicle to a tailgating headway distance threshold.

* * * * *